US005760778A

United States Patent [19]

Friedman

[11] Patent Number: 5,760,778

[45] Date of Patent: Jun. 2, 1998

[54] ALGORITHM FOR REPRESENTATION OF OBJECTS TO ENABLE ROBOTIC RECONGNITION

[76] Inventor: Glenn M. Friedman, 25 Polk Dr., Hillsdale, N.Y. 12529

[21] Appl. No.: 515,303

[22] Filed: Aug. 15, 1995

[51] Int. Cl.$^6$ .......... G06T 17/00

[52] U.S. Cl. .......... 345/420

[58] Field of Search .......... 395/120, 119, 395/121, 123, 124, 125; 364/468.04, 578; 382/173

[56] References Cited

U.S. PATENT DOCUMENTS

| | | | |
|---|---|---|---|
| 4,729,098 | 3/1988 | Cline et al. | 364/413.18 |
| 4,731,860 | 3/1988 | Wahl | 382/281 |
| 5,086,495 | 2/1992 | Gray et al. | 395/120 |
| 5,144,685 | 9/1992 | Nasar et al. | 382/153 |
| 5,279,309 | 1/1994 | Taylor et al. | 128/782 |
| 5,428,726 | 6/1995 | Piegl et al. | 395/141 |
| 5,445,166 | 8/1995 | Taylor | 128/897 |
| 5,463,722 | 10/1995 | Venolia | 395/133 |

OTHER PUBLICATIONS

Glenn M. Friedman, "Designing a Highly Conformable Tactile Sensor for Flexible Gripping Using a Digital Probe Array", pp. 95-105, 118-128, after Aug. 15,1994, U.S.A.

A. H. Soni, *Flexible Assembly Systems—1992*, p. 116, 1992, U.S.A.

*Primary Examiner*—Phu K. Nguyen

*Assistant Examiner*—Cliff N. Vo

*Attorney, Agent, or Firm*—Abelman, Frayne & Schwab

[57] ABSTRACT

An algorithm for representing complex three-dimensional objects in a computer for the purpose of robotic recognition of such objects comprises the generation of superquadric volume primitives, the combination of such superquadric volume primitives, the discarding of all vertices making up such volume primitives except for surface vertices, and the automatic generation of a Winged Edge graph structure from the list of surface vertices. The size of the Winged Edge graph structure is reduced by joining adjacent, coplanar faces, removing the common edge of such faces, and joining unidirectional, collinear edges resulting from any joining of adjacent, coplanar faces.

14 Claims, 6 Drawing Sheets

FIG. 5

| VERTICES | | | EDGES | | | | | | | | | | | | | | | | | | FACES | | | |
|---|---|---|---|---|---|---|---|---|---|---|---|---|---|---|---|---|---|---|---|---|---|---|---|---|
| | | | E | $V(E)_g$ | | $E(E)_{st}$ | | | | $s(E)_{st}$ | | | | $t(E)_{st}$ | | | | $F(E)_y$ | | | | | |
| V | E(V) | s(V) | | d | u | dl | dr | ul | ur | dl | dr | ul | ur | dl | dr | ul | ur | l | r | F | F(F) | E(F) | t(F) |
| 1 | 1 | d | 1 | 1 | 2 | 2 | 3 | 4 | 5 | d | u | u | d | r | r | r | r | 1 | 2 | 1 | 1 | 1 | l |
| 2 | 1 | u | 2 | 1 | - | - | 1 | - | - | - | d | - | - | - | l | - | - | - | 1 | 2 | 2 | 1 | r |
| | | | 3 | - | 1 | - | - | - | 1 | - | - | - | d | - | - | - | r | - | 2 | | | | |
| | | | 4 | - | 2 | - | - | - | 1 | - | - | - | u | - | - | - | l | - | 1 | | | | |
| | | | 5 | 2 | - | - | 1 | - | - | - | u | - | - | - | r | - | - | - | 2 | | | | |

ALGORITHM FOR REPRESENTATION OF OBJECTS TO ENABLE ROBOTIC RECONGNITION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to the representation of objects for recognition of such objects and more particularly, to algorithms for the efficient representation of objects in a computer for robotic recognition of such objects.

2. Description of the Related Art

Modern industrial robots must be able to recognize a wide range of objects in order to effectively perform the diverse tasks that they are called upon to execute in commercial use. A crucial step in such recognition is the representation of objects in an object library that the robot will use to compare with actual objects perceived in order to identify the objects perceived.

There are various techniques that have been applied in the areas of geometric modeling and feature-based recognition, but most of these techniques have been limited to computer simulations of simple, two-dimensional shaped objects. In the area of geometric modeling, the techniques employed include wireframe (vertex lists), volumetric (Constructive Solid Geometry), spatial (Octree Codes), and boundary (B-reps in the form of edge graphs) representations for describing objects in a computer. In the area of recognition, previously developed techniques include curvature estimation, moment-based operators, and combining geometric constraints with interpretation trees.

It is, thus, an object of the present invention to provide a method to efficiently represent complex three-dimensional objects in a computer so that a robot can access them for the purpose of recognition of objects encountered by the robot.

A partial disclosure of some aspects disclosed herein may be found in "Designing a Highly Conformable Tactile Sensor for Flexible Gripping Using a Digital Probe Array", by Glenn M. Friedman (D.Eng. Thesis), Rensselaer Polytechnic Institute, Troy, N.Y., August, 1994 (hereinafter referred to as "the Friedman Thesis"). The actual date of submission of the Friedman Thesis for publication was Aug. 15, 1994. References on the related art may be found on pages 118–128 of the Friedman Thesis. In addition, a cursory description of the algorithm during the development stage of computer software implementing it may be found in *Flexible Assembly Systems*—1992, The ASME Design Technical Conferences—4th Conference on Flexible Assembly Systems, Scottsdale, Ariz., Sep. 13–16, 1992, edited by A. H. Soni, University of Cincinnati, The American Society of Mechanical Engineers, 1992, page 116.

SUMMARY OF THE INVENTION

An algorithm for the representation of objects in an object library for the purpose of robotic recognition of such objects comprises the use of superquadric volume primitives and a Winged Edge graph structure.

The superquadric volume primitives are generated by at least three ruled shape functions and are combined to produce volumetric representations of complex three-dimensional objects using union, intersection, complement, and difference operations.

The volumetric representations are reduced to a list of surface vertices or voxels only and the algorithm then automatically generates a Winged Edge graph structure from the list of voxels. The Winged Edge graph structure's size is kept as small as possible through the use of face-joining, edge-killing, and edge-joining routines.

BRIEF DESCRIPTION OF THE DRAWINGS

FIG. 5 is a table showing the adjacency values for the portion of the Winged Edge graph structure shown in FIG. 4.

DESCRIPTION OF THE PREFERRED EMBODIMENTS

Polynomial functions of degree 2 are called quadratic and equations of the form f(x,y,z)=0 in general describe surfaces in three-dimensional space where x, y, and z are the three coordinate axes defining such a space. The general quadratic equation $$ax^2+by^2+cz^2+2hxy+2gzx+2fyz+2ux+2vy+2wz+d=0$$

represents a quadratic surface embracing spheres, cylinders, cones, ellipsoids, parabaloids, and hyperboloids.

Superquadrics are a generalized set of polynomial functions that form variations on ellipsoids. A superquadric volume function defines the existence of volume points or voxels within a shape in terms of its spatial coordinates. Points outside the shape are assigned a VOID label, while points inside are assigned a VOLUME label representing that particular volume.

The superquadric volume function takes the form of:

$$f(x,y,z)=\begin{cases}\text{VOLUME;} & [(x/a_1)^{2/e_1}+(y/a_2)^{2/e_1}]^{e_1/e_2}+(z/a_3)^{2/e_2}<1\\ \text{VOID;} & \text{Otherwise}\end{cases}$$

Where $a_1$, $a_2$, and $a_3$ are the dimensions of the shape in x, y, z, $e_1>0$ is a squareness parameter in the xy-plane and $e_2>0$ is a squareness parameter in the xz-plane.

One characteristic of a superquadric is that the shape generated is symmetric about all three axes. Therefore, it is only necessary to generate the function in one octant and reflect that shape into the remaining seven octants to complete the function.

The present invention is directed toward an algorithm which first generates superquadric volume functions for given complex three-dimensional shapes. Superquadric volume primitives (simple shapes such as spheres, ellipses, tori, etc.) are first generated in the process described immediately below and then binary set operators are used to combine the volume primitives to form complex three-dimensional shapes.

Figure 1:
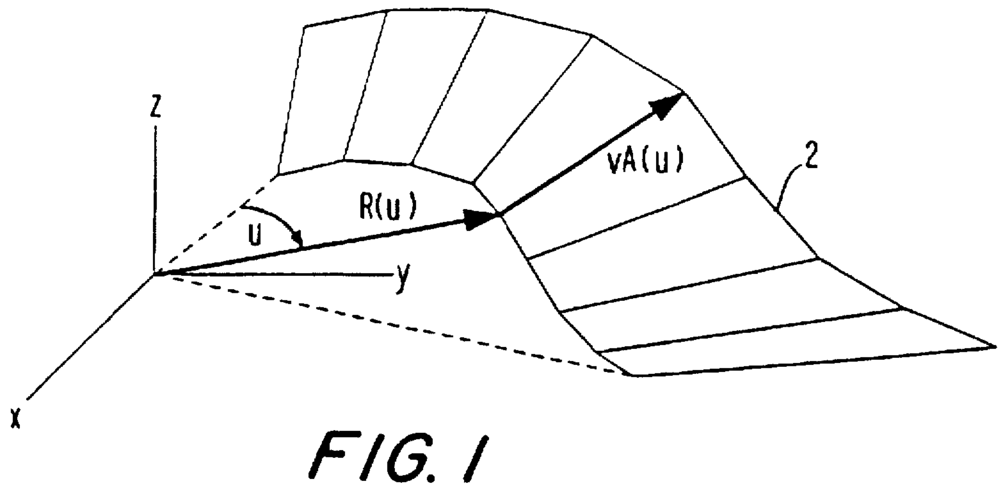
FIG. 1 is a diagram showing a ruled surface S and the vectors used to generate it.

Superquadric volume primitives are generated by ruled shape functions which describe a family of straight lines having both direction and magnitude or, in other words, a family of vectors. These ruled shape functions are based upon the concept of the parameterization of a ruled surface exemplified by S 2 shown in FIG. 1. The surface S 2 is described mathematically by the following function:

$$S(v,u)=R(u)+vA(u)$$

where the variable u indicates a certain angular position along the lower border of the surface S 2, R(u) is a position vector leading from the origin of the coordinate system used (indicated by the x, y, and z axes on FIG. 1) to a certain angular position u on the lower border of the surface S 2, and A(u) is a line vector from angular position u to the point on the top border of the surface S 2 corresponding to angular position u. The parameter, v, is a scalar quantity which ranges from 0 to 1 and determines the magnitude of A(u). S (v, u) is simply the vector sum of R(u) and vA(u). Both R(u) and vA(u) are the ruled shape functions generating S(v, u).

Figure 2:
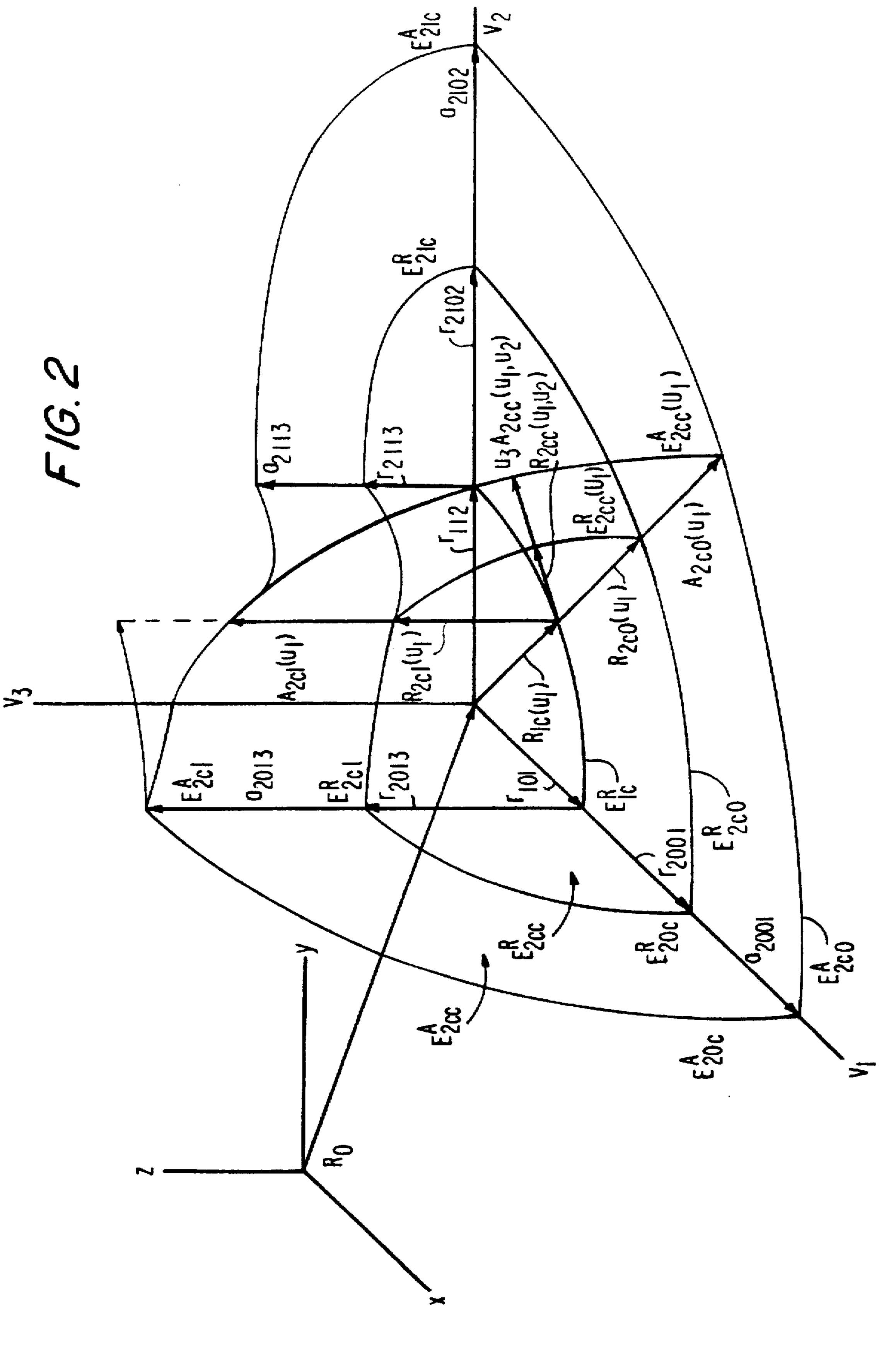
FIG. 2 is a diagram showing a computer simulation of a three-dimensional shape using ruled functions to generate a ruled volume function.

When this concept is extended to three dimensions, we obtain a ruled volume function of three parameters $u_1$, $u_2$, and $u_3$, an example of which is shown in FIG. 2. The superquadric volume primitives needed are a subset of the ruled volume functions generated. The ruled volume function shown in FIG. 2 is described by:

$$S(u_1,u_2,u_3)=R_0+R_{1c}(u_1)+R_{2cc}(u_1,u_2)+u_3\,A_{2cc}(u_1,u_2) \qquad (1)$$

where $U_3$ is the length by which $A_{2cc}(u_1, u_2)$ must be multiplied, and $u_1$ and $u_2$ are angular parameters describing the angular positions of $R_{1c}(u_1)$, $R_{2cc}(u_1, u_2)$, and $A_{2cc}(u_1, u_2)$. The use of the c subscripts in the above equation contains information about the history of each quantity and how it relates to other quantities. For example, in the following expression:

$$Q_c(u)=F^Q_c(Q_0,Q_1,E^Q_c,u)$$

the running subscript c indicates that $Q_c(u)$ is the "child" or result of applying the given shape function $F^Q_c$ to the basis or "parent" quantities $Q_0$ and $Q_1$, the function parameter $E^Q_c$, and the angular parameter u.

Applying these principles to our case, we obtain for $R_{1c}(u_1)$, $R_{2cc}(u_1, u_2)$, and $A_{2cc}(u_1, u_2)$ the following expressions:

$$R_{1c}(u_1)=F^R_{1c}(R_{10},R_{11},E^R_{1c},u_1)$$

$$R_{2cc}(u_1,u_2)=F^R_{2cc}(R_{2c0}(u_1),R_{2c1}(u_1),E^R_{2cc}(u_1),u_2)$$

$$A_{2cc}(u_1,u_2)=F^A_{2cc}(R_{2c0}(u_1)+A_{2c0}(u_1),R_{2c1}(u_1)+A_{2c1}(u_1),E^A_{2cc}(u_1),u_2)-R_{2c1}(u_1,u_2)$$

$$R_{2c0}(u_1)=F^R_{2c0}(R_{10}+R_{200},R_{11}+R_{210},u_1)-R_{1c}(u_1)$$

$$R_{2c1}(u_1)=F^R_{2c1}(R_{10}+R_{201},R_{11}+R_{211},u_1)-R_{1c}(u_1)$$

$$A_{2c0}(u_1)=F^A_{2c0}(R_{10}+R_{200}+A_{200},R_{11}+R_{210}+A_{210},E^A_{2c0},u_1)-R_{2c0}(u_1)-R_{1c}(u_1)$$

$$A_{2c1}(u_1)=F^A_{2c1}(R_{10}+R_{201}+A_{201},R_{11}+R_{211}+A_{211},E^A_{2c1},u_1)-R_{2c1}(u_1)-R_{1c}(u_1)$$

We can also obtain expressions for the function parameters $E^Q_{2cc}(u_1)$ as a squareness function $G^Q_{2cc}$ of the base values $E^Q_{20c}$ and $E^Q_{21c}$, a second function parameter $E^Q_{2cc}$, and the angular parameter $u_1$(Q=R, A):

$$E^Q_{2cc}(u_1)=G^Q_{2cc}(E^Q_{20c},E^Q_{21c},E_{2cc},u_1).$$

The parameters $E^Q_{2cc}(u_1)$ defined by the above equation are squareness parameters and vary with the parameter $u_1$ in the same way that $R_{1c}(u_1)$, $R_{2c}(u_1, u_2)$, and $A_{2cc}(u_1, u_2$ functions of $u_1$. $E^Q_{20c}$ and $E^Q_{21c}$ are basis quantities partially determining $E^Q_{2cc}(u_1)$. $E^Q_{2cc}$ are the rotation parameters that determine the squareness parameters $E^Q_{2cc}(u_1)$.

Returning to Equation (1) and with reference to FIG. 2, we proceed to define the terms in Equation (1) explicitly. $R_0$ is a position vector determining the position of the origin of the local coordinate system (indicated in FIG. 2 by the $V_1$, $V_2$ and $V_3$ axes) with respect to the origin of the global coordinate system (indicated in FIG. 2 by the x, y, and z axes) and indicates the position from which the first ruled shape function $R_{1c}(u_1)$ will be extended in generating the volume desired. $R_{1c}(u_1)$ is a function of the angular parameter $u_1$. $R_{2cc}(u_1, u_2)$ is the second ruled shape function used in generating the volume desired and is a function of angular parameter $u_2$, as well as $u_1$. Finally, $A_{2cc}(u_1, u_2)$ is the third ruled shape function used in generating the volume desired and again is a function of angular parameters $u_1$ and $u_2$. The parameter $u_3$ is a scalar quantity which ranges from 0 to 1 and determines the length of $A_{2cc}(u_1, u_2)$.

The shape functions F and squareness function G referred to in the expressions for $R_{2cc}(u_1, u_2)$, $A_{2cc}(u_1, u_2)$, and $E^Q_{2cc}(u_1)$ must be smooth, continuous functions in the range of $u_1$ and $u_2$ depending on the particular function.

Two useful functions which satisfy the requirements for F and G are the superinterpolator and the superelliptic. Taking $R_{2cc}(u_1, u_2)$ as an example, and recognizing that $R_{2cc}(u_1, u_2)$ has three components along the $V_1$, $V_2$, and $V_3$ axes, $r_{2cc1}(u_1, u_2)$, $r_{2cc2}(u_1, u_2)$, and $r_{2cc3}(u_1, u_2)$, the expression for the superinterpolator is:

$$r_{2cci}(u_1,u_2)=[r_{2c01}(u_1)^{\epsilon^r_{2cci}(u_1)}+d(u_2)(r_{2c1i}(u_1)^{\epsilon^r_{2cci}(u_1)}-r_{sc0i}(u_1)^{\epsilon^r_{2cci}(u_1)})]^{1/\epsilon^r_{2cci}(u_1)}$$

where $r_{2cci}(u_1, u_2)$ is the ith component of $R_{2cc}(u_1, u_2)$. (i=1, 2, 3), $\epsilon^q_{2cci}(u_1)=2/e^q_{2cci}(u_1)$ where $e^q_{2cci}(u_1)$ is the squareness parameter with respect to the $i^{th}$ component of $E^Q_{2cc}(u_1)$, and $d(u_2)=u_2$ or $$d(u_2)=\cos^2[(1-u_2)\pi/2]$$

are two possible expressions for $d(u_2)$.

The superelliptic function using analogous notation to that employed for the superinterpolator function, is expressed by:

$$r_{2cci}(u_1, u_2)=d_i(\theta)R^*_i(\theta)$$

where $\theta=u_2\pi/2$ $$d_i(\theta)=\begin{cases}\cos\theta\cos\Phi & ;\ i=1\\ \cos\theta\sin\Phi & ;\ i=2;\text{ and}\\ \sin\theta & ;\ i=3\end{cases}$$

$$R^*_i(\theta)=\frac{|R_{2c0}(u_1)|\,|R_{2c1}(u_1)|}{\left[|R_{2c0}(u_1)|^{\epsilon^r_{2cci}(u_1)}\sin^{\epsilon^r_{2cci}(u_1)}\theta+|R_{2c1}(u_1)|^{\epsilon^r_{2cci}(u_1)}\cos^{\epsilon^r_{2cci}(u_1)}\theta\right]^{1/\epsilon^r_{2cci}(u_1)}}$$

$$\Phi=\tan^{-1}[r_{2c02}(u_1)/r_{2c01}(u_1)].$$

Once a plurality of superquadric volume primitives have been obtained and after converting the volume primitives into voxels in voxel space Z, the points may be combined into a volumetric representation of a given complex three-dimensional object. This is done by combining pairs of coincident voxels ($Z_1(C)$, $Z_2(C)$), where C are the coincident voxel coordinates of two volume primitives which produce sets of voxels $Z_1$ and $Z_2$, from the primitives according to the following Boolean operations:

$$Z_1 U Z_2 = \begin{cases}1;\ Z_1 \text{ or } Z_2=1\\ 0;\ \text{otherwise (UNION)}\end{cases}$$

$$Z_1\cap Z_2 = \begin{cases}1;\ Z_1 \text{ and } Z_2=1\\ 0;\ \text{otherwise (INTERSECTION)}\end{cases}$$

$$Z = \begin{cases}1;\ Z=0\\ 0;\ Z=1\ \text{(COMPLEMENT)}\end{cases}$$

$$Z_1-Z_2 = \begin{cases}1;\ Z_1=1 \text{ and } Z_2=0\\ 0;\ \text{otherwise (DIFFERENCE)}\end{cases}$$

It should be noted that, although three ruled shape functions, $R_{1c}(u_1)$, $R_{2cc}(u_1, u_2)$, and $u_3A_{2cc}(u_1, u_2)$, are sufficient to generate the superquadric volume primitives, in many cases n ruled shape functions, (n>3), of the form:

$$S(u_1,\ldots,u_n)=R_0+\left[\sum_{i=1}^{n-1}R_{ic_1\ldots c_i}(u_1,\ldots,u_i)\right]+u_nA_{n-1,c_1\ldots c_{n-1}}(u_1,\ldots,u_{n-1})$$

$$1\leqq i,k\leqq n-1$$

$$\begin{aligned}r_{ic_1\ldots c_kp_{k+1}\ldots p_ij}(u_1,\ldots,u_k) = {} & F^r_{ic_1\ldots c_kp_{k+1}\ldots p_ij}\Bigg[\sum_{h=0}^{i-k}r_{i-h,c_1\ldots c_{k-1}0p_{k+1}\ldots p_{i-h}j}(u_1,\ldots,u_{k-1}),\\ & \sum_{h=0}^{i-k}r_{i-h,c_1\ldots c_{k-1}1p_{k+1}\ldots p_{i-h}j}(u_1,\ldots,u_{k-1}),\\ & e^r_{ic_1\ldots c_kp_{k+1}\ldots p_ij}(u_1,\ldots,u_{k-1}),u_k\Bigg]-\\ & \sum_{h=1}^{i-k}r_{i-h,c_1\ldots c_kp_{k+1}\ldots p_{i-h}j}(u_1,\ldots,u_k)\end{aligned}$$

$$a_{n-1,c_1\ldots c_kp_{k+1}\ldots p_{n-1}j}(u_1\ldots u_k)=F^a_{n-1,c_1\ldots c_kp_{k+1}\ldots p_{n-1}j}\begin{pmatrix}\sum_{h=0}^{n-1-k}r_{n-1-h,c_1\ldots c_{k-1}0p_{k+1}\ldots p_{n-1-h}j}(u_1\ldots u_{k-1})+\\ a_{n-1,c_1\ldots c_{k-1}0p_{k+1}\ldots p_{n-1}j}(u_1\ldots u_{k-1}),\\ \sum_{h=0}^{n-1-k}r_{n-1-h,c_1\ldots c_{k-1}1p_{k+1}\ldots p_{n-1-h}j}(u_1\ldots u_{k-1})+\\ a_{n-1,c_1\ldots c_{k-1}1p_{k+1}\ldots p_{n-1}j}(u_1\ldots u_{k-1}),\\ e^a_{n-1,c_1\ldots c_kp_{k+1}\ldots p_{n-1}j}(u_1\ldots u_{k-1}),u_k\end{pmatrix}-\sum_{h=0}^{n-1-k}r_{n-1-h,c_1\ldots c_kp_{k+1}\ldots p_{n-1-h}j}(u_1\ldots u_k)$$

$$e^q_{i\ldots c_k\ldots p_1\ldots p_{m-1}c_m\ldots c_1j}(u_1\ldots u_k)=G^q_{i\ldots c_k\ldots p_1\ldots p_{m-1}c_m\ldots c_1j}\begin{pmatrix}e^q_{i\ldots 0\ldots p_1\ldots p_{m-1}c_m\ldots c_1j}(u_1\ldots u_{k-1}),\\ e^q_{i\ldots 1\ldots p_1\ldots p_{m-1}c_m\ldots c_1j}(u_1\ldots u_{k-1}),\\ e^q_{i\ldots c_k\ldots p_1\ldots p_{m-1}c_m\ldots c_1j}(u_1\ldots u_{k-1}),u_k\end{pmatrix}$$

may be used to generate the superquadric volume primitives, holding all but two angular parameters $u_1, \ldots, u_{n-1}$ constant and allowing scalar parameter $u_n$ to vary in order to simplify the resulting expression. The subscripts $c_1, \ldots, c_m$ (m=i, k−1, k) in the preceding expression represent the fact that the variable subscripted is the $m^{th}$ generation "child" of $2^m$ first generation basis quantities. The subscripts $p_{k+1}, \ldots, p_{i-h}$ in the preceding expression represent the fact that the variable subscripted is the $(i-k)^{th}$ level "parent", or basis quantity, for the last generation child. Finally the j subscripts j=1, 2, 3) represent the three components of each variable subscripted along the $V_1$, $V_2$, and $V_3$ axes.

Figure 3:
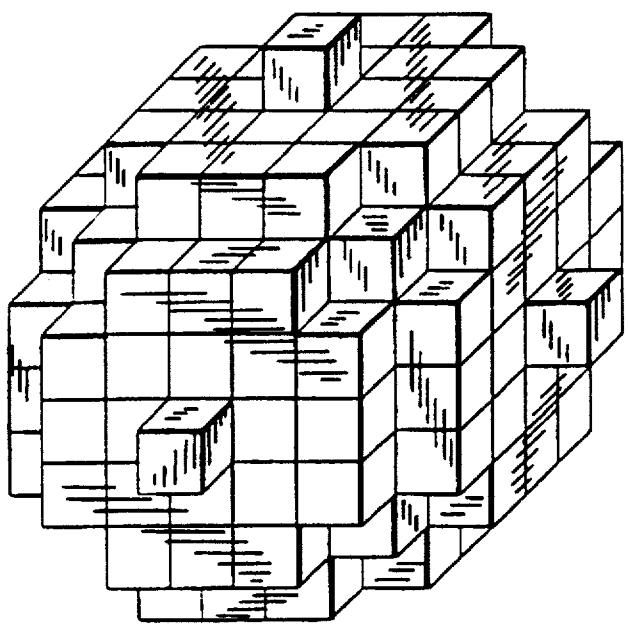
FIG. 3 is a perspective view of a sphere composed of surface voxels.

After a given complex three dimensional shape is generated by the aforementioned process, a mask is applied to the model shape and for every voxel in the model shape a search is made for adjacent voids. If adjacent voids are found, then the voxel can be identified as a surface voxel and it will be saved for further processing; otherwise it will be discarded. Surface voxels are the ones that are of primary interest when a robot attempts to match an object to the model in the object library since the robot normally only makes sensory contact with the surface of an object. An example of a sphere composed of surface voxels is shown in FIG. 3. Any three dimensional shape generated by the aforementioned process may be displayed on a personal computer monitor screen.

In order to accurately and efficiently convey information about an object's shape, it is advantageous to incorporate the subset of surface voxels as vertices of a directed edge graph which also includes edges and faces to represent the object's surface. A common structure used to represent an edge graph is known as the Winged Edge graph structure, {W-E}, using the symbols V for vertex, E for edge, and F for face. Using standard set notation and functional notation, the data stored in the computer for the graph structure is:

$$\{W\text{-}E\}=\{\{E(V), s(V)\}, \{V(E)_s, E(E)_{st}, s(E)_{st}, t, t(E)_{st}, F(E)_r\}, \{F(F), E(F), t(F)\}\} \quad (2)$$

where s=d,u, t=l,r, and d="down", u="up", l="left", and r="right", are the adjacency directions. If should be noted that, strictly speaking, the adjacency directions, s(V), $s(E)_{st}$, $t(E)_{st}$ and t(F), are not necessary for a complete specification of a Winged Edge graph structure, but are included herein for the efficient running of the algorithm generating a {W-E} from the surface voxels under consideration.

Figure 4:
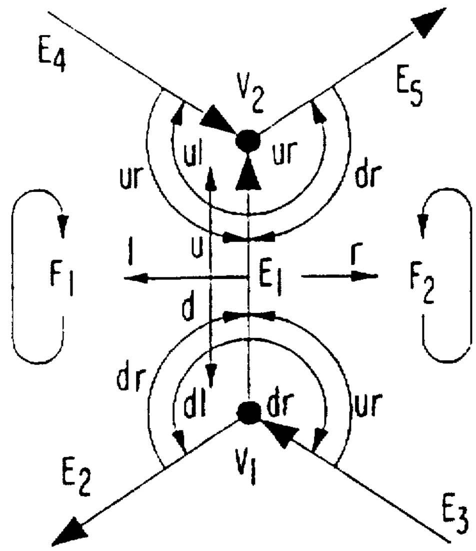
FIG. 4 is a schematic of a portion of a Winged Edge graph structure.

FIG. 4 shows an example of a basic Winged Edge graph structure and FIG. 5 lists the corresponding adjacencies. The adjacency directions can be best explained by reference to FIG. 4. $V_2$ is said to be an "up" vertex because edge $E_1$ is incident into $V_2$ and $V_1$ is said to be a "down" vertex because edge $E_1$ is incident out of $V_1$. Edge $E_5$ is said to have an "up right" adjacency to $E_1$ because edge $E_5$ is to the right of the "up" or arrow end of $E_1$. Likewise, $E_1$ is said to have a "down right" adjacency to $E_2$ since $E_1$ is to the right of the "down" or tail end of $E_2$. Adjacency relationships between other edges shown in FIG. 4 can be explained analogously to the explanation given above. Edges $E_4$, $E_5$, $E_2$, and $E_3$ are said to be the wings of edge $E_1$; hence the name Winged Edge graph structure. Finally, faces $F_1$ and $F_2$ can be said to be "right" or "left" with respect to edge $E_1$ if an observer is looking along edge $E_1$ in the direction indicated by the arrow representing $E_1$.

The terms of equation (2) have the following significance. E(V) contains, for each vertex V, one of the edges E incident on the vertex V. s(V) contains, for each vertex V, a label indicating whether vertex V is an "up" vertex or, in other words, has label u or whether vertex V is a "down" vertex or, in other words, has label d for the edge E(V). $V(E)_s$ contains, for each edge E, a pair of values indicating the vertex $V_i$ which is the "up" vertex for that edge as well as vertex $V_j$ which is the "down" vertex for that edge. $E(E)_{st}$ contains, for each edge E, a set of the four edges that are adjacent to edge E (namely the "down left", "up left", "down right", and "up right" edges). $s(E)_{st}$ contains, for each of the edges contained in $E(E)_{st}$, which are the set of the four edges adjacent to edge E, the "up" or "down" direction of edge E with respect to each of the edges in $E(E)_{st}$. $t(E)_{st}$ contains, for each of the edges contained in $E(E)_{st}$, which are the set of the four edges adjacent to edge E, the "left" or "right" direction of edge E with respect to each of the edges in $E(E)_{st}$. $F(E)_r$ contains, for each edge E, the "left" and "right" faces with respect to that edge E. F(F) contains the oldest ancestor of face F prior to the first face-joining (this procedure is explained below) involving face F. E(F) contains, for each face F, an edge that surrounds that face. t(F) contains, for each face F, the "left" or "right" direction of that face F with respect to edge E(F). FIG. 5 illustrates, by way of example, the values of each element of equation (2) for FIG. 4.

The algorithm for automatically generating a {W-E} from a given model shape's surface voxels or vertex list begins by searching the voxel space Z, using Cartesian coordinates, for the first occurrence of a surface voxel or vertex V and, upon finding V, initializing {W-E} as a self-loop (edge pointing to itself) with the following assignments:

$E(V) \leftarrow E$ $V(E)_s \leftarrow V(s=d, u)$ $E(E)_{st} \leftarrow E(t=l, r)$ $F(E)_t \leftarrow F$ $F(F) \leftarrow F$ $E(F) \leftarrow E$ (Although the algorithm begins with a self-loop, which is an abstraction that does not exist in physical space, the algorithm guarantees two-manifold surfaces result in this and other non-manifold situations by subdividing the voxel space, if necessary.) Then the algorithm continues, for each vertex V, by forward searching normally, diagonally, and at comers by Cartesian coordinates for adjacent vertices $V_i$. If an adjacent vertex $V_i$ is found, an edge E is created between the vertex V and the adjacent vertex $V_i$ by the following assignments:

$E(V) \leftarrow E$ $s(V) \leftarrow d$ $V(E)_d \leftarrow V$ $V(E)_u \leftarrow V_i$ $E(V_i) \leftarrow E$ $s(V_i) \leftarrow u$ Newly created edges $E_j$ pair with an existing edge E if they share a common vertex such that:

$$V(E)_f = V(E_j)_g$$

where f, g∈s.

If this condition is true, the adjacency relationships between $E_j$ and E are defined according to the following assignments:

$E(E)_{d(x^{12})r(x^{13})} \leftarrow E_j$ $s(E)_{d(x^{12})r(x^{13})} \leftarrow d_{(x^{1})}$ $t(E)_{d(x^{12})r(x^{13})} \leftarrow l_{(x^{123})}$ $E(E_j)_{d(x^{1})l(x^{123})} \leftarrow E$ $s(E_j)_{d(x^{1})l(x^{123})} \leftarrow d(x^{12})$ $t(E_j)_{d(x^{1})1(x^{123})} \leftarrow r(x^{13})$ where the subscript x is a symbolic truth variable that exists in either the true state (+1) or false state (−1) according to the rule:

$$\{x: \text{statement}\}$$

The variable x=+1 if the statement is true and x=−1 if the statement is false. The function of the variable is to switch the adjacency directions analogous to the way an 'equivalent' electronic gate (a relational operator found in Symbolic Logic whose symbol is '≡') multiplies its inputs. For example, if $x^1=+1$, $x^2=-1$, and $x^3=-1$, then:

$$x^{12}=x^1x^2=(+1)(-1)=-1$$

$$x^{123}=x^1x^2x^3=(+1)(-1)(-1)=+1$$

and results in $d(x^1)=d$, $d(x^{12}x^2)=u$, $r(x^{13})=1$, and $l(x^{123})=1$. In addition, any occurrence of !s or !t switches the adjacency as if !s was written s(−1) and !t was written t(−1).

The first truth variable $x^1$ tests whether the sense of f is "down":

$\{x^1: f=d\}$.

The second variable $x^2$ tests whether the edge directions of the pair of edges E and $E_j$ are opposing or aligned:

$\{x^2: f=g\}$.

The third variable $x^3$ tests whether the resulting normal $N=E\times E_j$ points outward from the surface:

$\{x^3: Z(C+N)=0\}$.

Occasionally, an edge $E_j$ will be paired with an existing edge E which completes a closed loop of edges and establishes a new face F. The following assignments join a face to {W-E}:

$F(E)_{r(x^{23})} \leftarrow F$ $F(E_j)_{l(x^{23})} \leftarrow F$ $F(E(E)_{dr(x^3)})_{l(x^{34})} \leftarrow F$ $F(F) \leftarrow F$ $E(F) \leftarrow E$ $t(F) \leftarrow r(x^{23})$ where the fourth and fifth variables $x^4$ and $x^5$ test the adjacency of adjacent edges. If the loop contains three edges, then:

$\{x^4: V(E(E)_{dr(x^3)})_{d(x^2)} \neq V(E_j)_{d(x^2)}\}$.

However, if the loop contains four edges, then:

$\{x^4: V(E)_d = V(E(E)_{dr(x^3)})_d\}$ $\{x^5: V(E(E)dr(x_3))_{u(x^4)} = V(E(E(E)_{dr(x^3)})_{u(x^4)(x^{34})})_{u(x^4)}\}$.

and the following assignment statement is added to those specified above:

$F(E(E(E)_{dr(x^3)})_{u(x^4)l(x^{34})})_{l(x^{35})} \leftarrow F$

Figure 6:
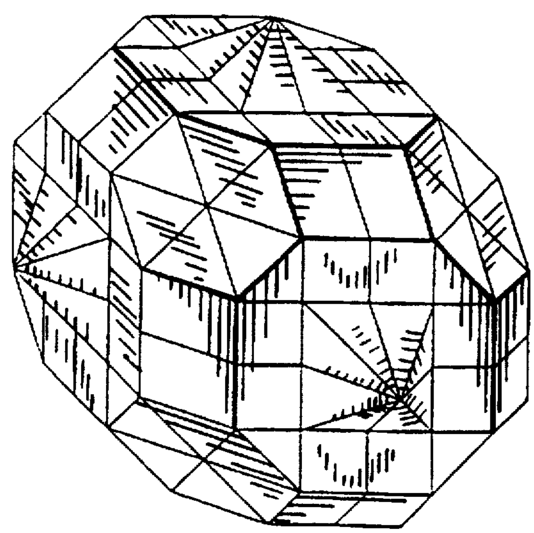
FIG. 6 is a perspective view of a Winged Edge graph structure for a sphere.

An example of a Winged Edge graph structure for a sphere is shown in FIG. 6.

Although not necessary, by continuously inspecting adjacent faces of {W-E} for coplanarism, reduction in the size of {W-E} can be achieved without introducing ambiguity into the representation of the model shape. Thus, if the normals of the faces $F(E)_r$ and $F(E)_l$ have the same direction, then face $F(E_{r(x^6)})$ can be joined to $F(E)_{r(x^6)}$ by the following assignment:

$F(F(E)_{l(x^6)}) \leftarrow F(E)_{r(x^6)}$ where the sixth variable $x^6$ compares the order or ancestry of the faces:

$\{x^6: F(E)_r < F(E)_l\}$.

The oldest ancestor of any face F can be determined by the following search routine:

F*(F)={do{F=F(F)} until (F=F(F)); return F}.

{W-E} is revised and reduced after every face-joining by removing or killing the edge common to both faces, E, as specified in the following assignments:

$E(E(E)_{st})_{s(E(E)_{st})t(E(E)_{st})} \leftarrow E(E)_{slt}$ $s(E(E)_{st})_{s(E(E)_{st})t(E(E)_{st})} \leftarrow s(E)_{slt}$ $t(E(E)_{st})_{s(E(E)_{st})t(E(E)_{st})} \leftarrow t(E)_{slt}$ where s=d, u, t=1, r.

Figure 7B:
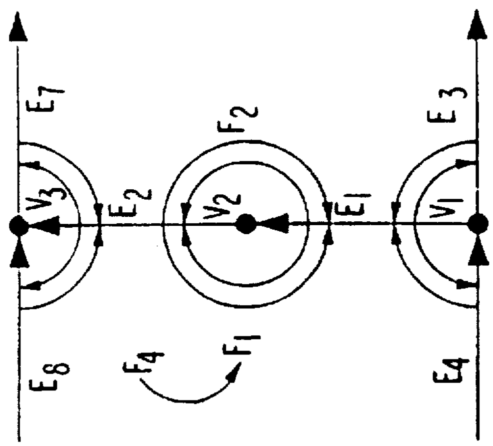
FIG. 7*b* is a schematic showing the portion of the Winged Edge graph structure shown in FIG. 7*a* after faces $F_1$ and $F_4$ have been joined and edge $E_6$ has been killed.
Figure 7A:
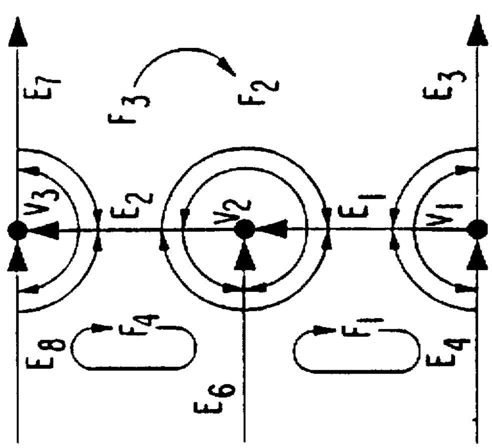
FIG. 7*a* is a schematic showing the portion of the Winged Edge graph structure shown in FIG. 7 after faces $F_2$ and $F_3$ have been joined and edge $E_5$ has been killed.
Figure 7:
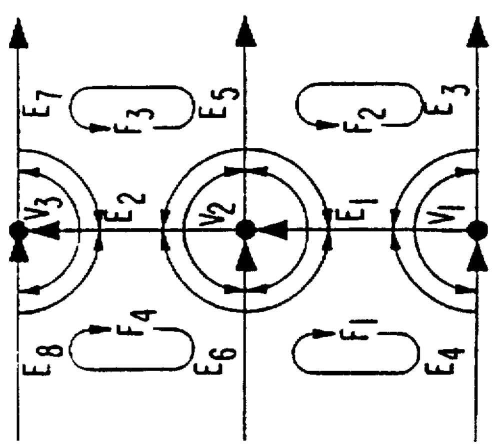
FIG. 7 is a schematic showing a group of vertices, edges, and faces of a Winged Edge graph structure before the face-joining and edge-killing routine commences.

FIGS. 7, 7a and 7b show face $F_2$ joined to $F_3$ and face $F_1$ joined to $F_4$ using the edge-killing procedure which kills edges $E_5$ and $E_6$.

If a face-joining results in the most recently created edge E having overlapping wings of equal slopes ($E(E)_{fh}=E(E)_{flh}$; f∈s, h∈t), then an edge-joining procedure can also be done (since the order of edges is not critical, it is easier to join the most recently created edge E to the wing than vice versa) of the undirectional, collinear edges having a common vertex by the following assignments:

$E(V(E)_{lf}) \leftarrow E(E)_{fh}$ $s(V(E)_{lf}) \leftarrow S(E)_{fh}$ $V(E(E)_{fh})_{s(E)_{fh}} \leftarrow V(E)_{lf}$ $E(E(E)_{ft})_{s(E)_{ft}t(E)_{ft}} \leftarrow E(E)_{lft}$ $E(E(E)_{lft})_{s(E)_{lft}t(E)lft} \leftarrow E(E)_{ft}$ $s(E(E)_{ft})_{s(E)_{lft}t(E)_{lft}} \leftarrow s(E)_{lft}$ $s(E(E)_{lft})_{s(E)_{lft}t(E)lft} \leftarrow s(E)_{ft}$ $t(E(E)_{ft})_{s(E)_{ft}t(E)_{ft}} \leftarrow t(E)_{lft}$ $t(E(E)_{lft})_{s(E)_{lft}t(E)lft} \leftarrow t(E)_{ft}$ where t=1, r.

Figure 8:
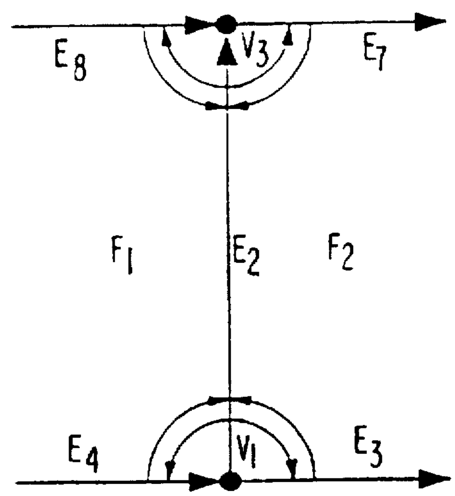
FIG. 8 is a schematic showing the portion of the Winged Edge graph structure shown in FIG. 7*b* after edge $E_1$ has been joined to edge $E_2$.

FIG. 8 shows the result of joining edges $E_1$ and $E_2$ in FIG. 7b.

Figure 9:
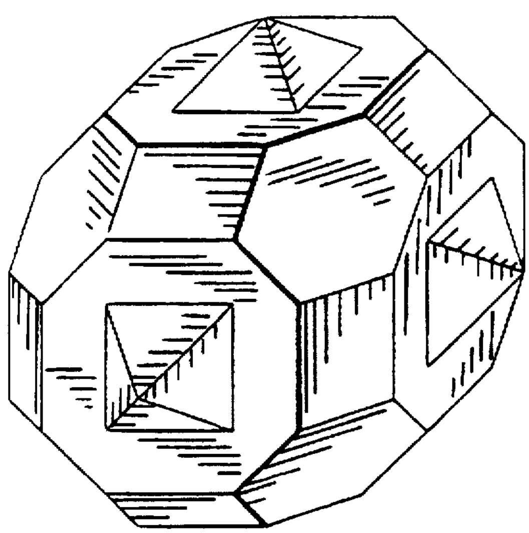
FIG. 9 is a perspective view of the Winged Edge graph structure for the sphere shown in FIG. 6 after face-joining, edge-killing, and edge-joining have been done.

The Winged Edge graph structure for the sphere in FIG. 5 reduced by face-joining, edge-killing, and edge-joining is shown in FIG. 9.

A computer program listing of a computer program performing most of the steps in the algorithm specified above follows this portion of the specification as an Appendix and is part of this disclosure.

The computer program is in the computer programming language C and contains a "main" routine (a term of art well known to those ordinarily skilled in the art of C programming) and various subroutines. However, the computer program could be implemented in many other computer programming languages as is well known to those ordinarily skilled in the art of computer programming.

The computer program listing contains subroutines that provide for a graphical user interface. The graphical user interface allows the user to specify various superquadric volume primitives that he wishes to combine, the method of combination, and the position of such volume primitives, with rotation and translation of such volume primitives allowed, and displays both the surface voxel version and the Winged Edge graph structure version of the resultant three-dimensional object. The superquadric volume primitives are restricted to a sphere, cylinder, cone, cube, and box.

The computer program generates superquadric volume primitives by generating a series of discrete points represented by their three-dimensional coordinates to represent ruled shape functions and then uses voxels which include those discrete points and the points included in the volume "swept out" by the ruled shape functions to represent superquadric volume primitives. The superquadric volume primitives may be combined using the Boolean operations of union and difference, which are sufficient for robotic recognition applications. The Boolean operations of complement and intersection are not presently implemented by this computer program, but it may be easily extended to include these operations. The computer program discards all voxels other than the surface voxels of the object represented prior to further processing.

The computer program then proceeds to generates the Winged Edge graph structure from the list of surface voxels. In doing so, it uses a number of truth variables in addition to those specified herein. Those truth variables were discovered not to be necessary to the implementation of this algorithm after the writing of the computer program so they are not included in the preceding disclosure.

While preferred embodiments of the present invention have been described in detail, various modifications, alterations, and changes may be made without departing from the spirit and scope of the present invention as defined in the following claims.

Unpublished work ®1995 Glenn M. Friedman.

APPENDIX

```
#include <stdio.h>
#include <conio.h>
#include <string.h>
#include <ctype.h>
#include <math.h>
#include <stdlib.h>
#include <alloc.h>
#include <process.h>
#include <dos.h>

#include <zmenu.h>
#include <zchoices.h>
#include <zclear.h>
#include <zoutput.h>
#include <zclrout.h>
#include <zOK.h>
#include <zOKr.h>
#include <zOKd.h>
#include <zquit.h>
#include <zbreak.h>
#include <zstart.h>
#include <zrmenu.h>
#include <zres.h>
#include <zmcreat.h>
#include <zmsave.h>
#include <zmedit.h>
#include <zmreset.h>
#include <zmdel.h>
#include <zmget.h>
#include <zmlist.h>
#include <zmchoo.h>
#include <zmproc.h>
#include <zdim.h>
#include <zcube.h>
#include <zbox.h>
#include <zcylind.h>
#include <zsphere.h>
#include <zcone.h>
#include <zA1.h>
#include <zA2.h>
#include <zA3.h>
#include <ztrans.h>
#include <ztrlate.h>
#include <zrotate.h>
#include <zxpdef.h>
#include <zmview.h>
#include <zocreat.h>
#include <zoedit.h>
#include <zprocess.h>
#include <zosave.h>
#include <zoreset.h>
#include <zolist.h>
#include <zoget.h>
#include <zodel.h>
```

```
#include <zochoo.h>
#include <zomake.h>
#include <zoview.h>

int break_handler();

main()
{
char in,quit='n';
int i,LG[8],R[8],B[8];

ctrlbrk(break_handler);
for (i=1;i<=7;i++) {
LG[i]=7;
R[i]=4;
B[i]=0;
}
main_menu();
main_choices(LG,R,B);
do {
in=toupper(getch());
switch (in) {
case 'Q': {
LG[1]=0;
R[1]=15;
B[1]=15;
main_choices(LG,R,B);
quit_program();
quit=toupper(getch());
break;
}
case 'C': {
LG[2]=0;
R[2]=15;
B[2]=15;
main_choices(LG,R,B);
model_start(in);
break;
}
case 'E': {
LG[3]=0;
R[3]=15;
B[3]=15;
main_choices(LG,R,B);
model_start(in);
break;
}
case 'V': {
LG[4]=0;
R[4]=15;
B[4]=15;
main_choices(LG,R,B);
model_start(in);
break;
```

```
}
case 'P': {
LG[5]=0;
R[5]=15;
B[5]=15;
main_choices(LG,R,B);
model_start(in);
break;
}
case 'A': {
LG[6]=0;
R[6]=15;
B[6]=15;
main_choices(LG,R,B);
spawnl(P_WAIT,"zstruct.exe","zstruct.exe",NULL);
break;
}
case 'S': {
LG[7]=0;
R[7]=15;
B[7]=15;
reset_menu();
break;
}
}
for (i=1;i<=7;i++) {
LG[i]=7;
R[i]=4;
B[i]=0;
}
main_choices(LG,R,B);
clear_message();
} while (quit!='Y');
textbackground(BLACK);
textcolor(LIGHTGRAY);
clrscr();
printf("Tactile software by GMF.");
}
```

```
#include <stdio.h>
#include <conio.h>
#include <alloc.h>
#include <math.h>
#include <stdlib.h>
#include <dos.h>

#include <zoutput.h>
#include <zclear.h>
#include <zclrout.h>
#include <zbreak.h>
#include <zres.h>
#include <zmget.h>
#include <zoget.h>
#include <zopdef.h>
#include <zochoo.h>
#include <zolist.h>
#include <zfpdef.h>
#include <zonum.h>
#include <zostore.h>
#include <zoretrv.h>
#include <zostwo.h>
#include <zosurf.h>
#include <zoplus.h>
#include <zominus.h>
#include <zmemory.h>
#include <zmfree.h>

int break_handler();
int choose_label();
int list_object();


main()
{
int obj[202];
int i,j=0,which,list_length=0;


ctrlbrk(break_handler);
do {
clear_message();
do {
textbackground(GREEN);
textcolor(BLACK);
gotoxy(65,3);
cputs("(1)");
textbackground(BLUE);
textcolor(LIGHTGRAY);
cputs("  Exit");
textbackground(GREEN);
textcolor(BLACK);
gotoxy(65,5);
cputs("(2)");
```

```
textbackground(BLUE);
textcolor(LIGHTGRAY);
cputs("  List");
textbackground(GREEN);
textcolor(BLACK);
gotoxy(65,7);
cputs("(3)");
textbackground(BLUE);
textcolor(LIGHTGRAY);
cputs("  Label");
textbackground(GREEN);
textcolor(BLACK);
gotoxy(65,9);
cputs("(4)");
textbackground(BLUE);
textcolor(LIGHTGRAY);
cputs("  Resolution");
gotoxy(2,23);
textbackground(BLUE);
textcolor(WHITE);
cputs("Process or list labels: ");
textbackground(GREEN);
textcolor(BLACK);
cputs("(?)");
which=toupper(getch());
}
while (which<='1' && which>='5');
switch (which) {
case '1': return;
case '2': {
list_length=list_object(j);
if (list_length>10) j+=1;
else j=0;
break;
}
case '3': {
list_length=choose_object();
if (list_length!=0) {
for (i=1;i<=200;i++) obj[i]=' ';
get_object(obj,list_length);
Z_define(obj);
break;
}
case '4': {
edit_resolution();
break;
}
}
}
}
while (which!='1');
}
```

```
#include <stdio.h>
#include <alloc.h>
#include <math.h>
#include <conio.h>

#include <zoutput.h>
#include <zclear.h>
#include <zclrout.h>
#include <zbreak.h>
#include <zoftwo.h>
#include <zosurf.h>
#include <zmem3i.h>
#include <zfmem3i.h>

FILE *zvef;
FILE *zfirst;
FILE *zvertice;
FILE *zedge;
FILE *zface;
FILE *zgraphv;
FILE *zgraphe;
FILE *zgraphf;

struct space {
 long int label;
 int value;
 struct vertice *V;
};

struct slope {
 int d[3];
 double mag;
};

struct vertice {
 struct vertice *v;
 long int label;
 int coord[3];
 int kill;
 int num;
 struct edge **E;
};

struct face {
 struct face *f;
 long int label;
 int normal[3];
 int num;
 int way;
 int total;
 struct edge *E;
};

struct edge {
```

```
 struct edge *e;
 long int label;
 struct slope *S;
 int num;
 int kill[2];
 struct vertice **V;
 struct edge ***E;
 int t[2][2][2];
 struct face **F;
};

int break_handler();
int Z_normal();
int Z_diagonal();
int test_normal();
int test_coord();

struct space ***Z;
struct slope *S;
struct vertice *V,*Vv,*VNULL,*Vd,*V0,*V2,*VV;
struct edge *E,*Ee,*ENULL,*EE,*En,*en,*ee,*e1,*e2;
struct face *F,*Ff,*FNULL,*f1,*f2;
long int Zsize[3];
long int where,where1;
long int zlabel=0;
long int Zcore;
long int i,j,k;
int a,b,c;
int
t0,t1,t2,t3,t4,t5,t8,t01,t02,t12,t23,t24,t58,t68,t78,t59,t012;
int tt[2][2];
long int pos[3][3];
long int vef[2][3]={{-1,-1,-1},{0,0,0}};
int mask[3][3][3];
int x[3];
int A[3]={0,0,0};
int truth[10];
long int D[3],Dmin[3];
double Zres;
int liste;
long int count[2][3]={{0,0,0},{0,0,0}};
int vect[3];
double Emag;
int v[4][3];
int q;

main()
{
double array,base,denom,size[3]={3.0,3.0,3.0};
char n[40];

ctrlbrk(break_handler);
output_down();
cprintf("*****Vertice-Edge-Face.");
```

```
system("copy zmodels.c zfirst.c");
first_two();
zfirst=fopen("zfirst.c","r+");
fscanf(zfirst,"%ld %ld %ld ",&Dmin[0],&Dmin[1],&Dmin[2]);
fscanf(zfirst,"%ld %ld %ld %lf",&D[0],&D[1],&D[2],&Zres);
fseek(zfirst,2,SEEK_CUR);
where1=ftell(zfirst);
base=coreleft()/50.0;
denom=size[1]*size[2];
array=floor(base/denom);
gcvt(array,80,n);
Zcore=atol(n);
if (Zcore>D[0]) {
 Zsize[0]=D[0];
 denom=size[0]*size[2];
 array=floor(base/denom);
 gcvt(array,80,n);
 Zcore=atol(n);
 if (Zcore>D[1]) {
  Zsize[1]=D[1];
  denom=size[0]*size[1];
  array=floor(base/denom);
  gcvt(array,80,n);
  Zcore=atol(n);
  if (Zcore>D[2]) Zsize[2]=D[2];
  else Zsize[2]=Zcore;
 }
 else Zsize[1]=Zcore;
}
else Zsize[0]=Zcore;
Z=(struct space ***)malloc((unsigned)Zsize[0]*sizeof(struct space
**));
for (i=0;i<Zsize[0];i++) {
 Z[i]=(struct space **)malloc((unsigned)Zsize[1]*sizeof(struct
space *));
}
for (i=0;i<Zsize[0];i++) {
 for (j=0;j<Zsize[1];j++) {
  Z[i][j]=(struct space *)malloc((unsigned)Zsize[2]*sizeof(struct
space));
 }
}
output_down();
cprintf("[%ld][%ld][%ld] mem:
%u",Zsize[0],Zsize[1],Zsize[2],coreleft());
S=(struct slope *)malloc((unsigned)13*sizeof(struct slope));
En=(struct edge *)malloc((unsigned)5*sizeof(struct edge));
base=coreleft()/200.0;
array=floor(base);
gcvt(array,80,n);
Zcore=atol(n);
V=(struct vertice *)malloc((unsigned)Zcore*sizeof(struct
vertice));
for(i=0;i<Zcore;i++) {
```

```
 (V+i)->E=(struct edge **)malloc((unsigned)12*sizeof(struct edge
*));
}
VNULL=V;
VNULL->v=V;
VNULL->label=-1;
V+=1;
F=(struct face *)malloc((unsigned)Zcore*sizeof(struct face));
FNULL=F;
FNULL->f=F;
FNULL->label=-1;
F+=1;
E=(struct edge *)malloc((unsigned)Zcore*sizeof(struct edge));
for(i=0;i<Zcore;i++) {
 (E+i)->V=(struct vertice **)malloc((unsigned)2*sizeof(struct
vertice *));
}
for(i=0;i<Zcore;i++) {
 (E+i)->E=(struct edge ***)malloc((unsigned)2*sizeof(struct edge
**));
}
for(i=0;i<Zcore;i++) {
 for (j=0;j<2;j++) {
  (E+i)->E[j]=(struct edge **)malloc((unsigned)2*sizeof(struct
edge *));
 }
}
for(i=0;i<Zcore;i++) {
 (E+i)->F=(struct face **)malloc((unsigned)2*sizeof(struct face
*));
}
ENULL=E;
ENULL->e=E;
ENULL->label=-1;
E+=1;
output_down();
cprintf("[%ld],[%ld],[%ld] mem:
%u",Zcore,Zcore,Zcore,coreleft());
zvef=fopen("zvef.c","w+");
zvertice=fopen("zvertice.c","w+");
zedge=fopen("zedge.c","w+");
zface=fopen("zface.c","w+");
zgraphv=fopen("zgraphv.c","w+");
zgraphe=fopen("zgraphe.c","w+");
zgraphf=fopen("zgraphf.c","w+");
fprintf(zvef,"WINGED-EDGE DATA STRUCTURE.%c",10);
fprintf(zvef,"                    |");
fprintf(zvef,"
   |");
fprintf(zvef,"                %c",10);
fprintf(zvef,"                    |");
fprintf(zvef,"                                E
   |");
fprintf(zvef,"                %c",10);
```

```
fprintf(zvef,"        C             |");
fprintf(zvef,"         V               D---------------U                F
   |");
fprintf(zvef,"                     %c",10);
fprintf(zvef,"V    X Y Z      E   |");
fprintf(zvef,"E    D----U      L-------R        L-------R
L----R   |");
fprintf(zvef,"F    T    W    E%c",10);
fprintf(zvef,"..................|");
fprintf(zvef,"...................................................
.....|");
fprintf(zvef,"....................%c",10);
fprintf(zvertice,"VERTICE DATA STRUCTURE.%c",10);
fprintf(zvertice,"
        ");
fprintf(zvertice,"                              |%c",10);
fprintf(zvertice,"                    Coordinates
        ");
fprintf(zvertice,"                              |%c",10);
fprintf(zvertice,"Vertice   Pointer   (x,y,z)          #Edges
Edges     ");
fprintf(zvertice,"                              |%c",10);
fprintf(zvertice,"..................................................
.........");
fprintf(zvertice,"...........................|%c",10);
fprintf(zedge,"EDGE DATA STRUCTURE.%c",10);
fprintf(zedge,"                                        ");
fprintf(zedge,"                    Truth(Down)/Edge");
fprintf(zedge,"                                        |%c",10);
fprintf(zedge,"                 Slope                  ");
fprintf(zedge,"  Vertice              Down             ");
fprintf(zedge,"     Up                Face             |%c",10);
fprintf(zedge,"Edge      Pointer    %cx,%cy,%cz  #Faces
",238,238,238);
fprintf(zedge,"Down      Up        Left      Right     ");
fprintf(zedge,"Left      Right     Left      Right     |%c",10);
fprintf(zedge,".......................................");
fprintf(zedge,".......................................");
fprintf(zedge,".......................................|%c",10);
fprintf(zface,"FACE DATA STRUCTURE%c",10);
fprintf(zface,"                                        ");
fprintf(zface,"                  |%c",10);
fprintf(zface,"                Normal                  ");
fprintf(zface,"                  |%c",10);
fprintf(zface,"Face      Pointer    %cx,%cy,%cz  #Faces
",237,237,237);
fprintf(zface,"Way  Total  Edge       |%c",10);
fprintf(zface,".......................................");
fprintf(zface,".....................|%c",10);
output_down();
cprintf("         0              0              0
:Partial");
output_down();
cprintf("Vertices: 0       Edges: 0       Faces: 0       :Total");
```

```
output_down();
cprintf(" Z3:    0          0          0          %ld",D[2]);
output_down();
cprintf(" Z2:    0          0          0          %ld",D[1]);
output_down();
cprintf(" Z1:    0          0          0          %ld",D[0]);
output_down();
cprintf("Axis***Input*****Process***Output***Size");
for (i=0;i<3;i++) fprintf(zgraphv,"                         ");
for (i=0;i<3;i++) fprintf(zgraphe,"                         ");
for (i=0;i<3;i++) fprintf(zgraphf,"                         ");
make_S();
for (pos[0][0]=0;pos[0][0]<D[0]-1;pos[0][0]++) {
 for (pos[0][1]=0;pos[0][1]<D[1]-1;pos[0][1]++) {
  for (pos[0][2]=0;pos[0][2]<D[2]-1;pos[0][2]++) {
   for (pos[1][0]=0;pos[1][0]<Zsize[0];pos[1][0]++) {
    pos[2][0]=pos[0][0]+pos[1][0];
    for (pos[1][1]=0;pos[1][1]<Zsize[1];pos[1][1]++) {
     pos[2][1]=pos[0][1]+pos[1][1];
     for (pos[1][2]=0;pos[1][2]<Zsize[2];pos[1][2]++) {
      pos[2][2]=pos[0][2]+pos[1][2];
      if (pos[2][0]<D[0] && pos[2][1]<D[1] && pos[2][2]<D[2]) {

where=where1+(D[1]*(D[2]+2)+2)*pos[2][0]+(D[2]+2)*pos[2][1]+pos[2
][2];
       fseek(zfirst,where,SEEK_SET);
       (Z[pos[1][0]][pos[1][1]]+pos[1][2])->value=fgetc(zfirst);
       (Z[pos[1][0]][pos[1][1]]+pos[1][2])->label=0;
       (Z[pos[1][0]][pos[1][1]]+pos[1][2])->V=VNULL;
      }
      else (Z[pos[1][0]][pos[1][1]]+pos[1][2])->value='0';
      gotoxy(10,4);
      cprintf("%ld   ",pos[2][2]);
     }
     gotoxy(10,5);
     cprintf("%ld   ",pos[2][1]);
    }
    gotoxy(10,6);
    cprintf("%ld   ",pos[2][0]);
   }
   for (pos[1][0]=1;pos[1][0]<Zsize[0];pos[1][0]++) {
    pos[2][0]=pos[0][0]+pos[1][0];
    for (pos[1][1]=1;pos[1][1]<Zsize[1];pos[1][1]++) {
     pos[2][1]=pos[0][1]+pos[1][1];
     for (pos[1][2]=1;pos[1][2]<Zsize[2];pos[1][2]++) {
      pos[2][2]=pos[0][2]+pos[1][2];
      if (pos[2][0]<D[0]-1 && pos[2][1]<D[1]-1 &&
pos[2][2]<D[2]-1
       && (Z[pos[1][0]][pos[1][1]]+pos[1][2])->value>'1') {
       if ((Z[pos[1][0]][pos[1][1]]+pos[1][2])->value=='2') {
     increase_V();
     for (i=0;i<3;i++) Vv->coord[i]=pos[2][i];
     (Z[pos[1][0]][pos[1][1]]+pos[1][2])->V=Vv;
     (Z[pos[1][0]][pos[1][1]]+pos[1][2])->label=Vv->label;
```

```
        }
        Vd=(Z[pos[1][0]][pos[1][1]]+pos[1][2])->V;
        mask_search();
        (Z[pos[1][0]][pos[1][1]]+pos[1][2])->value='4';
       }
      gotoxy(20,4);
      cprintf("%ld   ",pos[2][2]);
     }
    gotoxy(20,5);
    cprintf("%ld   ",pos[2][1]);
   }
  gotoxy(20,6);
  cprintf("%ld   ",pos[2][0]);
  }
  z_out();
  if (pos[0][2]+Zsize[2]>D[2]-1
   && pos[0][1]+Zsize[1]>D[1]-1
   && pos[0][0]+Zsize[0]>D[0]-1) pos[0][2]=D[2];
  else pos[0][2]+=Zsize[2]-3;
 }
 if (pos[0][2]+Zsize[2]>D[2]-1
  && pos[0][1]+Zsize[1]>D[1]-1
  && pos[0][0]+Zsize[0]>D[0]-1) pos[0][1]=D[1];
 else pos[0][1]+=Zsize[1]-3;
}
if (pos[0][2]+Zsize[2]>D[2]-1
 && pos[0][1]+Zsize[1]>D[1]-1
 && pos[0][0]+Zsize[0]>D[0]-1) pos[0][0]=D[0];
else pos[0][0]+=Zsize[0]-3;
}
z_end();
output_down();
cprintf("     zvertice.c, zedge.c, zface.c");
output_down();
cprintf("Vertice, Edge, and Face data stored in files:");
output_down();
cprintf("Object may be viewed by executing program: zvel");
}

make_S()
{
struct slope *Si;
int d[13][3]={{1,0,0},{0,1,0},{0,0,1},{1,1,0},{1,0,1},{0,1,1},
{1,-1,0},{1,0,-1},{0,1,-1},{1,1,1},{1,1,-1},{1,-1,1},{1,-1,-1}};

for (i=0;i<13;i++) {
 Si=S+i;
 for (j=0;j<3;j++) Si->d[j]=d[i][j];
 Si->mag=0;
 for (j=0;j<3;j++) Si->mag+=d[i][j]*d[i][j];
 Si->mag=sqrt(Si->mag);
}
}
```

```
increase_V()
{
vef[0][0]+=1;
if (vef[0][0]>=Zcore-9) {
 perror("vertice liste too large.");
 exit(0);
}
Vv=V+vef[0][0];
Vv->v=Vv;
Vv->label=vef[0][0]+vef[1][0];
Vv->num=-1;
Vv->kill=0;
for (i=0;i<12;i++) Vv->E[i]=ENULL;
}

increase_F()
{
vef[0][2]+=1;
if (vef[0][2]>=Zcore-1) {
 perror("face liste too large.");
 exit(0);
}
Ff=F+vef[0][2];
Ff->f=Ff;
Ff->label=vef[0][2]+vef[1][2];
Ff->num=1;
Ff->total=0;
Ff->E=ENULL;
}

increase_E()
{
vef[0][1]+=1;
if (vef[0][1]>=Zcore-1) {
 perror("edge liste too large.");
 exit(0);
}
Ee=E+vef[0][1];
Ee->e=Ee;
Ee->label=vef[0][1]+vef[1][1];
Ee->num=0;
for (i=0;i<2;i++) {
 Ee->kill[i]=0;
 Ee->V[i]=VNULL;
 Ee->F[i]=FNULL;
 for (j=0;j<2;j++) {
  Ee->E[i][j]=ENULL;
  for (k=0;k<2;k++) Ee->t[i][j][k]=2;
 }
}
}

z_end()
{
```

```
rewind(zgraphv);
fprintf(zgraphv,"%ld %ld %ld %ld %lf",
count[0][0],Dmin[0],Dmin[1],Dmin[2],Zres);
rewind(zgraphe);
fprintf(zgraphe,"%ld %ld %ld %ld %lf",
count[0][1],Dmin[0],Dmin[1],Dmin[2],Zres);
rewind(zgraphf);
fprintf(zgraphf,"%ld %ld %ld %ld %lf",
count[0][2],Dmin[0],Dmin[1],Dmin[2],Zres);
fclose(zfirst);
fclose(zvertice);
fclose(zedge);
fclose(zface);
fclose(zgraphv);
fclose(zgraphe);
}

z_out()
{
i=-1;
j=-1;
k=-1;
do {
 fseek(zvef,0,SEEK_END);
 where=ftell(zvef);
 fprintf(zvef,"                        |");
 fprintf(zvef,"
    |");
 fprintf(zvef,"                         %c",10);
 if (i<vef[0][0]) {
  do {
   i+=1;
   Vv=V+i;
   if (Vv->num+1>Vv->kill) {
    fseek(zvef,where,SEEK_SET);
    fprintf(zvef,"%ld",Vv->label);
    fseek(zvef,where+5,SEEK_SET);
    fprintf(zvef,"%d %d
%d",Vv->coord[0],Vv->coord[1],Vv->coord[2]);
    fseek(zvef,where+15,SEEK_SET);
    fprintf(zvef,"%ld",Vv->E[0]->e->label);
    count[0][0]+=1;
    gotoxy(12,8);
    cprintf("%ld",count[0][0]);
   }
  }
  while (Vv->num<Vv->kill && i<vef[0][0]);
 }
 if (j<vef[0][1]) {
  do {
   j+=1;
   Ee=E+j;
   if (Ee->kill[0]==0 && Ee->kill[1]==0) {
    fseek(zvef,where+20,SEEK_SET);
```

```
    fprintf(zvef,"%ld",Ee->label);
    fseek(zvef,where+25,SEEK_SET);
    fprintf(zvef,"%ld",Ee->V[0]->label);
    fseek(zvef,where+30,SEEK_SET);
    fprintf(zvef,"%ld",Ee->V[1]->label);
    fseek(zvef,where+35,SEEK_SET);
    fprintf(zvef,"%d%d",Ee->t[0][0][0],Ee->t[0][0][1]);
    fseek(zvef,where+38,SEEK_SET);
    fprintf(zvef,"%ld",Ee->E[0][0]->e->label);
    fseek(zvef,where+43,SEEK_SET);
    fprintf(zvef,"%d%d",Ee->t[0][1][0],Ee->t[0][1][1]);
    fseek(zvef,where+46,SEEK_SET);
    fprintf(zvef,"%ld",Ee->E[0][1]->e->label);
    fseek(zvef,where+51,SEEK_SET);
    fprintf(zvef,"%d%d",Ee->t[1][0][0],Ee->t[1][0][1]);
    fseek(zvef,where+54,SEEK_SET);
    fprintf(zvef,"%ld",Ee->E[1][0]->e->label);
    fseek(zvef,where+59,SEEK_SET);
    fprintf(zvef,"%d%d",Ee->t[1][1][0],Ee->t[1][1][1]);
    fseek(zvef,where+62,SEEK_SET);
    fprintf(zvef,"%ld",Ee->E[1][1]->e->label);
    fseek(zvef,where+67,SEEK_SET);
    fprintf(zvef,"%ld",Ee->F[0]->f->label);
    fseek(zvef,where+72,SEEK_SET);
    fprintf(zvef,"%ld",Ee->F[1]->f->label);
    count[0][1]+=1;
    gotoxy(27,8);
    cprintf("%ld",count[0][1]);
   }
  }
  while ((Ee->kill[0]==1 || Ee->kill[1]==1) && j<vef[0][1]);
 }
 if (k<vef[0][2]) {
  do {
   k+=1;
   Ff=F+k;
   if (Ff==Ff->f) {
    fseek(zvef,where+77,SEEK_SET);
    fprintf(zvef,"%ld",Ff->label);
    fseek(zvef,where+82,SEEK_SET);
    fprintf(zvef,"%d",Ff->total);
    fseek(zvef,where+87,SEEK_SET);
    fprintf(zvef,"%d",Ff->way);
    fseek(zvef,where+92,SEEK_SET);
    fprintf(zvef,"%ld",Ff->E->e->label);
    count[0][2]+=1;
    gotoxy(42,8);
    cprintf("%ld",count[0][2]);
   }
  }
  while (Ff!=Ff->f && k<vef[0][2]);
 }
}
while (i<vef[0][0] || j<vef[0][1] || k<vef[0][2]);
```

```
fseek(zvertice,0,SEEK_END);
where=ftell(zvertice);
for (i=0;i<=vef[0][0];i++) {
 Vv=V+i;
 if (Vv) {
  fprintf(zvertice,"
       ");
  fprintf(zvertice,"                                           |%c",10);
  fseek(zvertice,where,SEEK_SET);
  fprintf(zvertice,"%ld",Vv->label);
  fseek(zvertice,where+10,SEEK_SET);
  fprintf(zvertice,"%ld",Vv->label);
  fseek(zvertice,where+20,SEEK_SET);
  for (j=0;j<3;j++) fprintf(zvertice,"%d ",Vv->coord[j]);
  fseek(zvertice,where+40,SEEK_SET);
  fprintf(zvertice,"%d",Vv->num+1-Vv->kill);
  fseek(zvertice,where+47,SEEK_SET);
  for (j=0;j<=Vv->num;j++)
   fprintf(zvertice,"%ld ",Vv->E[j]->label);
  where+=91;
  fseek(zvertice,0,SEEK_END);
  count[1][0]+=1;
  gotoxy(12,7);
  cprintf("%ld",count[1][0]);
 }
}
fseek(zgraphv,0,SEEK_END);
where=ftell(zgraphv);
for (i=0;i<=vef[0][0];i++) {
 Vv=V+i;
 if (Vv->num+1>Vv->kill) {
  for (j=0;j<2;j++) fprintf(zgraphv,"                                              ");
  fseek(zgraphv,where,SEEK_SET);
  fprintf(zgraphv,"%c%ld(%d %d %d)",10,
   Vv->label,Vv->coord[0],Vv->coord[1],Vv->coord[2]);
  where+=50;
  fseek(zgraphv,where,SEEK_SET);
 }
}
fseek(zedge,0,SEEK_END);
where=ftell(zedge);
for (i=0;i<=vef[0][1];i++) {
 Ee=E+i;
 if (Ee) {
  fprintf(zedge,"                                          ");
  fprintf(zedge,"                                          ");
  fprintf(zedge,"
|%c",10);
  fseek(zedge,where,SEEK_SET);
  fprintf(zedge,"%ld",Ee->label);
  fseek(zedge,where+10,SEEK_SET);
  fprintf(zedge,"%ld",Ee->e->label);
  fseek(zedge,where+20,SEEK_SET);
  for (j=0;j<3;j++) fprintf(zedge,"%d ",Ee->S->d[j]);
```

```
  fseek(zedge,where+30,SEEK_SET);
  fprintf(zedge,"%d",Ee->num);
  fseek(zedge,where+40,SEEK_SET);
  fprintf(zedge,"%ld",Ee->V[0]->label);
  fseek(zedge,where+50,SEEK_SET);
  fprintf(zedge,"%ld",Ee->V[1]->label);
  fseek(zedge,where+57,SEEK_SET);
  fprintf(zedge,"%d",Ee->t[0][0][0]);
  fprintf(zedge,"%d",Ee->t[0][0][1]);
  fseek(zedge,where+60,SEEK_SET);
  fprintf(zedge,"%ld",Ee->E[0][0]->e->label);
  fseek(zedge,where+67,SEEK_SET);
  fprintf(zedge,"%d",Ee->t[0][1][0]);
  fprintf(zedge,"%d",Ee->t[0][1][1]);
  fseek(zedge,where+70,SEEK_SET);
  fprintf(zedge,"%ld",Ee->E[0][1]->e->label);
  fseek(zedge,where+77,SEEK_SET);
  fprintf(zedge,"%d",Ee->t[1][0][0]);
  fprintf(zedge,"%d",Ee->t[1][0][1]);
  fseek(zedge,where+80,SEEK_SET);
  fprintf(zedge,"%ld",Ee->E[1][0]->e->label);
  fseek(zedge,where+87,SEEK_SET);
  fprintf(zedge,"%d",Ee->t[1][1][0]);
  fprintf(zedge,"%d",Ee->t[1][1][1]);
  fseek(zedge,where+90,SEEK_SET);
  fprintf(zedge,"%ld",Ee->E[1][1]->e->label);
  fseek(zedge,where+100,SEEK_SET);
  fprintf(zedge,"%ld",Ee->F[0]->f->label);
  fseek(zedge,where+110,SEEK_SET);
  fprintf(zedge,"%ld",Ee->F[1]->f->label);
  where+=124;
  fseek(zedge,0,SEEK_END);
  count[1][1]+=1;
  gotoxy(27,7);
  cprintf("%ld",count[1][1]);
 }
}
fseek(zgraphe,0,SEEK_END);
where=ftell(zgraphe);
for (i=0;i<=vef[0][1];i++) {
 Ee=E+i;
 if (Ee->kill[0]==0 && Ee->kill[1]==0) {
  for (j=0;j<3;j++) fprintf(zgraphe,"                                   ");
  fseek(zgraphe,where,SEEK_SET);
  fprintf(zgraphe,"%c%ld(%d %d %d):%ld(%d %d %d),%ld(%d %d
%d):",10,
   Ee->label,Ee->S->d[0],Ee->S->d[1],Ee->S->d[2],

Ee->V[0]->label,Ee->V[0]->coord[0],Ee->V[0]->coord[1],Ee->V[0]->c
oord[2],

Ee->V[1]->label,Ee->V[1]->coord[0],Ee->V[1]->coord[1],Ee->V[1]->c
oord[2]);
  where+=75;
```

```
  fseek(zgraphe,where,SEEK_SET);
 }
}
fseek(zface,0,SEEK_END);
where=ftell(zface);
for (i=0;i<=vef[0][2];i++) {
 Ff=F+i;
 if (Ff) {
  fprintf(zface,"                                                  ");
  fprintf(zface,"                                                 |%c",10);
  fseek(zface,where,SEEK_SET);
  fprintf(zface,"%ld",Ff->label);
  fseek(zface,where+10,SEEK_SET);
  fprintf(zface,"%ld",Ff->f->label);
  fseek(zface,where+20,SEEK_SET);
  for (j=0;j<3;j++) fprintf(zface,"%d ",Ff->normal[j]);
  fseek(zface,where+30,SEEK_SET);
  fprintf(zface,"%d",Ff->num);
  fseek(zface,where+40,SEEK_SET);
  fprintf(zface,"%d",Ff->way);
  fseek(zface,where+45,SEEK_SET);
  fprintf(zface,"%d",Ff->total);
  fseek(zface,where+52,SEEK_SET);
  fprintf(zface,"%ld",Ff->E->e->label);
  where+=66;
  fseek(zface,0,SEEK_END);
  count[1][2]+=1;
  gotoxy(42,7);
  cprintf("%ld",count[1][2]);
 }
}
fseek(zgraphf,0,SEEK_END);
where=ftell(zgraphf);
for (i=0;i<=vef[0][2];i++) {
 Ff=F+i;
 if (Ff==Ff->f) {
  fprintf(zgraphf,"%c%ld %d",10,Ff->label,Ff->total);
  Ee=Ff->E->e->e->e;
  t0=1;
  t1=Ff->way;
  for (j=0;j<Ff->total;j++) {
   fprintf(zgraphf,"%c",10);
   for (k=0;k<5;k++) {
    if (j+k<Ff->total) fprintf(zgraphf,"%ld(%d %d
%d):",Ee->V[t0]->label,

Ee->V[t0]->coord[0],Ee->V[t0]->coord[1],Ee->V[t0]->coord[2]);
    else {
     k=5;
     j=Ff->total;
    }
    t2=t0;
    t3=t1;
    t0=!Ee->t[t2][t3][0];
```

```
    if (t1!=Ee->t[t2][t3][1]) t1=!t1;
    Ee=Ee->E[t2][t3]->e->e->e;
   }
   j+=4;
  }
 }
}
}

mask_search()
{
struct slope *Sa;
int y[3],x01,x12,x20,y01,y12,y20,y02,y10,y21;

for (i=0;i<3;i++) {
 for (j=0;j<3;j++) {
  for (k=0;k<3;k++)

mask[i][j][k]=(Z[pos[1][0]+i-1][pos[1][1]+j-1]+pos[1][2]+k-1)->va
lue;
 }
}
for (a=0;a<3;a++) {
 Sa=S+a;
 for (i=0;i<3;i++) x[i]=1+Sa->d[i];
 for (i=0;i<3;i++) y[i]=1-Sa->d[i];
 x01=x[0]+Sa->d[1];
 x12=x[1]+Sa->d[2];
 x20=x[2]+Sa->d[0];
 y01=x[0]-Sa->d[1];
 y12=x[1]-Sa->d[2];
 y20=x[2]-Sa->d[0];
 y02=x[0]-Sa->d[2];
 y10=x[1]-Sa->d[0];
 y21=x[2]-Sa->d[1];
 if (mask[x[0]][x[1]][x[2]]>'1'
  && ((mask[x[1]][x[2]][x[0]]=='0' && mask[x01][x12][x20]=='0')
   || (mask[x[2]][x[0]][x[1]]=='0' && mask[x20][x01][x12]=='0')
   || (mask[y[1]][y[2]][y[0]]=='0' && mask[y01][y12][y20]=='0')
   || (mask[y[2]][y[0]][y[1]]=='0' && mask[y02][y10][y21]=='0')))
start_VEF();
}
for (a=3;a<9;a++) {
 Sa=S+a;
 x[0]=1+Sa->d[0];
 x[1]=1+Sa->d[1];
 x[2]=1+Sa->d[2];
 if (mask[x[0]][x[1]][x[2]]>'1'
  && ((Sa->d[0]!=0 && mask[x[0]][1][1]=='0')
   || (Sa->d[1]!=0 && mask[1][x[1]][1]=='0')
   || (Sa->d[2]!=0 && mask[1][1][x[2]]=='0'))) start_VEF();
}
for (a=9;a<13;a++) {
 Sa=S+a;
```

```
 x[0]=1+Sa->d[0];
 x[1]=1+Sa->d[1];
 x[2]=1+Sa->d[2];
 if (mask[x[0]][x[1]][x[2]]>'1') {
  if (!((mask[x[0]][1][1]!='0' && mask[1][x[1]][1]!='0'
   && mask[1][1][x[2]]!='0')
   || (mask[x[0]][x[1]][1]!='0' && mask[x[0]][1][x[2]]!='0'
   && mask[1][x[1]][x[2]]!='0')
   || (mask[x[0]][1][1]!='0' && mask[1][x[1]][x[2]]!='0')
   || (mask[1][x[1]][1]!='0' && mask[x[0]][1][x[2]]!='0')
   || (mask[1][1][x[2]]!='0' && mask[x[0]][x[1]][1]!='0')))
start_VEF();
 }
}
}

start_VEF()
{
Vd->num+=1;
increase_E();
Vd->E[Vd->num]=Ee;
Ee->V[0]=Vd;
Ee->S=S+a;
t0=0;
if (mask[x[0]][x[1]][x[2]]=='2') {
 increase_V();
 for (i=0;i<3;i++) Vv->coord[i]=pos[2][i]+Ee->S->d[i];
 Vv->num+=1;
 Vv->E[0]=Ee;
 Ee->V[1]=Vv;
 make_E();
 (Z[pos[1][0]+Ee->S->d[0]][pos[1][1]+Ee->S->d[1]]
  +pos[1][2]+Ee->S->d[2])->value='3';
 (Z[pos[1][0]+Ee->S->d[0]][pos[1][1]+Ee->S->d[1]]
  +pos[1][2]+Ee->S->d[2])->label=Vv->label;
 (Z[pos[1][0]+Ee->S->d[0]][pos[1][1]+Ee->S->d[1]]
  +pos[1][2]+Ee->S->d[2])->V=Vv;
}
else {
 Ee->V[1]
  =(Z[pos[1][0]+Ee->S->d[0]][pos[1][1]+Ee->S->d[1]]
  +pos[1][2]+Ee->S->d[2])->V;
 Ee->V[1]->num+=1;
 Ee->V[1]->E[Ee->V[1]->num]=Ee;
 make_E();
 t0=1;
 make_E();
}
}

make_E()
{
for (liste=0;liste<Ee->V[t0]->num;liste++) {
 if (Ee!=Ee->V[t0]->E[liste]) {
```

```
  if (t0==0) truth[0]=1;
  else truth[0]=-1;
  if (Ee->V[t0]==Ee->V[t0]->E[liste]->V[t0]) truth[1]=1;
  else truth[1]=-1;
  t01=(truth[0]*truth[1]!=1);
  for (i=0;i<3;i++)
vect[i]=Ee->S->d[i]-truth[1]*Ee->V[t0]->E[liste]->S->d[i];
  Emag=0;
  for (i=0;i<3;i++) Emag+=vect[i]*vect[i];
  Emag=sqrt(Emag);
  if (Emag>0 && Emag<2) {
   A[0]=Ee->S->d[1]*Ee->V[t0]->E[liste]->S->d[2]
    -Ee->S->d[2]*Ee->V[t0]->E[liste]->S->d[1];
   A[1]=Ee->S->d[2]*Ee->V[t0]->E[liste]->S->d[0]
    -Ee->S->d[0]*Ee->V[t0]->E[liste]->S->d[2];
   A[2]=Ee->S->d[0]*Ee->V[t0]->E[liste]->S->d[1]
    -Ee->S->d[1]*Ee->V[t0]->E[liste]->S->d[0];
   if (Z_in_out()) {
    t02=(truth[0]*truth[2]==1);
    t012=(truth[0]*truth[1]*truth[2]!=1);
    tt[0][0]=t01;
    tt[0][1]=t02;
    tt[1][0]=t0;
    tt[1][1]=t012;
    (En+0)->e=Ee->V[t0]->E[liste];
    (En+1)->e=Ee;
    (En+2)->e=Ee->V[t0]->E[liste]->e;
    (En+3)->e=Ee->e;
    k=0;
    for (i=0;i<2;i++) {
     for (j=0;j<2;j++) {
      en=En+j+k;
      en->e->E[tt[j][0]][tt[j][1]]=(En+!j+k)->e;
      en->e->t[tt[j][0]][tt[j][1]][0]=tt[!j][0];
      en->e->t[tt[j][0]][tt[j][1]][1]=tt[!j][1];
     }
     k=2;
    }
    if (t0==1 && (Z[pos[1][0]][pos[1][1]]+pos[1][2])->value=='3')
make_F();
   }
  }
 }
}
}

make_F()
{
increase_F();
Ff->E=Ee;
for (i=0;i<3;i++) Ff->normal[i]=A[i]*truth[2];
t12=(truth[1]*truth[2]==1);
Ff->way=t12;
Ee->F[t12]=Ff;
```

```
Ee->V[1]->E[liste]->F[!t12]=Ff;
t1=(truth[1]!=1);
t2=(truth[2]!=1);
if (Ee->V[1]->E[liste]->E[t1][t2]==Ee->E[0][!t2]) {
 if (Ee->V[1]->E[liste]->V[t1]==Ee->E[0][!t2]->V[t1]) truth[3]=1;
 else truth[3]=-1;
 Ff->total=3;
 t23=(truth[2]*truth[3]==1);
 Ee->E[0][!t2]->F[t23]=Ff;
 En->e=Ee;
 (En+1)->e=Ee->V[1]->E[liste];
 (En+2)->e=Ee->E[0][!t2];
 (En+3)->e=ENULL;
 number_EP();
}
else {
 if (Ee->V[0]==Ee->E[0][!t2]->V[0]) truth[3]=1;
 else truth[3]=-1;
 t3=(truth[3]!=1);
 t23=(truth[2]*truth[3]!=1);
 if (Ee->V[1]->E[liste]->E[t1][t2]==Ee->E[0][!t2]->E[!t3][t23]) {
  Ff->total=4;
  Ee->E[0][!t2]->F[t23]=Ff;
  if (Ee->E[0][!t2]->V[!t3]==Ee->E[0][!t2]->E[!t3][t23]->V[!t3])
   truth[4]=1;
  else truth[4]=-1;
  t24=(truth[2]*truth[4]!=1);
  Ee->E[0][!t2]->E[!t3][t23]->F[t24]=Ff;
  En->e=Ee;
  (En+1)->e=Ee->V[1]->E[liste];
  (En+2)->e=Ee->E[0][!t2];
  (En+3)->e=Ee->E[0][!t2]->E[!t3][t23];
  number_EP();
 }
}
}

number_EP()
{
en=En;
for (i=0;i<4;i++) {
 if (en->e!=ENULL) {
  en->e->num+=1;
  if (en->e->num==2) {
   if (en->e->F[0]->normal[0]==en->e->F[1]->normal[0]
    && en->e->F[0]->normal[1]==en->e->F[1]->normal[1]
    && en->e->F[0]->normal[2]==en->e->F[1]->normal[2]) {
    en->e->kill[0]=1;
    if (en->e->F[0]->f->f!=en->e->F[1]->f->f) {
     if (en->e->F[0]->f->f<en->e->F[1]->f->f) t5=0;
     else t5=1;
     f1=en->e->F[t5]->f->f;
     f2=en->e->F[!t5];
     for (j=0;j<2;j++) {
```

```
  if (j==0) truth[6]=1;
  else truth[6]=-1;
  switch_EF();
 }
 f1->E=f2->E;
 f1->way=f2->way;
 f1->num+=1;
 f1->total+=f2->f->total-2;
}
else {
 if (en->e->F[0]<en->e->F[1]) t5=0;
 else t5=1;
 f1=en->e->F[t5]->f->f;
 f2=en->e->F[!t5];
 for (j=0;j<2;j++) {
  if (en->e->E[j][0]!=en->e->E[j][1]) {
   if (j==0) truth[6]=1;
   else truth[6]=-1;
   switch_EF();
  }
 }
 f1->total-=2;
}
f2->f->f=f1;
f2->f=f1;
for (j=0;j<2;j++) {
 if (en->e->V[j]->num-en->e->V[j]->kill>=0) {
  en->e->V[j]->kill+=1;
  if (en->e->V[j]->num-en->e->V[j]->kill==1) {
   if (en->e->V[j]->E[0]->kill[0]==1
 || en->e->V[j]->E[0]->e->F[0]->f->f
 ==en->e->V[j]->E[0]->e->F[1]->f->f) {
 ee=ENULL;
 for (k=1;k<=en->e->V[j]->num;k++) {
  if (en->e->V[j]->E[k]->kill[0]==0
   && en->e->V[j]->E[k]->V[1]==en->e->V[j]
   && en->e->V[j]->E[k]->e->F[0]->f->f
   !=en->e->V[j]->E[k]->e->F[1]->f->f) {
   ee=en->e->V[j]->E[k];
   k=en->e->V[j]->num;
  }
 }
   }
   else ee=en->e->V[j]->E[0];
   if (ee!=ENULL && ee->E[1][0]==ee->E[1][1]
 && ee->e->F[0]->f->f!=ee->e->F[1]->f->f
 && ((ee->S->d[0]==ee->E[1][0]->S->d[0]
 && ee->S->d[1]==ee->E[1][0]->S->d[1]
 && ee->S->d[2]==ee->E[1][0]->S->d[2])
 || (ee->S->d[0]==-ee->E[1][0]->S->d[0]
 && ee->S->d[1]==-ee->E[1][0]->S->d[1]
 && ee->S->d[2]==-ee->E[1][0]->S->d[2]))) {
 e1=ee->e;
 e2=ee->E[1][0];
```

```
      en->e->V[j]->kill+=2;
      e1->V[1]=e2->V[1];
      e2->kill[1]=1;
      e2->e->e=e1;
      e2->e=e1;
      for (k=0;k<2;k++) {
       e1->E[1][k]=e2->E[1][k]->e->e;
       e1->t[1][k][0]=e2->t[1][k][0];
       e1->t[1][k][1]=e2->t[1][k][1];
       e1->F[k]->f->f->total-=1;
      }
        }
       }
      }
     }
    }
   }
  }
 en+=1;
}
}

switch_EF()
{
for (k=0;k<2;k++) {
 if (k==0) truth[7]=1;
 else truth[7]=-1;
 if (en->e->V[j]==en->e->E[j][k]->V[j]) truth[8]=1;
 else truth[8]=-1;
 t68=(truth[6]*truth[8]!=1);
 t78=(truth[7]*truth[8]==1);
 en->e->E[j][k]->E[t68][t78]=en->e->E[j][!k];
 en->e->E[j][k]->t[t68][t78][0]=en->e->t[j][!k][0];
 en->e->E[j][k]->t[t68][t78][1]=en->e->t[j][!k][1];
 en->e->E[j][k]->e->E[t68][t78]=en->e->E[j][!k]->e;
 en->e->E[j][k]->e->t[t68][t78][0]=en->e->t[j][!k][0];
 en->e->E[j][k]->e->t[t68][t78][1]=en->e->t[j][!k][1];
}
}

Z_in_out()
{
int dot=0;
int e[3];
double Amag=0;

q=0;
for (i=0;i<3;i++) dot+=Ee->S->d[i]*Ee->V[t0]->E[liste]->S->d[i];
if (dot==0) {
 V0=Ee->V[t0];
 if (Ee->S->mag==Ee->V[t0]->E[liste]->S->mag) {
  for (i=0;i<3;i++) {
   if (Ee->S->d[i]!=0) v[0][i]=Ee->V[!t0]->coord[i];
   else v[0][i]=Ee->V[t0]->E[liste]->V[!t01]->coord[i];
```

```
   }
   return Z_normal();
  }
  if (Ee->S->mag>Ee->V[t0]->E[liste]->S->mag) {
   V2=Ee->V[t0]->E[liste]->V[!t01];
   EE=Ee;
   VV=EE->V[!t0];
   find_points();
   return Z_diagonal();
  }
  V2=Ee->V[!t0];
  EE=Ee->V[t0]->E[liste];
  VV=EE->V[!t01];
  find_points();
  return Z_diagonal();
 }
 for (i=0;i<3;i++) Amag+=A[i]*A[i];
 Amag=sqrt(Amag);
 if (Ee->S->mag==Ee->V[t0]->E[liste]->S->mag) {
  for (i=0;i<3;i++) {
   if (!test_coord()) {
    v[0][i]=Ee->V[!t0]->coord[i];
    v[1][i]=v[0][i];
   }
   else {
    v[0][i]=Ee->V[t0]->coord[i];
    if (Ee->S->d[i]!=0) v[1][i]=Ee->V[!t0]->coord[i];
    else if (Ee->V[t0]->E[liste]->S->d[i]!=0)
     v[1][i]=Ee->V[t0]->E[liste]->V[!t01]->coord[i];
   }
   e[i]=v[0][i]-Ee->V[t0]->coord[i];
   q+=A[i]*e[i];
  }
  if (q==1) {
   if ((Z[v[0][0]][v[0][1]]+v[0][2])->value=='0') truth[2]=1;
   else truth[2]=-1;
   if ((Z[Ee->V[!t0]->coord[0]-e[0]][Ee->V[!t0]->coord[1]-e[1]]
    +Ee->V[!t0]->coord[2]-e[2])->value>'0'
    || (Z[Ee->V[t0]->E[liste]->V[!t01]->coord[0]-e[0]]
    [Ee->V[t0]->E[liste]->V[!t01]->coord[1]-e[1]]
    +Ee->V[t0]->E[liste]->V[!t01]->coord[2]-e[2])->value>'0'
    || (Z[v[1][0]][v[1][1]]+v[1][2])->value>'0'
    || (Z[v[1][0]-e[0]][v[1][1]-e[1]]+v[1][2]-e[2])->value>'0') {
    if (truth[2]==1) return 1;
   }
   else if (truth[2]==-1) return 1;
  }
  else if (q==-1) {
   if ((Z[v[0][0]][v[0][1]]+v[0][2])->value=='0') truth[2]=-1;
   else truth[2]=1;
   if (((Z[Ee->V[!t0]->coord[0]-e[0]][Ee->V[!t0]->coord[1]-e[1]]
    +Ee->V[!t0]->coord[2]-e[2])->value>'0'
    || (Z[Ee->V[t0]->E[liste]->V[!t01]->coord[0]-e[0]]
    [Ee->V[t0]->E[liste]->V[!t01]->coord[1]-e[1]]
```

```
    +Ee->V[t0]->E[liste]->V[!t01]->coord[2]-e[2])->value>'0'
    || (Z[v[1][0]][v[1][1]]+v[1][2])->value>'0'
    || (Z[v[1][0]-e[0]][v[1][1]-e[1]]+v[1][2]-e[2])->value>'0')) {
    if (truth[2]==-1) return 1;
   }
   else if (truth[2]==1) return 1;
  }
  return 0;
 }
 if (Ee->S->mag>Ee->V[t0]->E[liste]->S->mag) {
  V0=Ee->V[t0]->E[liste]->V[!t01];
  if (Ee->V[t0]->E[liste]->S->mag==Amag) {
   if (Amag==1.0) {
    for (i=0;i<3;i++) {
     if (test_coord()) v[0][i]=Ee->V[!t0]->coord[i];
     else v[0][i]=Ee->V[t0]->coord[i];
    }
    return Z_normal();
   }
   V2=Ee->V[!t0];
   EE=Ee->V[t0]->E[liste];
   VV=Ee->V[t0];
   find_points();
   return Z_diagonal();
  }
  V2=Ee->V[t0]->E[liste]->V[t01];
  EE=ENULL;
  VV=Ee->V[!t0];
  find_points();
  return Z_diagonal();
 }
 V0=Ee->V[!t0];
 if (Ee->S->mag==Amag) {
  if (Amag==1.0) {
   for (i=0;i<3;i++) {
    if (test_coord())
 v[0][i]=Ee->V[t0]->E[liste]->V[!t01]->coord[i];
    else v[0][i]=Ee->V[t0]->coord[i];
   }
   return Z_normal();
  }
  V2=Ee->V[t0]->E[liste]->V[!t01];
  EE=Ee;
  VV=Ee->V[t0];
  find_points();
  return Z_diagonal();
 }
 V2=Ee->V[t0];
 EE=ENULL;
 VV=Ee->V[t0]->E[liste]->V[!t01];
 find_points();
 return Z_diagonal();
 }
```

```
Z_normal()
{
q=1;
if (test_normal()) truth[2]=-1;
else truth[2]=1;
q=-1;
if (test_normal()) { if (truth[2]==1) return 1; }
else if (truth[2]==-1) return 1;
return 0;
}

int test_normal()
{
return ((Z[Ee->V[0]->coord[0]+q*A[0]][Ee->V[0]->coord[1]+q*A[1]]
 +Ee->V[0]->coord[2]+q*A[2])->value>'0'
 || (Z[Ee->V[1]->coord[0]+q*A[0]][Ee->V[1]->coord[1]+q*A[1]]
 +Ee->V[1]->coord[2]+q*A[2])->value>'0'
 || (Z[Ee->V[t0]->E[liste]->V[!t01]->coord[0]+q*A[0]]
 [Ee->V[t0]->E[liste]->V[!t01]->coord[1]+q*A[1]]
 +Ee->V[t0]->E[liste]->V[!t01]->coord[2]+q*A[2])->value>'0'
 ||
(Z[v[0][0]+q*A[0]][v[0][1]+q*A[1]]+v[0][2]+q*A[2])->value>'0');
}

Z_diagonal()
{
if (q==1) {
 if ((Z[v[0][0]][v[0][1]]+v[0][2])->value>'0'
  || (Z[v[2][0]][v[2][1]]+v[2][2])->value>'0') truth[2]=-1;
 else truth[2]=1;
 if ((Z[v[1][0]][v[1][1]]+v[1][2])->value>'0'
  || (Z[v[3][0]][v[3][1]]+v[3][2])->value>'0') { if (truth[2]==1)
return 1; }
 else if (truth[2]==-1) return 1;
}
else if (q==-1) {
 if ((Z[v[0][0]][v[0][1]]+v[0][2])->value=='0'
  && (Z[v[2][0]][v[2][1]]+v[2][2])->value=='0') truth[2]=-1;
 else truth[2]=1;
 if ((Z[v[1][0]][v[1][1]]+v[1][2])->value=='0'
  && (Z[v[3][0]][v[3][1]]+v[3][2])->value=='0') { if
(truth[2]==1) return 1; }
 else if (truth[2]==-1) return 1;
}
return 0;
}

find_points()
{
j=0;
for (i=0;i<3;i++) {
 v[0][i]=V0->coord[i];
 v[1][i]=v[0][i];
 v[2][i]=V2->coord[i];
```

```
 v[3][i]=v[2][i];
 if ((EE!=ENULL && EE->S->d[i]!=0) || (EE==ENULL &&
test_coord())) {
  v[j][i]=VV->coord[i];
  v[j+2][i]=v[j][i];
  j+=1;
 }
 q+=(v[0][i]-Ee->V[t0]->coord[i])*A[i];
}
}

int test_coord()
{ return
(Ee->V[!t0]->coord[i]!=Ee->V[t0]->E[liste]->V[!t01]->coord[i]); }
```

```
#include <stdio.h>
#include <conio.h>
#include <math.h>
#include <stdlib.h>
#include <alloc.h>
#include <graphics.h>

#include <zgbreak.h>
#include <zxpview.h>
#include <zgraph.h>
#include <zaxis.h>
#include <zstand.h>

int break_handler();

main()
{
float T[5][5];
int i,j;

ctrlbrk(break_handler);
for (i=1;i<=4;i++) {
for (j=1;j<=4;j++) {
T[i][j]=0;
if (i==j) T[i][j]=1;
}
}
view_stand(T);
P_graph_test(T);
}
```

```
#include <stdio.h>
#include <conio.h>
#include <math.h>
#include <stdlib.h>
#include <alloc.h>
#include <graphics.h>

#include <zgbreak.h>
#include <zxaview.h>
#include <zgraph.h>
#include <zaxis.h>
#include <zstand.h>

int break_handler();

main()
{
float T[5][5];
int i,j;

ctrlbrk(break_handler);
for (i=1;i<=4;i++) {
for (j=1;j<=4;j++) {
T[i][j]=0;
if (i==j) T[i][j]=1;
}
}
view_stand(T);
A_graph_test(T);
}
```

```
#include <stdio.h>
#include <conio.h>
#include <math.h>
#include <stdlib.h>
#include <alloc.h>
#include <graphics.h>
#include <dos.h>

#include <zgbreak.h>
#include <zxzview.h>
#include <zzaxis.h>
#include <zvoxel.h>
#include <zgraph.h>
#include <zstand.h>

int break_handler();

main()
{
float T[5][5];
int i,j;

ctrlbrk(break_handler);
for (i=1;i<=4;i++) {
for (j=1;j<=4;j++) {
T[i][j]=0;
if (i==j) T[i][j]=1;
}
}
view_stand(T);
Z_graph_test(T);
}
```

```
#include <stdio.h>
#include <conio.h>
#include <math.h>
#include <stdlib.h>
#include <alloc.h>
#include <graphics.h>

#include <zgbreak.h>
#include <zxapview.h>
#include <zgraph.h>
#include <zaxis.h>
#include <zstand.h>

int break_handler();

main()
{
float T[5][5];
int i,j;

ctrlbrk(break_handler);
for (i=1;i<=4;i++) {
for (j=1;j<=4;j++) {
T[i][j]=0;
if (i==j) T[i][j]=1;
}
}
view_stand(T);
AP_graph_test(T);
}
```

```
#include <stdio.h>
#include <conio.h>
#include <math.h>
#include <stdlib.h>
#include <alloc.h>
#include <graphics.h>

#include <zgbreak.h>
#include <zxapzvw.h>
#include <zgraph.h>
#include <zaxis.h>
#include <zstand.h>
#include <zxvoxel.h>

int break_handler();

main()
{
float T[5][5];
int i,j;

ctrlbrk(break_handler);
for (i=1;i<=4;i++) {
for (j=1;j<=4;j++) {
T[i][j]=0;
if (i==j) T[i][j]=1;
}
}
view_stand(T);
APZ_graph_test(T);
}
```

```
#include <stdio.h>
#include <conio.h>
#include <math.h>
#include <stdlib.h>
#include <alloc.h>
#include <graphics.h>

#include <zgbreak.h>
#include <zzzview.h>
#include <zzaxis.h>
#include <zvoxel.h>
#include <zgraph.h>
#include <zstand.h>
#include <zgrmem.h>
#include <zgrfree.h>

int break_handler();

main()
{
float T[5][5];
int i,j;

ctrlbrk(break_handler);
for (i=1;i<=4;i++) {
for (j=1;j<=4;j++) {
T[i][j]=0;
if (i==j) T[i][j]=1;
}
}
view_stand(T);
Z_graph_test(T);
}
```

```
#include <stdio.h>
#include <conio.h>
#include <math.h>
#include <alloc.h>
#include <dos.h>
#include <graphics.h>

#include <zgbreak.h>
#include <zev1.h>
#include <zgraph.h>
#include <zstand.h>

int break_handler();

main()
{
float T[5][5];
int i,j;

ctrlbrk(break_handler);
for (i=1;i<=4;i++) {
for (j=1;j<=4;j++) {
T[i][j]=0;
if (i==j) T[i][j]=1;
}
}
view_stand(T);
VE_graph_test(T);
}
```

```
0.200000                                  E_RESOLUTION
0.500000                                  Z_RESOLUTION
```

```
/* za1.h */

float enter_A1()
{
float a1;

textbackground(BLACK);
textcolor(WHITE);
gotoxy(1,25);
cputs("A1=
     ");
gotoxy(4,25);
cscanf("%f",&a1);
return a1;
}
```

```
/* za2.h */

float enter_A2()
{
float a2;

textbackground(BLACK);
textcolor(WHITE);
gotoxy(1,25);
cputs("A2=
     ");
gotoxy(4,25);
cscanf("%f",&a2);
return a2;
}
```

```
/* za3.h */

float enter_A3()
{
float a3;

textbackground(BLACK);
textcolor(WHITE);
gotoxy(1,25);
cputs("A3=
      ");
gotoxy(4,25);
cscanf("%f",&a3);
return a3;
}
```

```
/* zaxis.h */

graph_axis(float T[5][5])
{
float V[6];
int VV1,VV2;
int k,l;
char n[80],*m;

for (k=1;k<=3;k++) {
for (l=1;l<=5;l++) V[l]=0;
V[k]=1.5;
graph_V12(V,T);
V[4]=floor(V[4]);
V[5]=floor(V[5]);
gcvt(V[4],80,n);
VV1=atoi(n);
gcvt(V[5],80,n);
VV2=atoi(n);
if (k==1) m="X";
else if (k==2) m="Y";
else m="Z";
line(320,180,VV1,VV2);
outtextxy(VV1,VV2,m);
}
}
```

```
/* zbox.h */

float enter_A1();
float enter_A2();
float enter_A3();

box_values(float *A)
{
clear_message();
textbackground(BLUE);
textcolor(WHITE);
gotoxy(2,23);
cputs("Enter box dimensions ");
textbackground(GREEN);
textcolor(BLACK);
cputs("A1?");
textbackground(BLACK);
textcolor(WHITE);
gotoxy(65,3);
cputs("Box             ");
gotoxy(65,5);
cputs("(A1,A2,A3)      ");
A[1]=enter_A1();
gotoxy(23,23);
textbackground(GREEN);
textcolor(BLACK);
cputs("A2");
A[2]=enter_A2();
gotoxy(23,23);
textbackground(GREEN);
textcolor(BLACK);
cputs("A3");
A[3]=enter_A3();
output_down();
output_down();
cprintf("Box     : A1=%12.3f,  A2=%12.3f,
A3=%12.3f",A[1],A[2],A[3]);
}
```

```
/* zbreak.h */

break_handler()
{
fcloseall();
gotoxy(1,25);
printf("CTRL-BRK pressed. ");
printf("Process terminated. Files closed. ");
textcolor(BLACK);
textbackground(RED);
cprintf("Strike any key .....");
getch();
return 0;
}
```

```
/* zchoices.h */

main_choices(int LG[8], int R[8], int B[8])
{
gotoxy(1,1);
textbackground(LIGHTGRAY);
cputs("   ");
textbackground(LG[1]);
textcolor(R[1]);
cputs("Q");
textcolor(B[1]);
cputs("UIT");
textbackground(LIGHTGRAY);
cputs("   ");
textbackground(LG[2]);
textcolor(R[2]);
cputs("C");
textcolor(B[2]);
cputs("REATE");
textbackground(LIGHTGRAY);
cputs("   ");
textbackground(LG[3]);
textcolor(R[3]);
cputs("E");
textcolor(B[3]);
cputs("DIT");
textbackground(LIGHTGRAY);
cputs("   ");
textbackground(LG[4]);
textcolor(R[4]);
cputs("V");
textcolor(B[4]);
cputs("IEW");
textbackground(LIGHTGRAY);
cputs("   ");
textbackground(LG[5]);
textcolor(R[5]);
cputs("P");
textcolor(B[5]);
cputs("ROCESS");
textbackground(LIGHTGRAY);
cputs("   ");
textbackground(LG[6]);
textcolor(R[6]);
cputs("A");
textcolor(B[6]);
cputs("NALYZE");
textbackground(LIGHTGRAY);
cputs("   ");
textbackground(LG[7]);
textcolor(R[7]);
cputs("S");
textcolor(B[7]);
cputs("CREEN                          ");
}
```

```
/* zclear.h */

clear_message()
{
textbackground(BLUE);
gotoxy(65,3);
cputs("              ");
gotoxy(65,3);
cputs("              ");
gotoxy(65,5);
cputs("              ");
gotoxy(65,7);
cputs("              ");
gotoxy(65,9);
cputs("              ");
gotoxy(65,11);
cputs("              ");
gotoxy(65,13);
cputs("              ");
gotoxy(65,15);
cputs("              ");
gotoxy(65,17);
cputs("              ");
gotoxy(65,19);
cputs("              ");
gotoxy(65,21);
cputs("              ");
gotoxy(2,23);
cputs("                                            ");
cputs("                                            ");
textbackground(BLACK);
gotoxy(1,25);
cputs("                                            ");
cputs("                                            ");
}
```

```
/* zclrout.h */

clear_output()
{
textbackground(BLUE);
gotoxy(2,3);
cputs("                                        ");
cputs("                                        ");
gotoxy(2,3);
}
```

```
/* zcone.h */

float enter_A1();
float enter_A3();

cone_values(float *A)
{
clear_message();
textbackground(BLUE);
textcolor(WHITE);
gotoxy(2,23);
cputs("Enter cone dimensions ");
textbackground(GREEN);
textcolor(BLACK);
cputs("A1?");
textbackground(BLACK);
textcolor(WHITE);
gotoxy(65,3);
cputs("Cone             ");
gotoxy(65,5);
cputs("(A1=A2,A3)       ");
A[1]=enter_A1();
A[2]=A[1];
gotoxy(24,23);
textbackground(GREEN);
textcolor(BLACK);
cputs("A3");
A[3]=enter_A3();
output_down();
output_down();
cprintf("Cone    : A1=%12.3f,  A2=%12.3f,
A3=%12.3f",A[1],A[2],A[3]);
}
```

```
/* zcube.h */

float enter_A1();

cube_values(float *A)
{
clear_message();
textbackground(BLUE);
textcolor(WHITE);
gotoxy(2,23);
cputs("Enter cube dimension ");
textbackground(GREEN);
textcolor(BLACK);
cputs("A1?");
textbackground(BLACK);
textcolor(WHITE);
gotoxy(65,3);
cputs("Cube            ");
gotoxy(65,5);
cputs("(A1=A2=A3)      ");
A[1]=enter_A1();
A[2]=A[1];
A[3]=A[1];
output_down();
output_down();
cprintf("Cube    : A1=%12.3f,  A2=%12.3f,
A3=%12.3f",A[1],A[2],A[3]);
}
```

```
/* zcylind.h */

float enter_A1();
float enter_A3();

cylinder_values(float *A)
{
clear_message();
textbackground(BLUE);
textcolor(WHITE);
gotoxy(2,23);
cputs("Enter cylinder dimensions ");
textbackground(GREEN);
textcolor(BLACK);
cputs("A1?");
textbackground(BLACK);
textcolor(WHITE);
gotoxy(65,3);
cputs("Cylinder        ");
gotoxy(65,5);
cputs("(A1=A2,A3)      ");
A[1]=enter_A1();
A[2]=A[1];
gotoxy(28,23);
textbackground(GREEN);
textcolor(BLACK);
cputs("A3");
A[3]=enter_A3();
output_down();
output_down();
cprintf("Cylinder: A1=%12.3f,  A2=%12.3f,
A3=%12.3f",A[1],A[2],A[3]);
}
```

```
/* zdim.h */

dimension_model(float *A)
{
int which;

clear_message();
do {
gotoxy(65,3);
textbackground(GREEN);
textcolor(BLACK);
cputs("(1)");
textbackground(BLUE);
textcolor(LIGHTGRAY);
cputs("  Exit");
gotoxy(65,5);
textbackground(GREEN);
textcolor(BLACK);
cputs("(2)");
textbackground(BLUE);
textcolor(LIGHTGRAY);
cputs("  Cube");
gotoxy(65,7);
textbackground(GREEN);
textcolor(BLACK);
cputs("(3)");
textbackground(BLUE);
textcolor(LIGHTGRAY);
cputs("  Box");
gotoxy(65,9);
textbackground(GREEN);
textcolor(BLACK);
cputs("(4)");
textbackground(BLUE);
textcolor(LIGHTGRAY);
cputs("  Cylinder");
gotoxy(65,11);
textbackground(GREEN);
textcolor(BLACK);
cputs("(5)");
textbackground(BLUE);
textcolor(LIGHTGRAY);
cputs("  Sphere");
gotoxy(65,13);
textbackground(GREEN);
textcolor(BLACK);
cputs("(6)");
textbackground(BLUE);
textcolor(LIGHTGRAY);
cputs("  Cone");
textcolor(WHITE);
gotoxy(2,23);
cputs("Enter model number: ");
textbackground(GREEN);
```

```
textcolor(BLACK);
cputs("(?)");
which=toupper(getch());
switch (which) {
case '1': {
A[1]=-1;
return;
}
case '2': {
cube_values(A);
A[4]=2;
break;
}
case '3': {
box_values(A);
A[4]=3;
break;
}
case '4': {
cylinder_values(A);
A[4]=4;
break;
}
case '5': {
sphere_values(A);
A[4]=5;
break;
}
case '6': {
cone_values(A);
A[4]=6;
break;
}
}
}
while (which<='0' || which>='7');
}
```

```
/* zev1.h */

FILE *zgraphv;
FILE *zgraphe;
FILE *zgraphf;

VE_graph_test(float T[5][5])
{
int **VV,**EE,FF[2][3];
long int num;
long int count=0;
long int length;
long int DDmin[4];
float V[6],time;
int VV1,VV2,VV3,VV4;
int i,ii,iii,j,jj;
long int x,y;
int a,b,c;
long int where=0;
double array;
double Z_res;
char n[80];
int g_driver,g_mode,g_error;

detectgraph(&g_driver,&g_mode);
if (g_driver<0) {
printf("No graphics driver #%d, mode #%d\n",g_driver,g_mode);
exit(1);
}
initgraph(&g_driver,&g_mode,"");
g_error=graphresult();
if (g_error<0) {
printf("Initgraph error: %s.\n",grapherrormsg(g_error));
exit(1);
}
setbkcolor(BLACK);
zgraphv=fopen("zgraphv.c","r");
rewind(zgraphv);
fscanf(zgraphv,"%ld %ld %ld %ld
%lf",&num,&DDmin[1],&DDmin[2],&DDmin[3],&Z_res);
T[4][4]=Z_res;
array=floor(coreleft()/100);
gcvt(array,80,n);
length=atol(n);
if (length>num) length=num;
VV=(int **) malloc((unsigned) length*sizeof(int*));
if (!VV) {
perror("allocation failure 1 in VV()");
exit(1);
}
VV-=1;
for (i=1;i<=length;i++) {
VV[i]=(int *) malloc((unsigned) 3*sizeof(int));
if (!VV[i]) {
```

```
perror("allocation failure 2 in VV()");
exit(1);
}
VV[i]-=1;
}
setcolor(GREEN);
for (i=1;i<=num;i++) {
for (ii=1;ii<=length;ii++) {
iii=ii+i-1;
if (iii<=num) {
where+=50;
fseek(zgraphv,where+2,SEEK_SET);
fscanf(zgraphv,"%ld(%d %d
%d)",&count,&VV[ii][1],&VV[ii][2],&VV[ii][3]);
}
}
for (ii=1;ii<=length;ii++) {
iii=ii+i-1;
if (iii<=num) {
V[1]=(VV[ii][1]+DDmin[1]-1.5)*Z_res;
V[2]=(VV[ii][2]+DDmin[2]-1.5)*Z_res;
V[3]=(VV[ii][3]+DDmin[3]-1.5)*Z_res;
graph_V12(V,T);
V[4]=floor(V[4]);
V[5]=floor(V[5]);
gcvt(V[4],80,n);
VV1=atoi(n);
gcvt(V[5],80,n);
VV2=atoi(n);
circle(VV1,VV2,4);
}
}
i+=length-1;
}
getch();
fclose(zgraphv);
zgraphf=fopen("zgraphf.c","r");
rewind(zgraphf);
fscanf(zgraphf,"%ld %ld %ld %ld
%lf",&num,&DDmin[1],&DDmin[2],&DDmin[3],&Z_res);
T[4][4]=Z_res;
fseek(zgraphf,75,SEEK_SET);
for (i=1;i<=num;i++) {
fseek(zgraphf,2,SEEK_CUR);
fscanf(zgraphf,"%ld %d",&count,&length);
where=ftell(zgraphf);
setcolor(RED);
for (ii=0;ii<2;ii++) {
fseek(zgraphf,where+2,SEEK_SET);
fscanf(zgraphf,"%ld(%d %d
%d):",&count,&FF[0][0],&FF[0][1],&FF[0][2]);
a=FF[0][0];
b=FF[0][1];
c=FF[0][2];
```

```
jj=0;
for (iii=0;iii<length;iii++) (
if (iii==length-1) (
if(jj==5) (
jj=0;
fseek(zgraphf,2,SEEK_CUR);
)
jj+=1;
FF[1][0]=a;
FF[1][1]=b;
FF[1][2]=c;
)
else fscanf(zgraphf,"%ld(%d %d
%d):",&count,&FF[1][0],&FF[1][1],&FF[1][2]);
for (j=1;j<=5;j++) V[j]=0;
V[1]=(FF[0][0]+DDmin[1]-1.5)*Z_res;
V[2]=(FF[0][1]+DDmin[2]-1.5)*Z_res;
V[3]=(FF[0][2]+DDmin[3]-1.5)*Z_res;
graph_V12(V,T);
V[4]=floor(V[4]);
V[5]=floor(V[5]);
gcvt(V[4],80,n);
VV1=atoi(n);
gcvt(V[5],80,n);
VV2=atoi(n);
V[1]=(FF[1][0]+DDmin[1]-1.5)*Z_res;
V[2]=(FF[1][1]+DDmin[2]-1.5)*Z_res;
V[3]=(FF[1][2]+DDmin[3]-1.5)*Z_res;
graph_V12(V,T);
V[4]=floor(V[4]);
V[5]=floor(V[5]);
gcvt(V[4],80,n);
VV3=atoi(n);
gcvt(V[5],80,n);
VV4=atoi(n);
line(VV1,VV2,VV3,VV4);
for (j=0;j<3;j++) FF[0][j]=FF[1][j];
for (time=0;time<700;time+=.01);
}
setcolor(BLUE);
if (ii==0) for (time=0;time<700;time+=.01);
)
}
getch();
fclose(zgraphf);
zgraphe=fopen("zgraphe.c","r");
rewind(zgraphe);
fscanf(zgraphe,"%ld %ld %ld %ld
%lf",&num,&DDmin[1],&DDmin[2],&DDmin[3],&Z_res);
T[4][4]=Z_res;
array=floor(coreleft()/100);
gcvt(array,80,n);
length=atol(n);
if (length>num) length=num;
```

```
EE=(int **) malloc((unsigned) length*sizeof(int*));
if (!EE) {
perror("allocation failure 1 in EE()");
exit(1);
}
EE-=1;
for (i=1;i<=length;i++) {
EE[i]=(int *) malloc((unsigned) 6*sizeof(int));
if (!EE[i]) {
perror("allocation failure 2 in EE()");
exit(1);
}
EE[i]-=1;
}
where=0;
setcolor(WHITE);
for (i=1;i<=num;i++) {
for (ii=1;ii<=length;ii++) {
iii=ii+i-1;
if (iii<=num) {
where+=75;
fseek(zgraphe,where+2,SEEK_SET);
fscanf(zgraphe,"%ld(%d %d %d):%ld(%d %d %d),%ld(%d %d
%d",&count,&a,&b,&c,&x,&EE[ii][1],&EE[ii][2],&EE[ii][3],&y,&EE[ii
][4],&EE[ii][5],&EE[ii][6]);
}
}
for (ii=1;ii<=length;ii++) {
iii=ii+i-1;
if (iii<=num) {
for (j=1;j<=5;j++) V[j]=0;
V[1]=(EE[ii][1]+DDmin[1]-1.5)*Z_res;
V[2]=(EE[ii][2]+DDmin[2]-1.5)*Z_res;
V[3]=(EE[ii][3]+DDmin[3]-1.5)*Z_res;
graph_V12(V,T);
V[4]=floor(V[4]);
V[5]=floor(V[5]);
gcvt(V[4],80,n);
VV1=atoi(n);
gcvt(V[5],80,n);
VV2=atoi(n);
V[1]=(EE[ii][4]+DDmin[1]-1.5)*Z_res;
V[2]=(EE[ii][5]+DDmin[2]-1.5)*Z_res;
V[3]=(EE[ii][6]+DDmin[3]-1.5)*Z_res;
graph_V12(V,T);
V[4]=floor(V[4]);
V[5]=floor(V[5]);
gcvt(V[4],80,n);
VV3=atoi(n);
gcvt(V[5],80,n);
VV4=atoi(n);
line(VV1,VV2,VV3,VV4);
}
}
```

```
i+=length-1;
}
getch();
fclose(zgraphe);
closegraph();
}
```

```
/* zfind.h */

int find_VV(long int iii,long int jjj,long int kkk,long int
i,long int j,long int k,int ***ZZ3,long int where2,long int
AA[4],long int DD[4])
{
long int where;
long int x,y,z;
int a=0;
double num1,base1,rem1,num2,base2,rem2,num3,base3,rem3;
long int b_1,b_2,b_3,plus1,plus2,plus3;
double A1,A2,A3,D2,D3,long_z,wide_y;
char n[80];

if (ZZ3[iii-i+1][jjj-j+1][kkk-k+1]!=0) return
ZZ3[iii-i+1][jjj-j+1][kkk-k+1];
else {
num1=iii;
num2=jjj;
num3=kkk;
D2=DD[2];
D3=DD[3];
A1=AA[1];
A2=AA[2];
A3=AA[3];
long_z=ceil((D3-2)/(A3-2));
wide_y=ceil((D2-2)/(A2-2));
if (kkk<=AA[3]) {
base3=0;
rem3=num3;
}
else {
base3=ceil((num3-2)/(A3-2))-1;
rem3=num3-base3*(A3-2);
}
if (jjj<=AA[2]) {
base2=0;
rem2=num2;
}
else {
base2=ceil((num2-2)/(A2-2))-1;
rem2=num2-base2*(A2-2);
}
if (iii<=AA[1]) {
base1=0;
rem1=num1;
}
else {
base1=ceil((num1-2)/(A1-2))-1;
rem1=num1-base1*(A1-2);
}
gcvt(base3,80,n);
b_3=atol(n);
plus3=b_3*AA[1]*AA[2]*AA[3]*20;
```

```
gcvt(base2,80,n);
b_2=atol(n);
plus2=b_2*long_z*AA[1]*AA[2]*AA[3]*20;
gcvt(base1,80,n);
b_1=atol(n);
plus1=b_1*wide_y*long_z*AA[1]*AA[2]*AA[3]*20;
gcvt(rem3,80,n);
k=atol(n);
gcvt(rem2,80,n);
j=atol(n);
gcvt(rem1,80,n);
i=atol(n);
where=where2+plus1+plus2+plus3+AA[2]*AA[3]*20*(i-1)+AA[3]*20*(j-1
)+20*(k-1);
fseek(ztempv,where,SEEK_SET);
fscanf(ztempv,"%ld %ld %ld. %d",&x,&y,&z,&a);
if (a==0) {
output_down();
cprintf("'0' Error found in analysis of edges at (%ld %ld
%ld).",iii,jjj,kkk);
fcloseall();
exit(1);
}
ZZ3[iii-i+1][jjj-j+1][kkk-k+1]=a;
return a;
}
}
```

```
/* zfmem3i.h */

free_i3matrix(int ***XX,long int XX_size[4])
{
long int i,j;

for (i=XX_size[1];i>=1;i--) {
for (j=XX_size[2];j>=1;j--) free((char*) (XX[i][j]+1));
}
for (i=XX_size[1];i>=1;i--) free((char*) (XX[i]+1));
free((char*) (XX+1));
output_down();
cprintf("[%ld][%ld] free.",XX_size[1],XX_size[2]);
}
```

```
/* zfpdef.h */

FILE *info;
FILE *zmodels;

P_define(float *A,float T[5][5],int list_length)
{
float Pa[4],Pab[4],Pabc[4];
double M1,N1,S1;
double M2a,N2a,S2a;
double M3ab,N3ab,S3ab;
double ES_res,E_res,Z_res,Ma,Mb,array,total_points;
long int NN1,NN2,NN3;
double Pmin[4],Pmax[4];
double Dmin[4],Dmax[4],D[4];
double C[9][4];
int **ZZ;
long int DDmin[4],DDmax[4],DD[4],where,where1,count=0;
long int ZZ_length;
long int i,j,k,l,m=1;
char n[80];

if (list_length!=0) {
info=fopen("info.c","r+");
rewind(info);
fscanf(info,"%lf",&E_res);
fseek(info,52,SEEK_SET);
fscanf(info,"%lf",&Z_res);
E_res=.95*Z_res/sqrt(2);
ES_res=E_res/4;
fclose(info);
output_down();
cprintf("Point resolution: %5.2lf, Z-resolution:
%5.2lf.",E_res,Z_res);
total_points=ceil(A[1]/ES_res*A[2]/ES_res*A[3]/ES_res);
output_down();
cprintf("Approximate enclosure points: %5.0lf",total_points);
for (i=1;i<=8;i++) {
for (j=1;j<=3;j++) {
Pmin[j]=T[j][4];
Pmax[j]=T[j][4];
C[i][j]=T[j][4];
}
}
for (i=1;i<=3;i++) {
for (j=1;j<=3;j++) C[i][j]=T[j][i]*A[i]+T[j][4];
C[4][i]=T[i][1]*A[1]+T[i][2]*A[2]+T[i][4];
C[5][i]=T[i][1]*A[1]+T[i][3]*A[3]+T[i][4];
C[6][i]=T[i][2]*A[2]+T[i][3]*A[3]+T[i][4];
C[7][i]=T[i][1]*A[1]+T[i][2]*A[2]+T[i][3]*A[3]+T[i][4];
}
for (i=1;i<=8;i++) {
for (j=1;j<=3;j++) {
if (Pmin[j]>C[i][j]) Pmin[j]=C[i][j];
```

```
if (Pmax[j]<C[i][j]) Pmax[j]=C[i][j];
}
}
output_down();
cprintf("(Pabc)min: %5.2lf %5.2lf %5.2lf,
",Pmin[1],Pmin[2],Pmin[3]);
cprintf("(Pabc)max: %5.2lf %5.2lf
%5.2lf.",Pmax[1],Pmax[2],Pmax[3]);
for (i=1;i<=3;i++) {
Dmin[i]=floor(Pmin[i]/Z_res)-1;
Dmax[i]=floor(Pmax[i]/Z_res)+1;
D[i]=Dmax[i]-Dmin[i]+1;
}
for (i=1;i<=3;i++) {
gcvt(Dmin[i],80,n);
DDmin[i]=atol(n);
gcvt(Dmax[i],80,n);
DDmax[i]=atol(n);
DD[i]=DDmax[i]-DDmin[i]+1;
}
output_down();
cprintf("(Z)min: %ld %ld %ld, ",DDmin[1],DDmin[2],DDmin[3]);
cprintf("(Z)max: %ld %ld %ld, ",DDmax[1],DDmax[2],DDmax[3]);
cprintf("(Z)size: %ld %ld %ld.",DD[1],DD[2],DD[3]);
zmodels=fopen("zmodels.c","w");
rewind(zmodels);
fprintf(zmodels,"%ld %ld %ld ",DDmin[1],DDmin[2],DDmin[3]);
fprintf(zmodels,"%ld %ld %ld %f%c",DD[1],DD[2],DD[3],Z_res,10);
where1=ftell(zmodels);
for (i=1;i<=DD[1];i++) {
for (j=1;j<=DD[2];j++) {
for (k=1;k<=DD[3];k++) fputc('0',zmodels);
fprintf(zmodels,"%c",10);
}
fprintf(zmodels,"%c",10);
}
M1=A[1];
if (M1>=E_res) N1=floor(A[1]/E_res)+1;
else N1=2;
S1=M1/(N1-1);
gcvt(N1,80,n);
NN1=atol(n);
array=floor(coreleft()/20);
if (array>total_points) array=total_points;
gcvt(array,80,n);
ZZ_length=atol(n);
ZZ_length=20;
ZZ=(int **) malloc((unsigned) ZZ_length*sizeof(int*));
if (!ZZ) {
perror("allocation failure 1 in ZZ()");
exit(1);
}
ZZ-=1;
for (i=1;i<=ZZ_length;i++) {
```

```
ZZ[i]=(int *) malloc((unsigned) 3*sizeof(int));
if (!ZZ[i]) {
perror("allocation failure 2 in ZZ()");
exit(1);
}
ZZ[i]-=1;
}
output_down();
cprintf("ZZ[%ld][3] allocated.",ZZ_length);
output_down();
cprintf("NN3:              0         0");
output_down();
cprintf("NN2:              0         0");
output_down();
cprintf("NN1:              0         0");
output_down();
cprintf("#Points:          0         0");
for (i=1;i<=NN1;i++) {
for (j=1;j<=3;j++) Pa[j]=T[j][4]+T[j][1]*(i-1)*S1;
switch (A[4]) {
case 2: {
M2a=A[1];
break;
}
case 3: {
M2a=A[2];
break;
}
case 4:
case 5:
case 6: {
Ma=(i-1)*S1*(i-1)*S1;
if (i!=NN1) M2a=sqrt(M1*M1-Ma);
else M2a=0;
break;
}
}
switch (A[4]) {
case 2:
case 3: {
if (M2a>=E_res) N2a=floor(M2a/E_res)+1;
else N2a=2;
S2a=M2a/(N2a-1);
break;
}
case 4:
case 5:
case 6: {
if (M2a>=E_res) N2a=floor(M2a/E_res)+1;
else N2a=2;
if (i!=NN1) S2a=M2a/(N2a-1);
else {
N2a=1;
S2a=0;
```

```
break;
}
}
}
gcvt(N2a,80,n);
NN2=atol(n);
for (j=1;j<=NN2;j++) {
for (k=1;k<=3;k++) Pab[k]=Pa[k]+T[k][2]*(j-1)*S2a;
switch (A[4]) {
case 2: {
M3ab=A[1];
break;
}
case 3:
case 4: {
M3ab=A[3];
break;
}
case 5: {
if (i!=NN1 && j!=NN2) {
Ma=(i-1)*S1*(i-1)*S1;
Mb=(j-1)*S2a*(j-1)*S2a;
M3ab=sqrt(M1*M1-Ma-Mb);
}
else M3ab=0;
break;
}
case 6: {
if (i!=NN1 && j!=NN2) {
Ma=(i-1)*S1*(i-1)*S1;
Mb=(j-1)*S2a*(j-1)*S2a;
M3ab=A[3]*(1-sqrt(Ma+Mb)/A[1]);
}
else M3ab=0;
break;
}
}
switch (A[4]) {
case 2:
case 3:
case 4: {
if (M3ab>=E_res) N3ab=floor(M3ab/E_res)+1;
else N3ab=2;
S3ab=M3ab/(N3ab-1);
break;
}
case 5:
case 6: {
if (M3ab>=E_res) N3ab=floor(M3ab/E_res)+1;
else N3ab=2;
if (i!=NN1 && j!=NN2) S3ab=M3ab/(N3ab-1);
else {
N3ab=1;
S3ab=0;
```

```
}
break;
}
}
gcvt(N3ab,80,n);
NN3=atol(n);
for (k=1;k<=NN3;k++) {
for (l=1;l<=3;l++) Pabc[l]=Pab[l]+T[l][3]*(k-1)*S3ab;
for (l=1;l<=3;l++) {
D[l]=floor(Pabc[l]/Z_res)-Dmin[l];
gcvt(D[l],80,n);
ZZ[m][l]=atoi(n);
}
m+=1;
if (m>ZZ_length) {
for (l=1;l<=ZZ_length;l++) {
where=where1+(DD[2]*(DD[3]+2)+2)*ZZ[l][1]+(DD[3]+2)*ZZ[l][2]+ZZ[l
][3];
fseek(zmodels,where,SEEK_SET);
fputc('1',zmodels);
count+=1;
gotoxy(20,3);
cprintf("%ld",count);
}
m=1;
}
}
}
gotoxy(20,4);
cprintf("%ld",i);
gotoxy(20,5);
cprintf("%ld",j);
gotoxy(20,6);
cprintf("%ld",k);
}
for (l=1;l<m;l++) {
where=where1+(DD[2]*(DD[3]+2)+2)*ZZ[l][1]+(DD[3]+2)*ZZ[l][2]+ZZ[l
][3];
fseek(zmodels,where,SEEK_SET);
fputc('1',zmodels);
count+=1;
gotoxy(20,3);
cprintf("%ld",count);
}
M1=A[1];
if (M1>=ES_res) N1=floor(A[1]/ES_res)+1;
else N1=2;
S1=M1/(N1-1);
gcvt(N1,80,n);
NN1=atol(n);
for (i=1;i<=NN1;i++) {
for (j=1;j<=3;j++) Pa[j]=T[j][4]+T[j][1]*(i-1)*S1;
switch (A[4]) {
case 2: {
```

```
M2a=A[1];
break;
}
case 3: {
M2a=A[2];
break;
}
case 4:
case 5:
case 6: {
Ma=(i-1)*S1*(i-1)*S1;
if (i!=NN1) M2a=sqrt(M1*M1-Ma);
else M2a=0;
break;
}
}
switch (A[4]) {
case 2:
case 3: {
if (M2a>=ES_res) N2a=floor(M2a/ES_res)+1;
else N2a=2;
S2a=M2a/(N2a-1);
break;
}
case 4:
case 5:
case 6: {
if (M2a>=ES_res) N2a=floor(M2a/ES_res)+1;
else N2a=2;
if (i!=NN1) S2a=M2a/(N2a-1);
else {
N2a=1;
S2a=0;
break;
}
}
}
gcvt(N2a,80,n);
NN2=atol(n);
for (j=1;j<=NN2;j++) {
for (k=1;k<=3;k++) Pab[k]=Pa[k]+T[k][2]*(j-1)*S2a;
switch (A[4]) {
case 2: {
M3ab=A[1];
break;
}
case 3:
case 4: {
M3ab=A[3];
break;
}
case 5: {
if (i!=NN1 && j!=NN2) {
Ma=(i-1)*S1*(i-1)*S1;
```

```
Mb=(j-1)*S2a*(j-1)*S2a;
M3ab=sqrt(M1*M1-Ma-Mb);
}
else M3ab=0;
break;
}
case 6: {
if (i!=NN1 && j!=NN2) {
Ma=(i-1)*S1*(i-1)*S1;
Mb=(j-1)*S2a*(j-1)*S2a;
M3ab=A[3]*(1-sqrt(Ma+Mb)/A[1]);
}
else M3ab=0;
break;
}
}
switch (A[4]) {
case 2:
case 3:
case 4: {
if (M3ab>=ES_res && (i==1 || i==NN1 || j==1 || j==NN2))
N3ab=floor(M3ab/ES_res)+1;
else N3ab=2;
S3ab=M3ab/(N3ab-1);
break;
}
case 5:
case 6: {
if (M3ab>=ES_res && (i==1 && j!=NN2) || (i!=NN1 && j==1))
N3ab=floor(M3ab/ES_res)+1;
else N3ab=2;
if (i!=NN1 && j!=NN2) S3ab=M3ab/(N3ab-1);
else {
N3ab=1;
S3ab=0;
}
break;
}
}
gcvt(N3ab,80,n);
NN3=atol(n);
for (k=1;k<=NN3;k++) {
for (l=1;l<=3;l++) Pabc[l]=Pab[l]+T[l][3]*(k-1)*S3ab;
for (l=1;l<=3;l++) {
D[l]=floor(Pabc[l]/Z_res)-Dmin[l];
gcvt(D[l],80,n);
ZZ[m][l]=atoi(n);
}
m+=1;
if (m>ZZ_length) {
for (l=1;l<=ZZ_length;l++) {
where=where1+(DD[2]*(DD[3]+2)+2)*ZZ[l][1]+(DD[3]+2)*ZZ[l][2]+ZZ[l
][3];
fseek(zmodels,where,SEEK_SET);
```

```
fputc('1',zmodels);
count+=1;
gotoxy(30,3);
cprintf("%ld",count);
}
m=1;
}
}
}
gotoxy(30,4);
cprintf("%ld",i);
gotoxy(30,5);
cprintf("%ld",j);
gotoxy(30,6);
cprintf("%ld",k);
}
for (l=1;l<m;l++) {
where=where1+(DD[2]*(DD[3]+2)+2)*ZZ[l][1]+(DD[3]+2)*ZZ[l][2]+ZZ[l
][3];
fseek(zmodels,where,SEEK_SET);
fputc('1',zmodels);
count+=1;
gotoxy(30,3);
cprintf("%ld",count);
}
for (i=ZZ_length;i>=1;i--) free((char*) (ZZ[i]+1));
free((char*) (ZZ+1));
fclose(zmodels);
output_down();
cprintf("Z data stored in file: zmodels.c.");
fclose(zmodels);
output_down();
cprintf("Z data stored in file: zmodels.c.");
}
}
```

```
/* zgbreak.h */

break_handler()
{
closegraph();
fcloseall();
printf("CTRL-BRK pressed.\n");
printf("Program terminated. Files closed.\n");
textcolor(BLACK);
textbackground(RED);
cprintf("Strike any key to continue.....");
getch();
return 0;
}
```

```
/* zgraph.h */

graph_V12(float *V,float T[5][5])
{
int l;
float B[4],C1,C2,D;

D=0;
for (l=1;l<=3;l++) D=D+T[l][3]*(V[l]-T[l][4]);
for (l=1;l<=3;l++) B[l]=V[l]+T[l][3]*D;
C1=0;
C2=0;
for (l=1;l<=3;l++) {
C1=C1+T[l][1]*(B[l]-T[l][4]);
C2=C2+T[l][2]*(B[l]-T[l][4]);
}
V[4]=320+C1*100;
V[5]=180-C2*75;
}
```

```
/* zgrfree.h */

free_imatrix(int ****ZZ,long int AA[5])
{
long int i,j,k;

for (i=AA[4];i>=1;i--) {
for (j=AA[1];j>=1;j--) {
for (k=AA[2];k>=1;k--) free((char*) (ZZ[i][j][k]+1));
}
}
for (i=AA[4];i>=1;i--) {
for (j=AA[1];j>=1;j--) free((char*) (ZZ[i][j]+1));
}
for (i=AA[4];i>=1;i--) free((char*) (ZZ[i]+1));
free((char*) (ZZ+1));
}
```

```
/* zgrmem.h */

int ****imatrix(long int DD[4],long int AA[5])
{
int ****ZZ;
long int ZZ_length,ZZ_size=0;
long int i,j,k;
double array,base,exp;
char n[80];

if (AA[4]!=0) {
array=floor(coreleft()/(AA[4]*3));
gcvt(array,80,n);
ZZ_length=atoi(n);
AA[3]=ZZ_length;
if (ZZ_length>DD[3]) AA[3]=DD[3];
array=floor(ZZ_length/AA[3]);
gcvt(array,80,n);
AA[2]=atol(n);
if (ZZ_length>DD[2]*DD[3]) AA[2]=DD[2];
array=floor(ZZ_length/(AA[3]*AA[2]));
gcvt(array,80,n);
AA[1]=atoi(n);
ZZ_size=DD[1]*DD[2]*DD[3];
if (ZZ_length>ZZ_size) AA[1]=DD[1];
}
else {
base=coreleft()/3;
exp=1.0/3.0;
array=floor(pow(base,exp));
gcvt(array,80,n);
ZZ_length=atol(n);
for (i=1;i<=3;i++) {
if (DD[i]<ZZ_length) AA[i]=DD[i];
else AA[i]=ZZ_length;
}
AA[4]=1;
}
ZZ=(int ****) malloc((unsigned) AA[4]*sizeof(int***));
if (!ZZ) {
perror("allocation failure 1 in ZZ()");
exit(1);
}
ZZ-=1;
for (i=1;i<=AA[4];i++) {
ZZ[i]=(int ***) malloc((unsigned) AA[1]*sizeof(int**));
if (!ZZ[i]) {
perror("allocation failure 2 in ZZ()");
exit(1);
}
ZZ[i]-=1;
}
for (i=1;i<=AA[4];i++) {
for (j=1;j<=AA[1];j++) {
```

```
ZZ[i][j]=(int **) malloc((unsigned) AA[2]*sizeof(int*));
if (!ZZ[i][j]) {
perror("allocation failure 3 in zz()");
exit(1);
}
ZZ[i][j]-=1;
}
}
for (i=1;i<=AA[4];i++) {
for (j=1;j<=AA[1];j++) {
for (k=1;k<=AA[2];k++) {
ZZ[i][j][k]=(int *) malloc((unsigned) AA[3]*sizeof(int));
if (!ZZ[i][j][k]) {
perror("allocation failure 4 in ZZ()");
exit(1);
}
ZZ[i][j][k]-=1;
}
}
}
return ZZ;
}
```

```
/* zmchoo.h */

FILE *models;

int choose_model()
{
int label_number=0,list_length=0;

models=fopen("models.c","r+");
rewind(models);
fseek(models,0,SEEK_SET);
fscanf(models,"%d",&list_length);
fclose(models);
clear_message();
textbackground(BLUE);
textcolor(WHITE);
gotoxy(2,23);
cputs("Choose a label number: ");
textbackground(GREEN);
textcolor(BLACK);
cputs("(?)");
textbackground(BLACK);
textcolor(WHITE);
gotoxy(65,3);
cputs("Label          ");
gotoxy(1,25);
cprintf("Label number= ");
cscanf("%d",&label_number);
output_down();
output_down();
if (label_number<1 || label_number>list_length) {
cprintf("Label %d does not exist.",label_number);
label_number=0;
}
else cprintf("Label %d has been chosen.",label_number);
return label_number;
}
```

```
/* zmcreat.h */

create_model()
{
float A[5],T[5][5];
int list_length=0;

dimension_model(A);
if (A[1]!=-1) enter_transform(A,T,list_length);
}
```

```
/* zmdel.h */

FILE *models;

delete_model(int list_length)
{
float A[5],T[5][5];
int i,where,list_length1,list_length2;
char label[41]=" ";

models=fopen("models.c","r+");
rewind(models);
fscanf(models,"%d",&list_length1);
fclose(models);
if (list_length>0) {
if (list_length!=list_length1) {
list_length=list_length*(-1);
get_model(A,T,list_length1);
save_model(A,T,list_length);
list_length=list_length*(-1);
models=fopen("models.c","r+");
rewind(models);
where=104+416*(list_length1-1);
fseek(models,where,SEEK_SET);
fscanf(models,"%s",label);
where=104+416*(list_length-1);
fseek(models,where,SEEK_SET);
fprintf(models,"                                                    ");
fseek(models,where,SEEK_SET);
fprintf(models,"%s",label);
fclose(models);
}
models=fopen("models.c","r+");
where=52+416*(list_length1-1);
fseek(models,where,SEEK_SET);
fprintf(models,"
");
where+=52;
fseek(models,where,SEEK_SET);
fprintf(models,"
");
where+=52;
fseek(models,where,SEEK_SET);
fprintf(models,"
");
where+=52;
fseek(models,where,SEEK_SET);
fprintf(models,"
");
where+=52;
fseek(models,where,SEEK_SET);
fprintf(models,"
");
where+=52;
```

```
fseek(models,where,SEEK_SET);
fprintf(models,"
");
where+=52;
fseek(models,where,SEEK_SET);
fprintf(models,"
");
where+=52;
fseek(models,where,SEEK_SET);
fprintf(models,"
");
fseek(models,0,SEEK_SET);
fprintf(models,"                                                  ");
fseek(models,0,SEEK_SET);
list_length1-=1;
fprintf(models,"%d",list_length1);
fclose(models);
}
else reset_model();
}
```

```
/* zmedit.h */

int choose_label();
int list_model();

edit_model()
{
float A[5],T[5][5];
int i,j=0,OK='
',which,which1,where,list_length=0,list_length1,list_length2;

do {
clear_message();
do {
textbackground(GREEN);
textcolor(BLACK);
gotoxy(65,3);
cputs("(1)");
textbackground(BLUE);
textcolor(LIGHTGRAY);
cputs("  Exit");
textbackground(GREEN);
textcolor(BLACK);
gotoxy(65,5);
cputs("(2)");
textbackground(BLUE);
textcolor(LIGHTGRAY);
cputs("  List");
textbackground(GREEN);
textcolor(BLACK);
gotoxy(65,7);
cputs("(3)");
textbackground(BLUE);
textcolor(LIGHTGRAY);
cputs("  Label");
textbackground(GREEN);
textcolor(BLACK);
gotoxy(65,9);
cputs("(4)");
textbackground(BLUE);
textcolor(LIGHTGRAY);
cputs("  Reset");
gotoxy(2,23);
textbackground(BLUE);
textcolor(WHITE);
cputs("Edit, Reset or List more labels: ");
textbackground(GREEN);
textcolor(BLACK);
cputs("(?)");
which=toupper(getch());
}
while (which!='1' && which!='2' && which!='3' && which!='4');
switch (which) {
case '1': return;
```

```
case '2': {
list_length=list_model(j);
if (list_length>10) j+=1;
else j=0;
break;
}
case '3': {
list_length=choose_model();
if (list_length!=0) {
clear_message();
do {
gotoxy(65,3);
textbackground(GREEN);
textcolor(BLACK);
cputs("(1)");
textbackground(BLUE);
textcolor(LIGHTGRAY);
cputs("  Exit");
gotoxy(65,5);
textbackground(GREEN);
textcolor(BLACK);
cputs("(2)");
textbackground(BLUE);
textcolor(LIGHTGRAY);
cputs("  Change");
gotoxy(65,7);
textbackground(GREEN);
textcolor(BLACK);
cputs("(3)");
textbackground(BLUE);
textcolor(LIGHTGRAY);
cputs("  Delete");
textcolor(WHITE);
gotoxy(2,23);
cputs("Change or delete label from list: ");
textbackground(GREEN);
textcolor(BLACK);
cputs("(?)");
which1=toupper(getch());
}
while (which1!='1' && which1!='2' && which1!='3');
switch (which1) {
case '1': break;
case '2': {
dimension_model(A);
if (A[1]!=-1) enter_transform(A,T,list_length);
j=0;
break;
}
case '3': {
OK=delete_OK();
if (OK=='Y') delete_model(list_length);
break;
}
```

```
}
}
break;
}
case '4': {
OK=reset_OK();
if (OK=='Y') reset_model();
return;
}
}
}
while (which!='1');
}
```

```
/* zmemll.h */

long int *llmatrix(long int XX_size)
{
long int *XX;

XX=(long int *) malloc((unsigned) XX_size*sizeof(long int));
if (!XX) {
perror("allocation failure 1 in imatrix");
exit(1);
}
XX-=1;
output_down();
cprintf("[%ld] Mem: %u",XX_size,coreleft());
return XX;
}
```

```
/* zmem2i.h */

int **i2matrix(long int XX_size[5])
{
int **XX;
long int i;

output_down();
XX=(int **) malloc((unsigned) XX_size[1]*sizeof(int *));
if (!XX) {
perror("allocation failure 1 in imatrix");
exit(1);
}
XX-=1;
cprintf("[%ld]",XX_size[1]);
for (i=1;i<=XX_size[1];i++) {
XX[i]=(int *) malloc((unsigned) XX_size[2]*sizeof(int));
if (!XX[i]) {
perror("allocation failure 2 in imatrix");
exit(1);
}
XX[i]-=1;
}
cprintf("[%ld] Mem: %u",XX_size[2],coreleft());
return XX;
}
```

```
/* zmem21.h */

long int **l2matrix(long int XX_size[5])
{
long int **XX;
long int i;

output_down();
XX=(long int **) malloc((unsigned) XX_size[1]*sizeof(long int
*));
if (!XX) {
perror("allocation failure 1 in imatrix");
exit(1);
}
XX-=1;
cprintf("[%ld]",XX_size[1]);
for (i=1;i<=XX_size[1];i++) {
XX[i]=(long int *) malloc((unsigned) XX_size[2]*sizeof(long
int));
if (!XX[i]) {
perror("allocation failure 2 in imatrix");
exit(1);
}
XX[i]-=1;
}
cprintf("[%ld] Mem: %u",XX_size[2],coreleft());
return XX;
}
```

```
/* zmem3i.h */

int ***i3matrix(long int XX_size[5])
{
int ***XX;
long int i,j;

output_down();
XX=(int ***) malloc((unsigned) XX_size[1]*sizeof(int **));
if (!XX) {
perror("allocation failure 1 in imatrix");
exit(1);
}
XX-=1;
cprintf("[%ld]",XX_size[1]);
for (i=1;i<=XX_size[1];i++) {
XX[i]=(int **) malloc((unsigned) XX_size[2]*sizeof(int *));
if (!XX[i]) {
perror("allocation failure 2 in imatrix");
exit(1);
}
XX[i]-=1;
}
cprintf("[%ld]",XX_size[2]);
for (i=1;i<=XX_size[1];i++) {
for (j=1;j<=XX_size[2];j++) {
XX[i][j]=(int *) malloc((unsigned) XX_size[3]*sizeof(int));
if (!XX[i][j]) {
perror("allocation failure 3 in imatrix");
exit(1);
}
XX[i][j]-=1;
}
}
cprintf("[%ld] mem: %u",XX_size[3],coreleft());
return XX;
}
```

```
/* zmem31.h */

long int ***l3matrix(long int XX_size[5])
{
long int ***XX;
long int i,j;

output_down();
XX=(long int ***) malloc((unsigned) XX_size[1]*sizeof(long int
**));
if (!XX) {
perror("allocation failure 1 in imatrix");
exit(1);
}
XX-=1;
cprintf("[%ld]",XX_size[1]);
for (i=1;i<=XX_size[1];i++) {
XX[i]=(long int **) malloc((unsigned) XX_size[2]*sizeof(long int
*));
if (!XX[i]) {
perror("allocation failure 2 in imatrix");
exit(1);
}
XX[i]-=1;
}
cprintf("[%ld]",XX_size[2]);
for (i=1;i<=XX_size[1];i++) {
for (j=1;j<=XX_size[2];j++) {
XX[i][j]=(long int *) malloc((unsigned) XX_size[3]*sizeof(long
int));
if (!XX[i][j]) {
perror("allocation failure 3 in imatrix");
exit(1);
}
XX[i][j]-=1;
}
}
cprintf("[%ld] mem: %u",XX_size[3],coreleft());
return XX;
}
```

```
/* zmem41.h */

long int ****l4matrix(long int XX_size[5])
{
long int ****XX;
long int i,j,k;

output_down();
XX=(long int ****) malloc((unsigned) XX_size[1]*sizeof(long int
***));
if (!XX) {
perror("allocation failure 1 in imatrix");
exit(1);
}
XX-=1;
cprintf("[%ld]",XX_size[1]);
for (i=1;i<=XX_size[1];i++) {
XX[i]=(long int ***) malloc((unsigned) XX_size[2]*sizeof(long int
**));
if (!XX[i]) {
perror("allocation failure 2 in imatrix");
exit(1);
}
XX[i]-=1;
}
cprintf("[%ld]",XX_size[2]);
for (i=1;i<=XX_size[1];i++) {
for (j=1;j<=XX_size[2];j++) {
XX[i][j]=(long int **) malloc((unsigned) XX_size[3]*sizeof(long
int *));
if (!XX[i][j]) {
perror("allocation failure 3 in imatrix");
exit(1);
}
XX[i][j]-=1;
}
}
cprintf("[%ld]",XX_size[3]);
for (i=1;i<=XX_size[1];i++) {
for (j=1;j<=XX_size[2];j++) {
for (k=1;k<=XX_size[3];k++) {
XX[i][j][k]=(long int *) malloc((unsigned) XX_size[4]*sizeof(long
int));
if (!XX[i][j][k]) {
perror("allocation failure 4 in imatrix");
exit(1);
}
XX[i][j][k]-=1;
}
}
}
cprintf("[%ld] Mem: %u",XX_size[4],coreleft());
return XX;
}
```

```
/* zmemory.h */

int ****imatrix(long int DD[4],long int AA[5])
{
int ****ZZ;
long int ZZ_length,ZZ_size=0;
long int i,j,k;
double array,base,exp;
char n[80];

output_down();
cprintf("Initial memory heap = %u.",coreleft());
if (AA[4]!=0) {
array=floor(coreleft()/(AA[4]*3));
gcvt(array,80,n);
ZZ_length=atoi(n);
AA[3]=ZZ_length;
if (ZZ_length>DD[3]) AA[3]=DD[3];
array=floor(ZZ_length/AA[3]);
gcvt(array,80,n);
AA[2]=atol(n);
if (ZZ_length>DD[2]*DD[3]) AA[2]=DD[2];
array=floor(ZZ_length/(AA[3]*AA[2]));
gcvt(array,80,n);
AA[1]=atoi(n);
ZZ_size=DD[1]*DD[2]*DD[3];
if (ZZ_length>ZZ_size) AA[1]=DD[1];
}
else {
base=coreleft()/3;
exp=1.0/3.0;
array=floor(pow(base,exp));
gcvt(array,80,n);
ZZ_length=atol(n);
for (i=1;i<=3;i++) {
if (DD[i]<ZZ_length) AA[i]=DD[i];
else AA[i]=ZZ_length;
}
AA[4]=1;
}
ZZ=(int ****) malloc((unsigned) AA[4]*sizeof(int***));
if (!ZZ) {
perror("allocation failure 1 in ZZ()");
exit(1);
}
ZZ-=1;
for (i=1;i<=AA[4];i++) {
ZZ[i]=(int ***) malloc((unsigned) AA[1]*sizeof(int**));
if (!ZZ[i]) {
perror("allocation failure 2 in ZZ()");
exit(1);
}
ZZ[i]-=1;
}
```

```
for (i=1;i<=AA[4];i++) {
for (j=1;j<=AA[1];j++) {
ZZ[i][j]=(int **) malloc((unsigned) AA[2]*sizeof(int*));
if (!ZZ[i][j]) {
perror("allocation failure 3 in zz()");
exit(1);
}
ZZ[i][j]-=1;
}
}
for (i=1;i<=AA[4];i++) {
for (j=1;j<=AA[1];j++) {
for (k=1;k<=AA[2];k++) {
ZZ[i][j][k]=(int *) malloc((unsigned) AA[3]*sizeof(int));
if (!ZZ[i][j][k]) {
perror("allocation failure 4 in ZZ()");
exit(1);
}
ZZ[i][j][k]-=1;
}
}
}
output_down();
cprintf("ZZ[%ld][%ld][%ld][%ld] allocated.
",AA[4],AA[1],AA[2],AA[3]);
output_down();
cprintf("Memory heap = %u.",coreleft());
return ZZ;
}
```

```
/* zmenu.h */

char opt[81];
char b_dbl[81];
char b_msg[81];
char b_sng[81];
char b_fl1[81];
char b_fl2[81];
char *l_blank;
char *l_d1,*l_d2,*l_s1,*l_s2,*l_f1,*l_f2;
int i,mess_row=22;

main_menu()
{
textmode(C80);
textbackground(BLACK);
clrscr();
window(1,1,80,25);
l_blank="123456789 123456789 123456789 123456789 ";
l_d1="123456789 123456789 123456789 123456789 123456789 123456789
12";
l_d2="123456789 12345";
l_s1="
 ";
l_s2="                ";
l_f1=l_s1;
l_f2=l_s2;
strnset(l_blank,219,80);
sprintf(opt,"%s%s",l_blank,l_blank);
strnset(l_d1,205,62);
strnset(l_d2,205,15);
sprintf(b_dbl,"%c%s%c%s%c",213,l_d1,209,l_d2,184);
sprintf(b_fl1,"%c%s%c%s%c",179,l_f1,179,l_f2,179);
sprintf(b_fl2,"%c%s %s%c",179,l_f1,l_f2,179);
strnset(l_s1,196,62);
strnset(l_s2,196,15);
sprintf(b_msg,"%c%s%c%s%c",195,l_s1,193,l_s2,180);
sprintf(b_sng,"%c%s%c%s%c",192,l_s1,196,l_s2,217);
textcolor(LIGHTGRAY);
cputs(opt);
textbackground(BLUE);
cputs(b_dbl);
for (i=1;i<=mess_row-3;i++) cputs(b_fl1);
cputs(b_msg);
cputs(b_fl2);
cputs(b_sng);
textcolor(WHITE);
gotoxy(28,2);
cputs(" OUTPUT ");
gotoxy(67,2);
cputs(" SELECTION ");
gotoxy(36,mess_row);
cputs(" MESSAGE ");
}
```

```
/* zmfree.h */

free_imatrix(int ****ZZ,long int AA[5])
{
long int i,j,k;

for (i=AA[4];i>=1;i--) {
for (j=AA[1];j>=1;j--) {
for (k=AA[2];k>=1;k--) free((char*) (ZZ[i][j][k]+1));
}
}
for (i=AA[4];i>=1;i--) {
for (j=AA[1];j>=1;j--) free((char*) (ZZ[i][j]+1));
}
for (i=AA[4];i>=1;i--) free((char*) (ZZ[i]+1));
free((char*) (ZZ+1));
output_down();
cprintf("ZZ[%ld][%ld][%ld][%ld] freed.
",AA[4],AA[1],AA[2],AA[3]);
output_down();
cprintf("Memory heap = %u.",coreleft());
}
```

```
/* zmget.h */

FILE *models;

get_model(float *A,float T[5][5],int list_length)
{
int i,where;

models=fopen("models.c","r+");
rewind(models);
where=156+416*(list_length-1);
fseek(models,where,SEEK_SET);
fscanf(models,"%f",&A[4]);
where+=52;
fseek(models,where,SEEK_SET);
fscanf(models,"%f %f %f",&A[1],&A[2],&A[3]);
for (i=1;i<=4;i++) {
where+=52;
fseek(models,where,SEEK_SET);
fscanf(models,"%f %f %f %f",&T[i][1],&T[i][2],&T[i][3],&T[i][4]);
}
fclose(models);
}
```

```
/* zmlist.h */

FILE *models;

int list_model(int j)
{
int i,where,list_length,list_length1,list_length2;
char label[41]=" ";

models=fopen("models.c","r+");
rewind(models);
fseek(models,0,SEEK_SET);
fscanf(models,"%d",&list_length);
if (list_length!=0) {
output_down();
list_length1=list_length-10*j;
if (list_length1>10) list_length2=list_length1-10;
else list_length2=0;
if (list_length1==0) list_length1=list_length;
for (i=list_length1;i>list_length2;i--) {
where=104+416*(i-1);
fseek(models,where,SEEK_SET);
fscanf(models,"%s",label);
output_down();
cprintf("%d. %s",i,label);
}
if (list_length1>10) {
output_down();
gotoxy(2,3);
cprintf("     -- more to list --");
}
else {
output_down();
cprintf("     -- end of list --");
}
}
else {
output_down();
output_down();
cprintf("No labels to list!");
}
fclose(models);
return list_length1;
}
```

```
/* zmproc.h */

int choose_label();
int list_model();

process_model()
{
float A[5],T[5][5];
int i,j=0,which,list_length;

do {
clear_message();
do {
textbackground(GREEN);
textcolor(BLACK);
gotoxy(65,3);
cputs("(1)");
textbackground(BLUE);
textcolor(LIGHTGRAY);
cputs("  Exit");
textbackground(GREEN);
textcolor(BLACK);
gotoxy(65,5);
cputs("(2)");
textbackground(BLUE);
textcolor(LIGHTGRAY);
cputs("  List");
textbackground(GREEN);
textcolor(BLACK);
gotoxy(65,7);
cputs("(3)");
textbackground(BLUE);
textcolor(LIGHTGRAY);
cputs("  Label");
textbackground(GREEN);
textcolor(BLACK);
gotoxy(65,9);
cputs("(4)");
textbackground(BLUE);
textcolor(LIGHTGRAY);
cputs("  Resolution");
gotoxy(2,23);
textbackground(BLUE);
textcolor(WHITE);
cputs("Process or List labels: ");
textbackground(GREEN);
textcolor(BLACK);
cputs("(?)");
which=toupper(getch());
}
while (which<='1' && which>='5');
switch (which) {
case '1': return;
case '2': {
```

```
list_length=list_model(j);
if (list_length>10) j+=1;
else j=0;
break;
}
case '3': {
list_length=choose_model();
if (list_length!=0) {
get_model(A,T,list_length);
P_define(A,T,list_length);
break;
}
case '4': {
edit_resolution();
break;
}
}
}
}
while (which!='1');
}
```

```
/* zmreset.h */

FILE *models;

reset_model()
{
models=fopen("models.c","w");
rewind(models);
fprintf(models,"0");
fclose(models);
}
```

```
/* zmsave.h */

FILE *models;

save_model(float *A,float T[5][5],int list_length)
{
int i,OK=' ',where,where1,list_length1;
char label[41];

models=fopen("models.c","r+");
rewind(models);
fscanf(models,"%d",&list_length1);
if (list_length>=0) {
clear_message();
textbackground(BLUE);
textcolor(WHITE);
gotoxy(2,23);
cputs("Enter label for this model (Up to 40 characters).");
textbackground(BLACK);
textcolor(WHITE);
gotoxy(65,3);
cputs("Label          ");
gotoxy(1,25);
cputs("Label=");
cscanf("%s",label);
output_down();
output_down();
cprintf("This model is labeled as %s.",label);
OK=input_OK();
}
else {
OK='Y';
list_length=list_length*(-1);
}
if (OK=='Y') {
if (list_length==0) {
rewind(models);
fscanf(models,"%d",&list_length);
rewind(models);
fprintf(models,"
-length%c",10);
list_length+=1;
rewind(models);
fprintf(models,"%d",list_length);
}
where=(list_length-1)*416+52;
fseek(models,where,SEEK_SET);
fprintf(models,"
-number%c",10);
where1=where+52;
fseek(models,where1,SEEK_SET);
fprintf(models,"                                              -label
%c",10);
fprintf(models,"                                              -type
```

```
%c",10);
fprintf(models,"
-A1A2A3%c",10);
fprintf(models,"
-T11-14%c",10);
fprintf(models,"
-T21-24%c",10);
fprintf(models,"
-T31-34%c",10);
fprintf(models,"
-T41-44%c",10);
fseek(models,where,SEEK_SET);
fprintf(models,"%d",list_length);
where+=52;
fseek(models,where,SEEK_SET);
fprintf(models,"%s",label);
where+=52;
fseek(models,where,SEEK_SET);
fprintf(models,"%f",A[4]);
where+=52;
fseek(models,where,SEEK_SET);
fprintf(models,"%f %f %f",A[1],A[2],A[3]);
for (i=1;i<=4;i++) {
where+=52;
fseek(models,where,SEEK_SET);
fprintf(models,"%f %f %f %f",T[i][1],T[i][2],T[i][3],T[i][4]);
}
}
else T[4][4]=0;
fclose(models);
}
```

```
/* zmview.h */

view_model()
{
int i,LG[8],R[8],B[8];
int view=' ';

for (i=1;i<=7;i++) {
LG[i]=7;
R[i]=4;
B[i]=0;
}
do {
clear_message();
do {
textbackground(GREEN);
textcolor(BLACK);
gotoxy(65,3);
cputs("(1)");
textbackground(BLUE);
textcolor(LIGHTGRAY);
cputs("  Exit");
textbackground(GREEN);
textcolor(BLACK);
gotoxy(65,5);
cputs("(2)");
textbackground(BLUE);
textcolor(LIGHTGRAY);
cputs("  Point");
textbackground(GREEN);
textcolor(BLACK);
gotoxy(65,7);
cputs("(3)");
textbackground(BLUE);
textcolor(LIGHTGRAY);
cputs("  Wire");
textbackground(GREEN);
textcolor(BLACK);
gotoxy(65,9);
cputs("(4)");
textbackground(BLUE);
textcolor(LIGHTGRAY);
cputs("  Voxel");
textbackground(GREEN);
textcolor(BLACK);
gotoxy(65,11);
cputs("(5)");
textbackground(BLUE);
textcolor(LIGHTGRAY);
cputs("  P/W");
textbackground(GREEN);
textcolor(BLACK);
gotoxy(65,13);
cputs("(6)");
```

```
textbackground(BLUE);
textcolor(LIGHTGRAY);
cputs("  P/W/V");
gotoxy(2,23);
textbackground(BLUE);
textcolor(WHITE);
cputs("Choose which type to view: ");
textbackground(GREEN);
textcolor(BLACK);
cputs("(?)");
view=toupper(getch());
}
while (view<'1' || view>'6');
switch (view) {
case '1': return;
case '2': {
clear_message();
spawnl(P_WAIT,"xviewp.exe","xviewp.exe",NULL);
break;
}
case '3': {
clear_message();
spawnl(P_WAIT,"xviewa.exe","xviewa.exe",NULL);
break;
}
case '4': {
clear_message();
spawnl(P_WAIT,"xviewz.exe","xviewz.exe",NULL);
break;
}
case '5': {
clear_message();
spawnl(P_WAIT,"xviewap.exe","xviewap.exe",NULL);
break;
}
case '6': {
clear_message();
spawnl(P_WAIT,"xviewapz.exe","xviewapz.exe",NULL);
break;
}
}
reset_menu();
main_choices(LG,R,B);
}
while (view!='1');
}
```

```
/* zochoo.h */

FILE *objects;

int choose_object()
{
int label_number=0,list_length=0;

objects=fopen("objects.c","r+");
rewind(objects);
fseek(objects,0,SEEK_SET);
fscanf(objects,"%d",&list_length);
fclose(objects);
clear_message();
textbackground(BLUE);
textcolor(WHITE);
gotoxy(2,23);
cputs("Choose a label number: ");
textbackground(GREEN);
textcolor(BLACK);
cputs("(?)");
textbackground(BLACK);
textcolor(WHITE);
gotoxy(65,3);
cputs("Label          ");
gotoxy(1,25);
cprintf("Label number= ");
cscanf("%d",&label_number);
output_down();
output_down();
if (label_number<1 || label_number>list_length) {
cprintf("Label %d does not exist.",label_number);
label_number=0;
}
else cprintf("Label %d has been chosen.",label_number);
return label_number;
}
```

```
/* zocreat.h */

FILE *objects;

create_object()
{
int i,j,k,obj[202];
int list_length=0;

clear_message();
textbackground(BLUE);
textcolor(WHITE);
gotoxy(2,23);
cputs("Enter object definition (Up to 200 characters): ");
textbackground(GREEN);
textcolor(BLACK);
cputs("[string?]");
gotoxy(65,7);
cputs("(L)");
textbackground(BLUE);
textcolor(LIGHTGRAY);
cputs("ist (models)");
textbackground(BLACK);
textcolor(WHITE);
gotoxy(65,3);
cputs("Object Def.    ");
gotoxy(65,5);
cputs("[String?]      ");
textbackground(GREEN);
textcolor(BLACK);
gotoxy(65,9);
cputs("(B)");
textbackground(BLUE);
textcolor(LIGHTGRAY);
cputs("ackwards");
textbackground(GREEN);
textcolor(BLACK);
gotoxy(65,11);
cputs("(A)");
textbackground(BLUE);
textcolor(LIGHTGRAY);
cputs("dd object");
for (i=1;i<=200;i++) obj[i]=' ';
make_object(obj);
if (obj[1]!=' ') {
list_length=0;
save_object(obj,list_length);
}
}
```

```
/* zodel.h */

FILE *objects;

delete_object(int list_length)
{
int i,where,list_length1,list_length2;
char label[41];
int obj[202];

objects=fopen("objects.c","r+");
rewind(objects);
fscanf(objects,"%d",&list_length1);
fclose(objects);
if (list_length>0) {
if (list_length!=list_length1) {
get_object(obj,list_length1);
list_length=list_length*(-1);
save_object(obj,list_length);
list_length=list_length*(-1);
objects=fopen("objects.c","r+");
rewind(objects);
where=104+312*(list_length1-1);
fseek(objects,where,SEEK_SET);
fscanf(objects,"%s",label);
where=104+312*(list_length-1);
fseek(objects,where,SEEK_SET);
fprintf(objects,"                                                   ");
fseek(objects,where,SEEK_SET);
fprintf(objects,"%s",label);
fclose(objects);
}
objects=fopen("objects.c","r+");
rewind(objects);
where=52+312*(list_length1-1);
fseek(objects,where,SEEK_SET);
fprintf(objects,"
");
where+=52;
fseek(objects,where,SEEK_SET);
fprintf(objects,"
");
where+=52;
fseek(objects,where,SEEK_SET);
fprintf(objects,"
");
where+=52;
fseek(objects,where,SEEK_SET);
fprintf(objects,"
");
fseek(objects,0,SEEK_SET);
fprintf(objects,"                                                   ");
fseek(objects,0,SEEK_SET);
list_length1-=1;
```

```
fprintf(objects,"%d",list_length1);
fclose(objects);
}
else reset_object();
}
```

```
/* zoedit.h */

int choose_label();
int list_object();

edit_object()
{
int obj[202];
int i,j=0,OK='
',which,which1,where,list_length=0,list_length1,list_length2;

do {
clear_message();
do {
textbackground(GREEN);
textcolor(BLACK);
gotoxy(65,3);
cputs("(1)");
textbackground(BLUE);
textcolor(LIGHTGRAY);
cputs("  Exit");
textbackground(GREEN);
textcolor(BLACK);
gotoxy(65,5);
cputs("(2)");
textbackground(BLUE);
textcolor(LIGHTGRAY);
cputs("  List");
textbackground(GREEN);
textcolor(BLACK);
gotoxy(65,7);
cputs("(3)");
textbackground(BLUE);
textcolor(LIGHTGRAY);
cputs("  Label");
textbackground(GREEN);
textcolor(BLACK);
gotoxy(65,9);
cputs("(4)");
textbackground(BLUE);
textcolor(LIGHTGRAY);
cputs("  Reset");
gotoxy(2,23);
textbackground(BLUE);
textcolor(WHITE);
cputs("Edit, Reset or List more labels: ");
textbackground(GREEN);
textcolor(BLACK);
cputs("(?)");
which=toupper(getch());
}
while (which!='1' && which!='2' && which!='3' && which!='4');
switch (which) {
case '1': return;
```

```
case '2': {
list_length=list_object(j);
if (list_length>10) j+=1;
else j=0;
break;
}
case '3': {
list_length=choose_object();
if (list_length!=0) {
clear_message();
do {
gotoxy(65,3);
textbackground(GREEN);
textcolor(BLACK);
cputs("(1)");
textbackground(BLUE);
textcolor(LIGHTGRAY);
cputs("  Exit");
gotoxy(65,5);
textbackground(GREEN);
textcolor(BLACK);
cputs("(2)");
textbackground(BLUE);
textcolor(LIGHTGRAY);
cputs("  Change");
gotoxy(65,7);
textbackground(GREEN);
textcolor(BLACK);
cputs("(3)");
textbackground(BLUE);
textcolor(LIGHTGRAY);
cputs("  Delete");
textcolor(WHITE);
gotoxy(2,23);
cputs("Change or delete label from list: ");
textbackground(GREEN);
textcolor(BLACK);
cputs("(?)");
which1=toupper(getch());
}
while (which1!='1' && which1!='2' && which1!='3');
switch (which1) {
case '1': break;
case '2': {
clear_message();
textbackground(BLUE);
textcolor(WHITE);
gotoxy(2,23);
cputs("Enter object definition (Up to 200 characters): ");
textbackground(GREEN);
textcolor(BLACK);
cputs("[string?]");
gotoxy(65,7);
cputs("(L)");
```

```
textbackground(BLUE);
textcolor(LIGHTGRAY);
cputs("ist (models)");
textbackground(GREEN);
textcolor(BLACK);
gotoxy(65,9);
cputs("(N)");
textbackground(BLUE);
textcolor(LIGHTGRAY);
cputs("ext char.");
textbackground(GREEN);
textcolor(BLACK);
gotoxy(65,11);
cputs("(I)");
textbackground(BLUE);
textcolor(LIGHTGRAY);
cputs("nsert char.");
textbackground(GREEN);
textcolor(BLACK);
gotoxy(65,13);
cputs("(D)");
textbackground(BLUE);
textcolor(LIGHTGRAY);
cputs("elete char.");
textbackground(GREEN);
textcolor(BLACK);
gotoxy(65,15);
cputs("(B)");
textbackground(BLUE);
textcolor(LIGHTGRAY);
cputs("ackwards");
textbackground(GREEN);
textcolor(BLACK);
gotoxy(65,17);
cputs("(A)");
textbackground(BLUE);
textcolor(LIGHTGRAY);
cputs("dd object");
textbackground(BLACK);
textcolor(WHITE);
gotoxy(65,3);
cputs("Object Def.     ");
gotoxy(65,5);
cputs("[String?]       ");
for (i=1;i<=201;i++) obj[1]=' ';
get_object(obj,list_length);
make_object(obj);
save_object(obj,list_length);
break;
}
case '3': {
OK=delete_OK();
if (OK=='Y') delete_object(list_length);
break;
```

```
}
}
}
break;
}
case '4': {
OK=reset_OK();
if (OK=='Y') reset_object();
return;
}
}
}
while (which!='1');
}
```

```
/* zoftwo.h */

FILE *zfirst;
FILE *ztempz;

int ***i3matrix();
char surface_operator();

first_two()
{
int ***ZZ=0;
long int AA[5],DD[4];
long int DDmin[4],DDmax[4];
long int ZZ_length;
long int i,j,k,ii,jj,kk,iii,jjj,kkk;
long int where,where1;
long int a,b,c;
int mask[4][4][4];
double Z_res;
double array,base,exp;
char n[80];

output_down();
cprintf("*****Surface operator (first).");
zfirst=fopen("zfirst.c","r+");
rewind(zfirst);
fscanf(zfirst,"%ld %ld %ld ",&DDmin[1],&DDmin[2],&DDmin[3]);
fscanf(zfirst,"%ld %ld %ld %lf",&DD[1],&DD[2],&DD[3],&Z_res);
fseek(zfirst,2,SEEK_CUR);
where1=ftell(zfirst);
ztempz=fopen("ztempz.c","w+");
rewind(ztempz);
fprintf(ztempz,"%ld %ld %ld ",DDmin[1],DDmin[2],DDmin[3]);
fprintf(ztempz,"%ld %ld %ld %lf%c",DD[1],DD[2],DD[3],Z_res,10);
for (i=1;i<=3;i++) AA[i]=3;
base=coreleft()/3;
array=floor(base/(AA[2]*AA[3]));
gcvt(array,80,n);
ZZ_length=atol(n);
if (ZZ_length>DD[1]) {
AA[1]=DD[1];
array=floor(base/(AA[1]*AA[3]));
gcvt(array,80,n);
ZZ_length=atol(n);
if (ZZ_length>DD[2]) {
AA[2]=DD[2];
array=floor(base/(AA[1]*AA[2]));
gcvt(array,80,n);
ZZ_length=atol(n);
if (ZZ_length>DD[3]) AA[3]=DD[3];
else AA[3]=ZZ_length;
}
else AA[2]=ZZ_length;
}
```

```
else AA[1]=ZZ_length;
ZZ=i3matrix(AA);
for (i=1;i<=DD[1];i++) {
for (j=1;j<=DD[2];j++) {
for (k=1;k<=DD[3];k++) fputc('0',ztempz);
fprintf(ztempz,"%c",10);
}
fprintf(ztempz,"%c",10);
}
for (a=1;a<=3;a++) {
for (b=1;b<=3;b++) {
for (c=1;c<=3;c++) mask[a][b][c]=0;
}
}
output_down();
cprintf(" Z3:    0          0          0          %ld",DD[3]);
output_down();
cprintf(" Z2:    0          0          0          %ld",DD[2]);
output_down();
cprintf(" Z1:    0          0          0          %ld",DD[1]);
output_down();
cprintf("Axis***Input*****Process***Output***Size");
for (i=1;i<=DD[1];i++) {
for (j=1;j<=DD[2];j++) {
for (k=1;k<=DD[3];k++) {
for (ii=1;ii<=AA[1];ii++) {
iii=i+ii-1;
for (jj=1;jj<=AA[2];jj++) {
jjj=j+jj-1;
for (kk=1;kk<=AA[3];kk++) {
kkk=k+kk-1;
if (iii<=DD[1] && jjj<=DD[2] && kkk<=DD[3]) {
where=where1+(DD[2]*(DD[3]+2)+2)*(iii-1)+(DD[3]+2)*(jjj-1)+kkk-1;
fseek(zfirst,where,SEEK_SET);
ZZ[ii][jj][kk]=fgetc(zfirst);
}
gotoxy(10,4);
cprintf("%ld   ",kkk);
}
gotoxy(10,5);
cprintf("%ld   ",jjj);
}
gotoxy(10,6);
cprintf("%ld   ",iii);
}
for (ii=2;ii<=AA[1]-1;ii++) {
iii=i+ii-1;
for (jj=2;jj<=AA[2]-1;jj++) {
jjj=j+jj-1;
for (kk=2;kk<=AA[3]-1;kk++) {
kkk=k+kk-1;
if (iii<=DD[1] && jjj<=DD[2] && kkk<=DD[3]) {
if (ZZ[ii][jj][kk]!='0') {
for (a=1;a<=3;a++) {
```

```
for (b=1;b<=3;b++) {
for (c=1;c<=3;c++) mask[a][b][c]=ZZ[ii+a-2][jj+b-2][kk+c-2];
}
}
ZZ[ii][jj][kk]=surface_operator(mask);
}
}
gotoxy(20,4);
cprintf("%ld   ",kkk);
}
gotoxy(20,5);
cprintf("%ld   ",jjj);
}
gotoxy(20,6);
cprintf("%ld   ",iii);
}
for (ii=2;ii<=AA[1]-1;ii++) {
iii=i+ii-1;
for (jj=2;jj<=AA[2]-1;jj++) {
jjj=j+jj-1;
for (kk=2;kk<=AA[3]-1;kk++) {
kkk=k+kk-1;
if (iii<=DD[1]-1 && jjj<=DD[2]-1 && kkk<=DD[3]-1) {
where=where1+(DD[2]*(DD[3]+2)+2)*(iii-1)+(DD[3]+2)*(jjj-1)+kkk-1;
fseek(ztempz,where,SEEK_SET);
fputc(ZZ[ii][jj][kk],ztempz);
}
gotoxy(30,4);
cprintf("%ld   ",kkk);
}
gotoxy(30,5);
cprintf("%ld   ",jjj);
}
gotoxy(30,6);
cprintf("%ld   ",iii);
}
if (DD[3]==k+AA[3]-1) k=DD[3];
else k+=AA[3]-3;
}
if (DD[2]==j+AA[2]-1) j=DD[2];
else j+=AA[2]-3;
}
if (DD[1]==i+AA[1]-1) i=DD[1];
else i+=AA[1]-3;
}
fclose(zfirst);
fclose(ztempz);
free_i3matrix(ZZ,AA);
output_down();
cprintf("*****Surface complete.");
system("copy ztempz.c zfirst.c");
output_down();
cprintf("Surface data stored in file: zfirst.c.");
}
```

```
/* zoget.h */

FILE *objects;

get_object(int obj[202],int list_length)
{
int i,j,where;

objects=fopen("objects.c","r+");
rewind(objects);
where=156+312*(list_length-1);
fseek(objects,where,SEEK_SET);
j=0;
for (i=1;i<=200;i++) {
if (i==(51+j)) {
where+=52;
fseek(objects,where,SEEK_SET);
j+=50;
}
fscanf(objects,"%c",&obj[i]);
}
fclose(objects);
}
```

```
/* zok.h */

int input_OK()
{
int ok=' ';

clear_message();
do {
textbackground(GREEN);
textcolor(BLACK);
gotoxy(65,3);
cputs("Y");
textbackground(BLUE);
textcolor(LIGHTGRAY);
cputs("es");
textbackground(GREEN);
textcolor(BLACK);
gotoxy(65,5);
cputs("N");
textbackground(BLUE);
textcolor(LIGHTGRAY);
cputs("o");
gotoxy(2,23);
textbackground(BLUE);
textcolor(WHITE);
cputs("Input ");
textbackground(GREEN);
textcolor(BLACK);
cputs("O.K.?");
ok=toupper(getch());
}
while (ok!='Y' && ok!='N');
return ok;
}
```

```
/* zokd.h */

int delete_OK()
{
int ok=' ';

clear_message();
do {
textbackground(GREEN);
textcolor(BLACK);
gotoxy(65,3);
cputs("Y");
textbackground(BLUE);
textcolor(LIGHTGRAY);
cputs("es");
textbackground(GREEN);
textcolor(BLACK);
gotoxy(65,5);
cputs("N");
textbackground(BLUE);
textcolor(LIGHTGRAY);
cputs("o");
gotoxy(2,23);
textbackground(BLUE);
textcolor(WHITE);
cputs("Delete ");
textbackground(GREEN);
textcolor(BLACK);
cputs("O.K.?");
ok=toupper(getch());
}
while (ok!='Y' && ok!='N');
return ok;
}
```

```
/* zokr.h */

int reset_OK()
{
int ok=' ';

clear_message();
do {
textbackground(GREEN);
textcolor(BLACK);
gotoxy(65,3);
cputs("Y");
textbackground(BLUE);
textcolor(LIGHTGRAY);
cputs("es");
textbackground(GREEN);
textcolor(BLACK);
gotoxy(65,5);
cputs("N");
textbackground(BLUE);
textcolor(LIGHTGRAY);
cputs("o");
gotoxy(2,23);
textbackground(BLUE);
textcolor(WHITE);
cputs("Reset ");
textbackground(GREEN);
textcolor(BLACK);
cputs("O.K.?");
ok=toupper(getch());
}
while (ok!='Y' && ok!='N');
return ok;
}
```

```
/* zolist.h */

FILE *objects;

int list_object(int j)
{
int i,where,list_length,list_length1,list_length2;
char label[21]=" ";

objects=fopen("objects.c","r+");
rewind(objects);
fscanf(objects,"%d",&list_length);
if (list_length!=0) {
output_down();
list_length1=list_length-10*j;
if (list_length1>10) list_length2=list_length1-10;
else list_length2=0;
if (list_length1==0) list_length1=list_length;
for (i=list_length1;i>list_length2;i--) {
where=104+312*(i-1);
fseek(objects,where,SEEK_SET);
fscanf(objects,"%s",label);
output_down();
cprintf("%d. %s",i,label);
}
if (list_length1>10) {
output_down();
gotoxy(2,3);
cprintf("     -- more to list --");
}
else {
output_down();
cprintf("     -- end of list --");
}
}
else {
output_down();
output_down();
cprintf("No labels to list!");
}
fclose(objects);
return list_length1;
}
```

```
/* zomake.h */

make_object(int obj[202])
{
int add_obj[202];
int i=201,j=3,k,l=0,m=0;
int obj_length=0,old_obj=' ',next_obj=' ';
int xx=1,yy=1,list_length=0,add_length=0,left=0,right=0;

for (k=1;k<=201;k++) add_obj[k]=' ';
if (obj[1]!=' ') {
output_down();
do {
textcolor(LIGHTGRAY);
textbackground(BLUE);
output_down();
gotoxy(2,3);
for (k=(50*j+1);k<=(i-1);k++) {
cprintf("%c",obj[k]);
}
j-=1;
i=(j+1)*50+1;
}
while (j>=0);
output_down();
gotoxy(2,3);
cprintf("Object definition (Old):");
}
textbackground(BLACK);
textcolor(WHITE);
gotoxy(1,25);
cprintf("Object def.[0]  =");
i=1;
j=0;
do {
do {
old_obj=obj[i];
xx=wherex();
yy=wherey();
textbackground(BLACK);
textcolor(WHITE);
if (add_length==0) {
cprintf("?");
gotoxy(xx,yy);
obj[i]=toupper(getche());
m=1;
}
else {
obj[i]=add_obj[m];
cprintf("%cA",obj[i]);
k=getch();
if (k=='a') add_length=0;
if (add_obj[m+1]==' ') add_length=0;
else m+=1;
```

```
}
switch(obj[i]) {
case 'L': {
obj[i]=old_obj;
obj[1]='[';
list_length=list_model(l);
if (list_length>10) l+=1;
else l=0;
xx-=1;
break;
}
case 'N': {
if (old_obj=='[' && obj[1]=='N' && obj[2]==' ') obj[1]=' ';
else {
gotoxy(xx,yy);
obj[i]=old_obj;
if (old_obj!=' ' && old_obj!=13) {
cprintf("%c",obj[i]);
i+=1;
}
else xx-=1;
}
break;
}
case 'I': {
if (old_obj=='[' && obj[1]=='I' && obj[2]==' ') obj[1]=' ';
else {
gotoxy(xx,yy);
if (old_obj!=' ') {
k=i;
do {
k+=1;
if (k<=200) {
next_obj=obj[k];
obj[k]=old_obj;
old_obj=next_obj;
}
}
while (obj[k]!=13);
do {
gotoxy(xx,yy);
obj[i]=toupper(getche());
}
while (obj[i]=='I');
i+=1;
}
else {
obj[i]=' ';
xx-=1;
}
}
break;
}
case 'D': {
```

```
gotoxy(xx,yy);
k=i-1;
do {
k+=1;
if (k<=200) {
obj[k]=obj[k+1];
}
}
while (obj[k+1]!=13);
if (k<=200) obj[k+1]=' ';
xx-=1;
break;
}
case 'B': {
if (i!=1) {
obj[i]=old_obj;
gotoxy(xx,yy);
cprintf("%c",obj[i]);
if (i>2) {
xx-=1;
gotoxy(xx,yy);
i-=1;
cprintf("%c",obj[i]);
xx-=1;
}
else {
xx-=1;
gotoxy(xx,yy);
}
}
break;
}
case 'A': {
obj[i]=old_obj;
obj[1]='[';
gotoxy(xx,yy);
cprintf("object label=?");
cscanf("%d",&add_length);
gotoxy(xx,yy);
cprintf("                ");
gotoxy(xx,yy);
get_object(add_obj,add_length);
xx-=1;
break;
}
default: i+=1;
}
textbackground(BLACK);
textcolor(WHITE);
gotoxy(13,25);
cprintf("%d]",i-1);
gotoxy(xx+1,yy);
/*if (i>1) {
if (obj[i-1]!='[' || obj[i-1]!=']' || obj[i-1]!='+' ||
```

```
obj[i-1]!='-') {
if (obj[i-1]<48 || obj[i-1]>57) obj[i-1]=13;
}
}*/
}
while (i<=200 && i<(1+50*(j+1)) && obj[1]=='[' && obj[i-1]!=13);
if (i<=200 && obj[1]=='[' && obj[i-1]!=13) {
output_down();
textbackground(BLUE);
gotoxy(2,3);
for (k=(50*j+1);k<=(i-1);k++) cprintf("%c",obj[k]);
output_down();
cprintf("Object definition (Characters %d to %d):",50*j+1,i-1);
textbackground(BLACK);
textcolor(WHITE);
gotoxy(1,25);
cputs("                                        ");
cputs("                                        ");
gotoxy(1,25);
cprintf("Object def.[%d]",i-1);
gotoxy(17,25);
cprintf("=%c%c%c%c%c",obj[i-5],obj[i-4],obj[i-3],obj[i-2],obj[i-1
]);
gotoxy(23,25);
j+=1;
}
}
while (i<=200 && obj[1]=='[' && obj[i-1]!=13);
for (k=i;k<=201;k++) obj[k]=' ';
if (obj[200]==']') obj_length=200;
else obj_length=i-2;
output_down();
do {
textcolor(LIGHTGRAY);
textbackground(BLUE);
output_down();
gotoxy(2,3);
for (k=(50*j+1);k<=i-1;k++) {
cprintf("%c",obj[k]);
if (obj[k]=='[') left+=1;
if (obj[k]==']') right+=1;
}
j-=1;
i=(j+1)*50+1;
}
while (j>=0);
if (obj_length>200) {
output_down();
gotoxy(2,3);
cprintf("Object definition will exceed 200 characters.");
obj[1]=' ';
obj_length+=1;
}
else if (obj[1]!='[' && obj[i-2]!=']' || left!=right) {
```

```
output_down();
gotoxy(2,3);
cprintf("Possible invalid object definition.");
obj[1]=' ';
}
else {
output_down();
gotoxy(2,3);
cprintf("Object definition (Final):");
}
output_down();
output_down();
gotoxy(2,3);
cprintf("Object character(1)=%c",obj[1]);
output_down();
gotoxy(2,3);
cprintf("Object length=%d",obj_length);
output_down();
gotoxy(2,3);
cprintf("No. of left brackets([)=%d",left);
output_down();
gotoxy(2,3);
cprintf("No. of right brackets(])=%d",right);
}
```

```
/* zominus.h */

FILE *zfirst;
FILE *zsecond;
FILE *ztemp;

int ****imatrix();

minus_operator()
{
int ****ZZ=0;
long int AA[5],DD[4];
long int DDmin[4],DDmax[4];
long int DD1min[4],DD2min[4],DD1max[4],DD2max[4],DD1[4],DD2[4];
long int i,j,k,ii,jj,kk,iii,jjj,kkk;
long int where,where1,where2,where3,count=0;
double Z_res1,Z_res2;

output_down();
cprintf("*****Minus operator.");
zfirst=fopen("zfirst.c","r");
rewind(zfirst);
fscanf(zfirst,"%ld %ld %ld ",&DD1min[1],&DD1min[2],&DD1min[3]);
fscanf(zfirst,"%ld %ld %ld %lf",&DD1[1],&DD1[2],&DD1[3],&Z_res1);
fseek(zfirst,2,SEEK_CUR);
where1=ftell(zfirst);
zsecond=fopen("zsecond.c","r");
rewind(zsecond);
fscanf(zsecond,"%ld %ld %ld ",&DD2min[1],&DD2min[2],&DD2min[3]);
fscanf(zsecond,"%ld %ld %ld
%lf",&DD2[1],&DD2[2],&DD2[3],&Z_res2);
fseek(zsecond,2,SEEK_CUR);
where2=ftell(zsecond);
if (Z_res1!=Z_res2) {
perror("resolution failure in MINUS operation");
exit(1);
}
for (i=1;i<=3;i++) {
DD1max[i]=DD1min[i]+DD1[i]-1;
DD2max[i]=DD2min[i]+DD2[i]-1;
if (DD1min[i]<=DD2min[i]) DDmin[i]=DD1min[i];
else DDmin[i]=DD2min[i];
if (DD1max[i]>=DD2max[i]) DDmax[i]=DD1max[i];
else DDmax[i]=DD2max[i];
DD[i]=DDmax[i]-DDmin[i]+1;
}
ztemp=fopen("ztemp.c","w+");
rewind(ztemp);
fprintf(ztemp,"%ld %ld %ld ",DD1min[1],DD1min[2],DD1min[3]);
fprintf(ztemp,"%ld %ld %ld
%lf%c",DD1[1],DD1[2],DD1[3],Z_res1,10);
where3=ftell(ztemp);
for (i=1;i<=DD1[1];i++) {
for (j=1;j<=DD1[2];j++) {
```

```
for (k=1;k<=DD1[3];k++) fputc('0',ztemp);
fprintf(ztemp,"%c",10);
}
fprintf(ztemp,"%c",10);
}
for (i=1;i<=3;i++) AA[i]=1;
AA[4]=2;
ZZ=imatrix(DD1,AA);
output_down();
cprintf("#Z's (create)=              0");
for (i=2;i<=DD1[1]-1;i++) {
for (j=2;j<=DD1[2]-1;j++) {
for (k=2;k<=DD1[3]-1;k++) {
for (ii=1;ii<=AA[1];ii++) {
iii=i+ii-1;
for (jj=1;jj<=AA[2];jj++) {
jjj=j+jj-1;
for (kk=1;kk<=AA[3];kk++) {
kkk=k+kk-1;
if (iii>=2 && iii<=DD1[1]-1 && jjj>=2 && jjj<=DD1[2]-1 && kkk>=2
&& kkk<=DD1[3]-1) {
where=where1+(DD1[2]*(DD1[3]+2)+2)*(iii-1)+(DD1[3]+2)*(jjj-1)+kkk
-1;
fseek(zfirst,where,SEEK_SET);
ZZ[1][ii][jj][kk]=fgetc(zfirst);
}
else ZZ[1][ii][jj][kk]='0';
}
}
}
for (ii=1;ii<=AA[1];ii++) {
iii=i+ii-1-DD2min[1]+DD1min[1];
for (jj=1;jj<=AA[2];jj++) {
jjj=j+jj-1-DD2min[2]+DD1min[2];
for (kk=1;kk<=AA[3];kk++) {
kkk=k+kk-1-DD2min[3]+DD1min[3];
if (iii>=2 && iii<=DD2[1]-1 && jjj>=2 && jjj<=DD2[2]-1 && kkk>=2
&& kkk<=DD2[3]-1) {
where=where2+(DD2[2]*(DD2[3]+2)+2)*(iii-1)+(DD2[3]+2)*(jjj-1)+kkk
-1;
fseek(zsecond,where,SEEK_SET);
ZZ[2][ii][jj][kk]=fgetc(zsecond);
}
else ZZ[2][ii][jj][kk]='0';
}
}
}
for (ii=1;ii<=AA[1];ii++) {
for (jj=1;jj<=AA[2];jj++) {
for (kk=1;kk<=AA[3];kk++) {
if (ZZ[1][ii][jj][kk]!='0' && ZZ[2][ii][jj][kk]!='1')
ZZ[2][ii][jj][kk]='1';
else ZZ[2][ii][jj][kk]='0';
}
```

```
}
}
for (ii=1;ii<=AA[1];ii++) {
iii=i+ii-1;
for (jj=1;jj<=AA[2];jj++) {
jjj=j+jj-1;
for (kk=1;kk<=AA[3];kk++) {
kkk=k+kk-1;
if (iii>=2 && iii<=DD1[1]-1 && jjj>=2 && jjj<=DD1[2]-1 && kkk>=2
&& kkk<=DD1[3]-1) {
where=where3+(DD1[2]*(DD1[3]+2)+2)*(iii-1)+(DD1[3]+2)*(jjj-1)+kkk
-1;
fseek(ztemp,where,SEEK_SET);
fputc(ZZ[2][ii][jj][kk],ztemp);
count+=1;
}
}
}
gotoxy(30,3);
cprintf("%ld",count);
}
k+=AA[3]-1;
}
j+=AA[2]-1;
}
i+=AA[1]-1;
}
fclose(zsecond);
fclose(zfirst);
free_imatrix(ZZ,AA);
gotoxy(2,3);
output_down();
cprintf("*****Store.");
system("copy ztemp.c zfirst.c");
}
```

```
/* zonum.h */

int list_number(int obj_make[202],int i)
{
int j,k;
int list_length=0;

k=i;
do {
i+=1;
}
while (obj_make[i]>=48 && obj_make[i]<=57);
for (j=k;j<=i-1;j++) {
list_length=list_length+obj_make[j]-48;
if (j!=i-1) list_length=list_length*10;
}
return list_length;
}
```

```
/* zopdef.h */

FILE *models;
FILE *zstore;

int list_number();

Z_define(int obj[202])
{
int pos,lev;
int i,j,k,l=0;
int r_first,l_last;
int r_marker=65,l_marker=65;
int list_length=0,list_length1=0;
float A[5];
float T[5][5];

models=fopen("models.c","r");
rewind(models);
fscanf(models,"%d",&list_length);
fclose(models);
zstore=fopen("zstore.c","w");
rewind(zstore);
fprintf(zstore,"%d",0);
fclose(zstore);
pos=201;
lev=3;
output_down();
do {
textcolor(LIGHTGRAY);
textbackground(BLUE);
output_down();
gotoxy(2,3);
for (k=50*lev+1;k<=pos-1;k++) {
cprintf("%c",obj[k]);
}
lev-=1;
pos=(lev+1)*50+1;
}
while (lev>=0);
output_down();
gotoxy(2,3);
cprintf("Object definition (initial)");
do {
for (i=1;i<=200;i++) {
if (obj[i]==']') {
r_first=i;
i=200;
}
}
for (i=1;i<=r_first;i++) {
if (obj[i]=='[') l_last=i;
}
if (obj[l_last+1]>=48 && obj[l_last+1]<=57) {
```

```
list_length1=list_number(obj,l_last+1);
if (list_length1>list_length) {
output_down();
gotoxy(2,3);
cprintf("model %d does not exist.",list_length1);
return;
}
if (list_length1!=0) {
for (i=1;i<=4;i++) A[i]=0;
for (i=1;i<=4;i++) {
for (j=1;j<=4;j++) {
T[i][j]=0;
if (i==j) T[i][j]=1;
}
}
get_model(A,T,list_length1);
P_define(A,T,list_length1);
output_down();
gotoxy(2,3);
cprintf("*****First operator.");
system("copy zmodels.c zfirst.c");
for (i=l_last+1;i<=r_first;i++) {
if (i==r_first) {
obj[l_last]=l_marker;
obj[r_first]=r_marker;
if (l_last!=1) second_storage(obj[l_last],obj[r_first]);
if (r_marker==90) {
l_marker+=1;
r_marker=65;
}
else r_marker+=1;
}
else if (obj[i]=='+') {
if (obj[i+1]>=65 && obj[i+1]<=90) second_retrieve(obj,i+1);
else {
list_length1=list_number(obj,i+1);
if (list_length1>list_length) {
output_down();
gotoxy(2,3);
cprintf("model %d does not exist.",list_length1);
return;
}
if (list_length1!=0) {
get_model(A,T,list_length1);
P_define(A,T,list_length1);
output_down();
gotoxy(2,3);
cprintf("*****Second operator.");
system("copy zmodels.c zsecond.c");
}
else return;
}
plus_operator();
obj[I]=24;
```

```
}
else if (obj[i]=='-') {
if (obj[i+1]>=65 && obj[i+1]<=90) second_retrieve(obj,i+1);
else {
list_length1=list_number(obj,i+1);
if (list_length1>list_length) {
output_down();
gotoxy(2,3);
cprintf("model %d does not exist.",list_length1);
return;
}
if (list_length1!=0) {
get_model(A,T,list_length1);
P_define(A,T,list_length1);
output_down();
gotoxy(2,3);
cprintf("*****Second operator.");
system("copy zmodels.c zsecond.c");
}
else return;
}
second_two();
minus_operator();
obj[i]=25;
}
if (obj[i]==24 || obj[i]==25 || i==r_first) {
l+=1;
pos=201;
lev=3;
output_down();
do {
textcolor(LIGHTGRAY);
textbackground(BLUE);
output_down();
gotoxy(2,3);
for (k=(50*lev+1);k<=(pos-1);k++) {
cprintf("%c",obj[k]);
}
lev-=1;
pos=(lev+1)*50+1;
}
while (lev>=0);
output_down();
gotoxy(2,3);
cprintf("Object definition (level %d):",l);
}
}
}
else return;
}
}
while (obj[1]=='[');
output_down();
gotoxy(2,3);
```

```
cprintf("*****Final operator.");
system("copy zfirst.c zmodels.c");
}
```

```
/* zoplus.h */

FILE *zfirst;
FILE *zsecond;
FILE *ztemp;

int ****imatrix();

plus_operator()
{
int ****ZZ=0;
long int AA[5],DD[4];
long int DDmin[4],DDmax[4];
long int DD1min[4],DD2min[4],DD1max[4],DD2max[4],DD1[4],DD2[4];
long int i,j,k,ii,jj,kk,iii,jjj,kkk;
long int where,where1,where2,where3,count=0;
double Z_res1,Z_res2;

output_down();
cprintf("*****Plus operator.");
zfirst=fopen("zfirst.c","r");
rewind(zfirst);
fscanf(zfirst,"%ld %ld %ld ",&DD1min[1],&DD1min[2],&DD1min[3]);
fscanf(zfirst,"%ld %ld %ld %lf",&DD1[1],&DD1[2],&DD1[3],&Z_res1);
fseek(zfirst,2,SEEK_CUR);
where1=ftell(zfirst);
zsecond=fopen("zsecond.c","r");
rewind(zsecond);
fscanf(zsecond,"%ld %ld %ld ",&DD2min[1],&DD2min[2],&DD2min[3]);
fscanf(zsecond,"%ld %ld %ld
%lf",&DD2[1],&DD2[2],&DD2[3],&Z_res2);
fseek(zsecond,2,SEEK_CUR);
where2=ftell(zsecond);
if (Z_res1!=Z_res2) {
perror("resolution failure in PLUS operation");
exit(1);
}
for (i=1;i<=3;i++) {
DD1max[i]=DD1min[i]+DD1[i]-1;
DD2max[i]=DD2min[i]+DD2[i]-1;
if (DD1min[i]<=DD2min[i]) DDmin[i]=DD1min[i];
else DDmin[i]=DD2min[i];
if (DD1max[i]>=DD2max[i]) DDmax[i]=DD1max[i];
else DDmax[i]=DD2max[i];
DD[i]=DDmax[i]-DDmin[i]+1;
}
ztemp=fopen("ztemp.c","w+");
rewind(ztemp);
fprintf(ztemp,"%ld %ld %ld ",DDmin[1],DDmin[2],DDmin[3]);
fprintf(ztemp,"%ld %ld %ld %lf%c",DD[1],DD[2],DD[3],Z_res1,10);
where3=ftell(ztemp);
for (i=1;i<=DD[1];i++) {
for (j=1;j<=DD[2];j++) {
for (k=1;k<=DD[3];k++) fputc('0',ztemp);
```

```
fprintf(ztemp,"%c",10);
}
fprintf(ztemp,"%c",10);
}
for (i=1;i<=3;i++) AA[i]=1;
AA[4]=2;
ZZ=imatrix(DD,AA);
output_down();
cprintf("#Z's (create)=             0");
for (i=2;i<=DD[1]-1;i++) {
for (j=2;j<=DD[2]-1;j++) {
for (k=2;k<=DD[3]-1;k++) {
for (ii=1;ii<=AA[1];ii++) {
iii=i+ii-1-DD1min[1]+DDmin[1];
for (jj=1;jj<=AA[2];jj++) {
jjj=j+jj-1-DD1min[2]+DDmin[2];
for (kk=1;kk<=AA[3];kk++) {
kkk=k+kk-1-DD1min[3]+DDmin[3];
if (iii>=2 && iii<=DD1[1]-1 && jjj>=2 && jjj<=DD1[2]-1 && kkk>=2
&& kkk<=DD1[3]-1) {
where=where1+(DD1[2]*(DD1[3]+2)+2)*(iii-1)+(DD1[3]+2)*(jjj-1)+kkk
-1;
fseek(zfirst,where,SEEK_SET);
ZZ[1][ii][jj][kk]=fgetc(zfirst);
}
else ZZ[1][ii][jj][kk]='0';
}
}
}
for (ii=1;ii<=AA[1];ii++) {
iii=i+ii-1-DD2min[1]+DDmin[1];
for (jj=1;jj<=AA[2];jj++) {
jjj=j+jj-1-DD2min[2]+DDmin[2];
for (kk=1;kk<=AA[3];kk++) {
kkk=k+kk-1-DD2min[3]+DDmin[3];
if (iii>=2 && iii<=DD2[1]-1 && jjj>=2 && jjj<=DD2[2]-1 && kkk>=2
&& kkk<=DD2[3]-1) {
where=where2+(DD2[2]*(DD2[3]+2)+2)*(iii-1)+(DD2[3]+2)*(jjj-1)+kkk
-1;
fseek(zsecond,where,SEEK_SET);
ZZ[2][ii][jj][kk]=fgetc(zsecond);
}
else ZZ[2][ii][jj][kk]='0';
}
}
}
for (ii=1;ii<=AA[1];ii++) {
for (jj=1;jj<=AA[2];jj++) {
for (kk=1;kk<=AA[3];kk++) {
if (ZZ[1][ii][jj][kk]!='0' || ZZ[2][ii][jj][kk]!='0')
ZZ[2][ii][jj][kk]='1';
else ZZ[2][ii][jj][kk]='0';
}
}
```

```
}
for (ii=1;ii<=AA[1];ii++) {
iii=i+ii-1;
for (jj=1;jj<=AA[2];jj++) {
jjj=j+jj-1;
for (kk=1;kk<=AA[3];kk++) {
kkk=k+kk-1;
if (iii>=2 && iii<=DD[1]-1 && jjj>=2 && jjj<=DD[2]-1 && kkk>=2 &&
kkk<=DD[3]-1) {
where=where3+(DD[2]*(DD[3]+2)+2)*(iii-1)+(DD[3]+2)*(jjj-1)+kkk-1;
fseek(ztemp,where,SEEK_SET);
fputc(ZZ[2][ii][jj][kk],ztemp);
count+=1;
}
}
}
gotoxy(30,3);
cprintf("%ld",count);
}
k+=AA[3]-1;
}
j+=AA[2]-1;
}
i+=AA[1]-1;
}
fclose(zsecond);
fclose(zfirst);
free_imatrix(ZZ,AA);
gotoxy(2,3);
output_down();
cprintf("*****Store.");
system("copy ztemp.c zfirst.c");
}
```

```
/* zoreset.h */

FILE *objects;

reset_object()
{
objects=fopen("objects.c","w");
rewind(objects);
fprintf(objects,"0");
fclose(objects);
}
```

```
/* zoretrv.h */

FILE *zsecond;
FILE *zstore;

int ****imatrix();

second_retrieve(int obj[202],int num_left)
{
int left=0,right=0,left1=0,right1=0,check=0;
int ****ZZ=0;
long int AA[5],DD[4];
long int DDmin[4];
long int i,j,k,ii,jj,kk,iii,jjj,kkk;
long int where=0,where1,where2,where3,count=0;
double Z_res;

zstore=fopen("zstore.c","r+");
rewind(zstore);
left=obj[num_left];
do {
num_left+=1;
right=obj[num_left];
check=obj[num_left+1];
if (check!='+' && check!='-' && check!=']') {
check=0;
}
}
while ((right<65 || right>90) || check==0);
do {
where1=where;
fseek(zstore,where,SEEK_SET);
fscanf(zstore,"%ld",&where);
fseek(zstore,1,SEEK_CUR);
fscanf(zstore,"%c %c",&left1,&right1);
}
while (left!=left1 || right!=right1);
output_down();
cprintf("*****Temporary retrieval: %c-%c",left1,right1);
fseek(zstore,where1+51,SEEK_SET);
fscanf(zstore,"%ld %ld %ld ",&DDmin[1],&DDmin[2],&DDmin[3]);
fscanf(zstore,"%ld %ld %ld %lf",&DD[1],&DD[2],&DD[3],&Z_res);
fseek(zstore,2,SEEK_CUR);
where2=ftell(zstore);
zsecond=fopen("zsecond.c","w");
rewind(zsecond);
fprintf(zsecond,"%ld %ld %ld ",DDmin[1],DDmin[2],DDmin[3]);
fprintf(zsecond,"%ld %ld %ld %lf%c",DD[1],DD[2],DD[3],Z_res,10);
where3=ftell(zsecond);
for (i=1;i<=DD[1];i++) {
for (j=1;j<=DD[2];j++) {
for (k=1;k<=DD[3];k++) fputc('0',zsecond);
fprintf(zsecond,"%c",10);
}
```

```
fprintf(zsecond,"%c",10);
}
for (i=1;i<=3;i++) AA[i]=1;
AA[4]=1;
ZZ=imatrix(DD,AA);
output_down();
cprintf("#Z's (store)=             0");
for (i=2;i<=DD[1]-1;i++) {
for (j=2;j<=DD[2]-1;j++) {
for (k=2;k<=DD[3]-1;k++) {
for (ii=1;ii<=AA[1];ii++) {
iii=i+ii-1;
for (jj=1;jj<=AA[2];jj++) {
jjj=j+jj-1;
for (kk=1;kk<=AA[3];kk++) {
kkk=k+kk-1;
if (iii<=DD[1] && jjj<=DD[2] && kkk<=DD[3]) {
where=where2+(DD[2]*(DD[3]+2)+2)*(iii-1)+(DD[3]+2)*(jjj-1)+kkk-1;
fseek(zstore,where,SEEK_SET);
ZZ[1][ii][jj][kk]=fgetc(zstore);
}
}
}
}
for (ii=1;ii<=AA[1];ii++) {
iii=i+ii-1;
for (jj=1;jj<=AA[2];jj++) {
jjj=j+jj-1;
for (kk=1;kk<=AA[3];kk++) {
kkk=k+kk-1;
if (iii<=DD[1] && jjj<=DD[2] && kkk<=DD[3]) {
where=where3+(DD[2]*(DD[3]+2)+2)*(iii-1)+(DD[3]+2)*(jjj-1)+kkk-1;
fseek(zsecond,where,SEEK_SET);
fputc(ZZ[1][ii][jj][kk],zsecond);
count+=1;
}
}
}
gotoxy(30,3);
cprintf("%ld",count);
}
k+=AA[3]-1;
}
j+=AA[2]-1;
}
i+=AA[1]-1;
}
free_imatrix(ZZ,AA);
fclose(zsecond);
fclose(zstore);
}
```

```
/* zosave.h */

FILE *objects;

save_object(int *obj,int list_length)
{
int i,j,OK=' ',where,where1,list_length1=0;
char label[41];

if (obj[1]!='[') return;
objects=fopen("objects.c","r+");
rewind(objects);
fscanf(objects,"%d",&list_length1);
if (list_length>=0) {
clear_message();
textbackground(BLUE);
textcolor(WHITE);
gotoxy(2,23);
cputs("Enter label for this object. (Up to 40 characters)");
textbackground(BLACK);
textcolor(WHITE);
gotoxy(65,3);
cputs("Label          ");
gotoxy(1,25);
cputs("Label=");
cscanf("%s",label);
output_down();
output_down();
cprintf("This object is labeled as %s.",label);
OK=input_OK();
}
else {
OK='Y';
list_length=list_length*(-1);
}
if (OK=='Y') {
if (list_length==0) {
rewind(objects);
fscanf(objects,"%d",&list_length);
rewind(objects);
fprintf(objects,"
-length%c",10);
list_length+=1;
rewind(objects);
fprintf(objects,"%d",list_length);
}
where=(list_length-1)*312+52;
fseek(objects,where,SEEK_SET);
fprintf(objects,"
-number%c",10);
fprintf(objects,"
-label %c",10);
where1=where+104;
for (i=1;i<=4;i++) {
```

```
fseek(objects,where1,SEEK_SET);
fprintf(objects,"
%c",10);
where1+=52;
}
fseek(objects,where,SEEK_SET);
fprintf(objects,"%d",list_length);
where+=52;
fseek(objects,where,SEEK_SET);
fprintf(objects,"%s",label);
where+=52;
fseek(objects,where,SEEK_SET);
j=0;
i=0;
do {
if (i==(50+j)) {
where+=52;
fseek(objects,where,SEEK_SET);
j+=50;
}
i++;
fprintf(objects,"%c",obj[i]);
}
while (obj[i+1]!=13 && i<=200);
fclose(objects);
}
}
```

```
/* zostore.h */

FILE *zfirst;
FILE *zstore;

int ****imatrix();

second_storage(int left,int right)
{
int ****ZZ=0;
long int AA[5],DD[4];
long int DDmin[4];
long int i,j,k,ii,jj,kk,iii,jjj,kkk;
long int where,where1,where2,where3,where4,count=0;
double Z_res;

output_down();
cprintf("*****Temporary storage.");
zfirst=fopen("zfirst.c","r");
rewind(zfirst);
fscanf(zfirst,"%ld %ld %ld ",&DDmin[1],&DDmin[2],&DDmin[3]);
fscanf(zfirst,"%ld %ld %ld %lf",&DD[1],&DD[2],&DD[3],&Z_res);
fseek(zfirst,2,SEEK_CUR);
where1=ftell(zfirst);
zstore=fopen("zstore.c","r+");
rewind(zstore);
fseek(zstore,-1,SEEK_END);
where2=ftell(zstore);
fprintf(zstore,"
-object%c",10);
fprintf(zstore,"%ld %ld %ld ",DDmin[1],DDmin[2],DDmin[3]);
fprintf(zstore,"%ld %ld %ld %lf%c",DD[1],DD[2],DD[3],Z_res,10);
where3=ftell(zstore);
for (i=1;i<=DD[1];i++) {
for (j=1;j<=DD[2];j++) {
for (k=1;k<=DD[3];k++) fputc('0',zstore);
fprintf(zstore,"%c",10);
}
fprintf(zstore,"%c",10);
}
where4=ftell(zstore);
for (i=1;i<=3;i++) AA[i]=1;
AA[4]=1;
ZZ=imatrix(DD,AA);
output_down();
cprintf("#Z's (store)=              0");
for (i=2;i<=DD[1]-1;i++) {
for (j=2;j<=DD[2]-1;j++) {
for (k=2;k<=DD[3]-1;k++) {
for (ii=1;ii<=AA[1];ii++) {
iii=i+ii-1;
for (jj=1;jj<=AA[2];jj++) {
jjj=j+jj-1;
for (kk=1;kk<=AA[3];kk++) {
```

```
kkk=k+kk-1;
if (iii<=DD[1] && jjj<=DD[2] && kkk<=DD[3]) {
where=where1+(DD[2]*(DD[3]+2)+2)*(iii-1)+(DD[3]+2)*(jjj-1)+kkk-1;
fseek(zfirst,where,SEEK_SET);
ZZ[1][ii][jj][kk]=fgetc(zfirst);
}
}
}
}
for (ii=1;ii<=AA[1];ii++) {
iii=i+ii-1;
for (jj=1;jj<=AA[2];jj++) {
jjj=j+jj-1;
for (kk=1;kk<=AA[3];kk++) {
kkk=k+kk-1;
if (iii<=DD[1] && jjj<=DD[2] && kkk<=DD[3]) {
where=where3+(DD[2]*(DD[3]+2)+2)*(iii-1)+(DD[3]+2)*(jjj-1)+kkk-1;
fseek(zstore,where,SEEK_SET);
fputc(ZZ[1][ii][jj][kk],zstore);
count+=1;
}
}
}
gotoxy(30,3);
cprintf("%ld",count);
}
k+=AA[3]-1;
}
j+=AA[2]-1;
}
i+=AA[1]-1;
}
fseek(zstore,where4,SEEK_SET);
fprintf(zstore,"%d",0);
where=ftell(zstore);
fseek(zstore,where2,SEEK_SET);
fprintf(zstore,"%ld ",where-1);
fprintf(zstore,"%c %c",left,right);
free_imatrix(ZZ,AA);
fclose(zfirst);
fclose(zstore);
}
```

```
/* zostwo.h */

FILE *zsecond;
FILE *ztemp;

int ****imatrix();
char surface_operator();

second_two()
{
int ****ZZ=0;
long int AA[5],DD[4];
long int DDmin[4],DDmax[4];
long int i,j,k,ii,jj,kk,iii,jjj,kkk;
long int where,where1,count1=0,count2=0,count3=0;
long int a,b,c;
int mask[4][4][4];
double Z_res;

output_down();
cprintf("*****Surface operator (second).");
for (a=1;a<=3;a++) {
for (b=1;b<=3;b++) {
for (c=1;c<=3;c++) mask[a][b][c]='0';
}
}
zsecond=fopen("zsecond.c","r+");
rewind(zsecond);
fscanf(zsecond,"%ld %ld %ld ",&DDmin[1],&DDmin[2],&DDmin[3]);
fscanf(zsecond,"%ld %ld %ld %lf",&DD[1],&DD[2],&DD[3],&Z_res);
fseek(zsecond,2,SEEK_CUR);
where1=ftell(zsecond);
ztemp=fopen("ztemp.c","w+");
rewind(ztemp);
fprintf(ztemp,"%ld %ld %ld ",DDmin[1],DDmin[2],DDmin[3]);
fprintf(ztemp,"%ld %ld %ld %lf%c",DD[1],DD[2],DD[3],Z_res,10);
for (i=1;i<=DD[1];i++) {
for (j=1;j<=DD[2];j++) {
for (k=1;k<=DD[3];k++) fputc('0',ztemp);
fprintf(ztemp,"%c",10);
}
fprintf(ztemp,"%c",10);
}
for (i=1;i<=4;i++) AA[i]=0;
ZZ=imatrix(DD,AA);
output_down();
cprintf("#Z's (surface)=            0");
for (i=1;i<=DD[1]-1;i++) {
for (j=1;j<=DD[2]-1;j++) {
for (k=1;k<=DD[3]-1;k++) {
for (ii=1;ii<=AA[1];ii++) {
iii=i+ii-1;
for (jj=1;jj<=AA[2];jj++) {
jjj=j+jj-1;
```

```
for (kk=1;kk<=AA[3];kk++) {
kkk=k+kk-1;
if (iii<=DD[1] && jjj<=DD[2] && kkk<=DD[3]) {
where=where1+(DD[2]*(DD[3]+2)+2)*(iii-1)+(DD[3]+2)*(jjj-1)+kkk-1;
fseek(zsecond,where,SEEK_SET);
ZZ[1][ii][jj][kk]=fgetc(zsecond);
count1+=1;
}
}
}
gotoxy(30,3);
cprintf("%ld",count1);
}
for (ii=2;ii<=AA[1]-1;ii++) {
iii=i+ii-1;
for (jj=2;jj<=AA[2]-1;jj++) {
jjj=j+jj-1;
for (kk=2;kk<=AA[3]-1;kk++) {
kkk=k+kk-1;
if (iii<=DD[1] && jjj<=DD[2] && kkk<=DD[3]) {
if (ZZ[1][ii][jj][kk]!='0') {
for (a=1;a<=3;a++) {
for (b=1;b<=3;b++) {
for (c=1;c<=3;c++) mask[a][b][c]=ZZ[1][ii+a-2][jj+b-2][kk+c-2];
}
}
ZZ[1][ii][jj][kk]=surface_operator(mask);
}
count2+=1;
}
}
}
gotoxy(40,3);
cprintf("%ld",count2);
}
for (ii=2;ii<=AA[1]-1;ii++) {
iii=i+ii-1;
for (jj=2;jj<=AA[2]-1;jj++) {
jjj=j+jj-1;
for (kk=2;kk<=AA[3]-1;kk++) {
kkk=k+kk-1;
if (iii<=DD[1]-1 && jjj<=DD[2]-1 && kkk<=DD[3]-1) {
where=where1+(DD[2]*(DD[3]+2)+2)*(iii-1)+(DD[3]+2)*(jjj-1)+kkk-1;
fseek(ztemp,where,SEEK_SET);
fputc(ZZ[1][ii][jj][kk],ztemp);
count3+=1;
}
}
}
gotoxy(50,3);
cprintf("%ld",count3);
}
if (DD[3]==k+AA[3]-1) k=DD[3];
else k+=AA[3]-3;
```

```
}
if (DD[2]==j+AA[2]-1) j=DD[2];
else j+=AA[2]-3;
}
if (DD[1]==i+AA[1]-1) i=DD[1];
else i+=AA[1]-3;
}
fclose(zsecond);
free_imatrix(ZZ,AA);
zsecond=fopen("zsecond.c","w");
rewind(zsecond);
fprintf(zsecond,"%ld %ld %ld ",DDmin[1],DDmin[2],DDmin[3]);
fprintf(zsecond,"%ld %ld %ld %lf%c",DD[1],DD[2],DD[3],Z_res,10);
for (i=1;i<=DD[1];i++) {
for (j=1;j<=DD[2];j++) {
for (k=1;k<=DD[3];k++) fputc('0',zsecond);
fprintf(zsecond,"%c",10);
}
fprintf(zsecond,"%c",10);
}
for (i=1;i<=3;i++) AA[i]=1;
AA[4]=1;
ZZ=imatrix(DD,AA);
output_down();
cprintf("#Z's (store)=                0");
count1=0;
for (i=2;i<=DD[1]-1;i++) {
for (j=2;j<=DD[2]-1;j++) {
for (k=2;k<=DD[3]-1;k++) {
for (ii=1;ii<=AA[1];ii++) {
iii=i+ii-1;
for (jj=1;jj<=AA[2];jj++) {
jjj=j+jj-1;
for (kk=1;kk<=AA[3];kk++) {
kkk=k+kk-1;
if (iii<=DD[1]-1 && jjj<=DD[2]-1 && kkk<=DD[3]-1) {
where=where1+(DD[2]*(DD[3]+2)+2)*(iii-1)+(DD[3]+2)*(jjj-1)+kkk-1;
fseek(ztemp,where,SEEK_SET);
ZZ[1][ii][jj][kk]=fgetc(ztemp);
}
}
}
}
for (ii=1;ii<=AA[1];ii++) {
iii=i+ii-1;
for (jj=1;jj<=AA[2];jj++) {
jjj=j+jj-1;
for (kk=1;kk<=AA[3];kk++) {
kkk=k+kk-1;
if (iii<=DD[1]-1 && jjj<=DD[2]-1 && kkk<=DD[3]-1) {
where=where1+(DD[2]*(DD[3]+2)+2)*(iii-1)+(DD[3]+2)*(jjj-1)+kkk-1;
fseek(zsecond,where,SEEK_SET);
if (ZZ[1][ii][jj][kk]=='2') fputc('0',zsecond);
else fputc(ZZ[1][ii][jj][kk],zsecond);
```

```
count1+=1;
}
}
}
gotoxy(30,3);
cprintf("%ld",count1);
}
k+=AA[3]-1;
}
j+=AA[2]-1;
}
i+=AA[1]-1;
}
fclose(zsecond);
fclose(ztemp);
free_imatrix(ZZ,AA);
}
```

```
/* zosurf.h */

char surface_operator(int mask[4][4][4])
{
if (mask[2][2][1]=='0' || mask[2][2][3]=='0' ||
mask[2][1][2]=='0' || mask[2][3][2]=='0' || mask[1][2][2]=='0' ||
mask[3][2][2]=='0') return '2';
else return '1';
}
```

```
/* zoutput.h */

output_down()
{
char output[62*18*2];

gettext(2,3,63,20,output);
clear_output();
puttext(2,4,63,21,output);
textcolor(LIGHTGRAY);
}
```

```
/* zoview.h */

view_object()
{
int i,LG[8],R[8],B[8];
int view=' ';

for (i=1;i<=7;i++) {
LG[i]=7;
R[i]=4;
B[i]=0;
}
do {
clear_message();
do {
textbackground(GREEN);
textcolor(BLACK);
gotoxy(65,3);
cputs("(1)");
textbackground(BLUE);
textcolor(LIGHTGRAY);
cputs("  Exit");
textbackground(GREEN);
textcolor(BLACK);
gotoxy(65,5);
cputs("(2)");
textbackground(BLUE);
textcolor(LIGHTGRAY);
cputs("  Voxel");
textbackground(GREEN);
textcolor(BLACK);
gotoxy(65,7);
cputs("(3)");
textbackground(BLUE);
textcolor(LIGHTGRAY);
cputs("  Structure");
gotoxy(2,23);
textbackground(BLUE);
textcolor(WHITE);
cputs("Choose which type to view: ");
textbackground(GREEN);
textcolor(BLACK);
cputs("(?)");
view=toupper(getch());
}
while (view<'1' || view>'3');
switch (view) {
case '1': return;
case '2': {
clear_message();
spawnl(P_WAIT,"zviewz.exe","zviewz.exe",NULL);
break;
}
case '3': {
```

```
clear_message();
spawnl(P_WAIT,"zvel.exe","zvel.exe",NULL);
break;
}
}
reset_menu();
main_choices(LG,R,B);
}
while (view!='1');
}
```

```
/* zprocess.h */

process_object()
{
spawnl(P_WAIT,"zobj.exe","zobj.exe",NULL);
}
```

```
/* zquit.h */

quit_program()
{
textbackground(GREEN);
textcolor(BLACK);
gotoxy(65,3);
cputs("Y");
textbackground(BLUE);
textcolor(LIGHTGRAY);
cputs("es");
textbackground(GREEN);
textcolor(BLACK);
gotoxy(65,5);
cputs("N");
textbackground(BLUE);
textcolor(LIGHTGRAY);
cputs("o");
gotoxy(2,23);
textbackground(BLUE);
textcolor(WHITE);
cputs("Do you want to ");
textbackground(GREEN);
textcolor(BLACK);
cputs("quit?");
}
```

```
/* zres.h */

FILE *info;

edit_resolution()
{
int change;
double E_res,Z_res;

clear_message();
textbackground(BLACK);
textcolor(WHITE);
gotoxy(65,3);
cputs("Resolution     ");
gotoxy(65,5);
cputs("(Z, E)         ");
info=fopen("info.c","r+");
rewind(info);
fseek(info,0,SEEK_SET);
fscanf(info,"%lf",&E_res);
fseek(info,52,SEEK_SET);
fscanf(info,"%lf",&Z_res);
textbackground(BLUE);
textcolor(LIGHTGRAY);
gotoxy(2,3);
output_down();
output_down();
cprintf("Z-resolution: %lf",Z_res);
output_down();
cprintf("E-resolution: %lf",E_res);
gotoxy(2,23);
textcolor(WHITE);
cprintf("Change resolutions ");
textbackground(GREEN);
textcolor(BLACK);
cprintf("(y/n)?");
change=toupper(getch());
if (change=='Y') {
clear_message();
textbackground(BLACK);
textcolor(WHITE);
gotoxy(1,25);
cprintf("E-resolution=");
cscanf("%lf",&E_res);
gotoxy(1,25);
cprintf("                                                            ");
gotoxy(1,25);
cprintf("Z-resolution=");
cscanf("%lf",&Z_res);
rewind(info);
fseek(info,0,SEEK_SET);
fprintf(info,"
E_RESOLUTION%c",10);
rewind(info);
```

```
fseek(info,0,SEEK_SET);
fprintf(info,"%lf",E_res);
rewind(info);
fseek(info,52,SEEK_SET);
fprintf(info,"
Z_RESOLUTION%c",10);
rewind(info);
fseek(info,52,SEEK_SET);
fprintf(info,"%lf",Z_res);
textbackground(BLUE);
textcolor(LIGHTGRAY);
gotoxy(2,3);
output_down();
output_down();
cprintf("Z-resolution: %lf",Z_res);
output_down();
cprintf("E-resolution: %lf",E_res);
}
fclose(info);
}
```

```
/* zrmenu.h */

reset_menu()
{
textbackground(BLACK);
clrscr();
window(1,1,80,25);
textcolor(LIGHTGRAY);
cputs(opt);
textbackground(BLUE);
cputs(b_dbl);
for (i=1;i<=mess_row-3;i++) cputs(b_fl1);
cputs(b_msg);
cputs(b_fl2);
cputs(b_sng);
textcolor(WHITE);
gotoxy(28,2);
cputs(" OUTPUT ");
gotoxy(67,2);
cputs(" SELECTION ");
gotoxy(36,mess_row);
cputs(" MESSAGE ");
}
```

```
/* zrotate.h */

#define PI 3.14159

enter_rotation(float T[5][5])
{
float theta,theta1;
float R[5][5],TT[5][5];
int i,j,k,axis;

clear_message();
textbackground(BLUE);
textcolor(WHITE);
gotoxy(2,23);
cputs("Enter theta value in degrees: ");
textbackground(GREEN);
textcolor(BLACK);
putch(233);
cprintf("?");
textbackground(BLACK);
textcolor(WHITE);
gotoxy(65,3);
cputs("Rotation        ");
gotoxy(65,5);
cputs("(");
putch(233);
cputs("x,");
putch(233);
cputs("y or ");
putch(233);
cputs("z)   ");
textbackground(BLACK);
textcolor(WHITE);
gotoxy(1,25);
putch(233);
cputs("=");
cscanf("%f",&theta);
theta1=PI*theta/180;
do {
clear_message();
textbackground(BLUE);
textcolor(WHITE);
gotoxy(2,23);
cputs("Rotation about which axis: ");
textbackground(GREEN);
textcolor(BLACK);
cputs("(?)");
textbackground(GREEN);
textcolor(BLACK);
gotoxy(65,3);
cputs("(X)");
gotoxy(65,5);
cputs("(Y)");
gotoxy(65,7);
```

```
cputs("(Z)");
textbackground(BLACK);
textcolor(WHITE);
gotoxy(1,25);
cputs("Axis=");
axis=toupper(getch());
}
while (axis!='X' && axis!='Y' && axis!='Z');
for (i=1;i<=4;i++) {
for (j=1;j<=4;j++) {
R[i][j]=0;
if (i==j) R[i][j]=1;
TT[i][j]=T[i][j];
}
}
switch (axis) {
case 'X': {
R[2][2]=cos(theta1);
R[3][3]=R[2][2];
R[3][2]=sin(theta1);
R[2][3]=-R[3][2];
break;
}
case 'Y': {
R[1][1]=cos(theta1);
R[3][3]=R[1][1];
R[1][3]=sin(theta1);
R[3][1]=-R[1][3];
break;
}
case 'Z': {
R[1][1]=cos(theta1);
R[2][2]=R[1][1];
R[2][1]=sin(theta1);
R[1][2]=-R[2][1];
break;
}
}
output_down();
output_down();
cprintf("Rotation of %f degrees about the %c axis.",theta,axis);
output_down();
for (i=4;i>=1;i--) {
output_down();
cprintf("  %1.4f  %1.4f  %1.4f
%1.4f",R[i][1],R[i][2],R[i][3],R[i][4]);
}
output_down();
cprintf("ROTATION-MATRIX:");
for (i=1;i<=4;i++) {
for (j=1;j<=4;j++) {
T[i][j]=0;
for (k=1;k<=4;k++) T[i][j]=T[i][j]+R[i][k]*TT[k][j];
}
```

```
}
output_down();
for (i=4;i>=1;i--) {
output_down();
cprintf("  %1.4f %1.4f %1.4f
%1.4f",T[i][1],T[i][2],T[i][3],T[i][4]);
}
output_down();
cprintf("TRANSFORMATION-MATRIX:");
}
```

```
/* zsphere.h */

float enter_A1();

sphere_values(float *A)
{
clear_message();
textbackground(BLUE);
textcolor(WHITE);
gotoxy(2,23);
cputs("Enter cube dimension ");
textbackground(GREEN);
textcolor(BLACK);
cputs("A1?");
textbackground(BLACK);
textcolor(WHITE);
gotoxy(65,3);
cputs("Sphere          ");
gotoxy(65,5);
cputs("(A1=A2=A3)      ");
A[1]=enter_A1();
A[2]=A[1];
A[3]=A[1];
output_down();
output_down();
cprintf("Sphere  : A1=%12.3f,  A2=%12.3f,
A3=%12.3f",A[1],A[2],A[3]);
}
```

```
/* zstand.h */

view_stand(float T[5][5])
{
float TT[5][5];
float T3,T2,T12;
int k,l,m;

for (k=1;k<=4;k++) {
for (l=1;l<=4;l++) {
TT[k][l]=0;
if (k==l) TT[k][l]=1;
}
}
textbackground(BLACK);
textcolor(WHITE);
gotoxy(65,3);
cputs("View (zmodels)");
textbackground(BLUE);
gotoxy(2,23);
cprintf("Enter position to view: (Pos1 Pos2 Pos3)");
cscanf("%f %f %f%c",&TT[1][4],&TT[2][4],&TT[3][4],&k);
T3=0;
for (k=1;k<=3;k++) T3=T3+((T[k][4]-TT[k][4])*(T[k][4]-TT[k][4]));
if (T3!=0) {
if (TT[1][4]==0 && TT[2][4]==0) {
TT[1][1]=1;
TT[2][2]=-1;
TT[3][3]=-1;
}
else {
T3=sqrt(T3);
for (k=1;k<=3;k++) TT[k][3]=(T[k][4]-TT[k][4])/T3;
T12=(TT[1][3]*TT[1][3])+(TT[2][3]*TT[2][3]);
TT[3][2]=1;
TT[2][2]=-TT[3][3]*TT[2][3]/T12;
TT[1][2]=-TT[3][3]*TT[1][3]/T12;
T2=sqrt((TT[1][2]*TT[1][2])+(TT[2][2]*TT[2][2])+1);
TT[3][2]=1/T2;
TT[2][2]=TT[2][2]/T2;
TT[1][2]=TT[1][2]/T2;
TT[1][1]=(TT[2][2]*TT[3][3])-(TT[3][2]*TT[2][3]);
TT[2][1]=(TT[3][2]*TT[1][3])-(TT[1][2]*TT[3][3]);
TT[3][1]=(TT[1][2]*TT[2][3])-(TT[2][2]*TT[1][3]);
}
}
else {
for (k=1;k<=4;k++) {
for (l=1;l<=4;l++) {
TT[k][l]=0;
}
}
TT[1][1]=1;
TT[3][2]=1;
```

```
TT[2][3]=-1;
}
TT[4][4]=1;
for (k=1;k<=4;k++) {
for (l=1;l<=4;l++) {
T[k][l]=TT[k][l];
}
}
}
```

```
/* zstart.h */

model_start(char in)
{
int start=' ';

do {
clear_message();
do {
textbackground(GREEN);
textcolor(BLACK);
gotoxy(65,3);
cputs("(1)");
textbackground(BLUE);
textcolor(LIGHTGRAY);
cputs("  Exit");
textbackground(GREEN);
textcolor(BLACK);
gotoxy(65,5);
cputs("(2)");
textbackground(BLUE);
textcolor(LIGHTGRAY);
cputs("  Model");
textbackground(GREEN);
textcolor(BLACK);
gotoxy(65,7);
cputs("(3)");
textbackground(BLUE);
textcolor(LIGHTGRAY);
cputs("  Object");
gotoxy(2,23);
textbackground(BLUE);
textcolor(WHITE);
cputs("Choose which type: ");
textbackground(GREEN);
textcolor(BLACK);
cputs("(?)");
start=toupper(getch());
}
while (start!='1' && start!='2' && start!='3');
switch (start) {
case '1': return;
case '2': {
if (in=='C') create_model();
else if (in=='E') edit_model();
else if (in=='P') process_model();
else if (in=='V') view_model();
break;
}
case '3': {
if (in=='C') create_object();
else if (in=='E') edit_object();
else if (in=='P') process_object();
else if (in=='V') view_object();
```

```
}
break;
}
}
while (start!='1');
}
```

```
/* ztrans.h */

enter_transform(float *A,float T[5][5],int list_length)
{
int i,j,which;

for (i=1;i<=4;i++) {
for (j=1;j<=4;j++) {
T[i][j]=0;
if (i==j) T[i][j]=1;
}
}
clear_message();
do {
gotoxy(65,3);
textbackground(GREEN);
textcolor(BLACK);
cputs("(1)");
textbackground(BLUE);
textcolor(LIGHTGRAY);
cputs("  Exit");
gotoxy(65,5);
textbackground(GREEN);
textcolor(BLACK);
cputs("(2)");
textbackground(BLUE);
textcolor(LIGHTGRAY);
cputs("  Rotate");
gotoxy(65,7);
textbackground(GREEN);
textcolor(BLACK);
cputs("(3)");
textbackground(BLUE);
textcolor(LIGHTGRAY);
cputs("  Translate");
gotoxy(65,9);
textbackground(GREEN);
textcolor(BLACK);
cputs("(4)");
textbackground(BLUE);
textcolor(LIGHTGRAY);
cputs("  Reset");
gotoxy(65,11);
textbackground(GREEN);
textcolor(BLACK);
cputs("(5)");
textbackground(BLUE);
textcolor(LIGHTGRAY);
cputs("  Save");
textcolor(WHITE);
gotoxy(2,23);
cputs("Enter type of position change: ");
textbackground(GREEN);
textcolor(BLACK);
```

```
cputs("(?)");
which=toupper(getch());
switch (which) {
case '1': {
return;
}
case '2': {
enter_rotation(T);
break;
}
case '3': {
enter_translation(T);
break;
}
case '4': {
for (i=1;i<=4;i++) {
for (j=1;j<=4;j++) {
T[i][j]=0;
if (i==j) T[i][j]=1;
}
}
output_down();
for (i=4;i>=1;i--) {
output_down();
cprintf("   %1.4f  %1.4f  %1.4f
%1.4f",T[i][1],T[i][2],T[i][3],T[i][4]);
}
output_down();
cprintf("TRANSFORMATION-MATRIX (RESET):");
break;
}
case '5': {
output_down();
for (i=4;i>=1;i--) {
output_down();
cprintf("   %1.4f  %1.4f  %1.4f
%1.4f",T[i][1],T[i][2],T[i][3],T[i][4]);
}
output_down();
cprintf("TRANSFORMATION-MATRIX (FINAL):");
save_model(A,T,list_length);
if (T[4][4]==0) which=0;
break;
}
}
clear_message();
}
while (which!='5');
}
```

```
/* ztrlate.h */

enter_translation(float T[5][5])
{
float DX=0,DY=0,DZ=0;
float DT[5][5],TT[5][5];
int i,j,k;

clear_message();
textbackground(BLUE);
textcolor(WHITE);
gotoxy(2,23);
cputs("Enter translation along X Y and Z axis,respectively: ");
textbackground(GREEN);
textcolor(BLACK);
cputs("(");
putch(30);
cputs("X ");
putch(30);
cputs("Y ");
putch(30);
cputs("Z)");
textbackground(BLACK);
textcolor(WHITE);
gotoxy(65,3);
cputs("Translation    ");
gotoxy(65,5);
cputs("(");
putch(30);
cputs("X ");
putch(30);
cputs("Y ");
putch(30);
cputs("Z)");
textbackground(BLACK);
textcolor(WHITE);
gotoxy(1,25);
putch(30);
cputs("X ");
putch(30);
cputs("Y ");
putch(30);
cputs("Z=");
cscanf("%f%f%f",&DX,&DY,&DZ);
for (i=1;i<=4;i++) {
for (j=1;j<=4;j++) {
DT[i][j]=0;
if (i==j) DT[i][j]=1;
TT[i][j]=T[i][j];
}
}
DT[1][4]=DX;
DT[2][4]=DY;
DT[3][4]=DZ;
```

```
output_down();
output_down();
cprintf("Translation X: %f, Y: %f, Z: %f.",DX,DY,DZ);
output_down();
for (i=4;i>=1;i--) {
output_down();
cprintf("  %1.4f  %1.4f  %1.4f
%1.4f",DT[i][1],DT[i][2],DT[i][3],DT[i][4]);
}
output_down();
cprintf("TRANSLATION-MATRIX:");
for (i=1;i<=4;i++) {
for (j=1;j<=4;j++) {
T[i][j]=0;
for (k=1;k<=4;k++) T[i][j]=T[i][j]+DT[i][k]*TT[k][j];
}
}
output_down();
for (i=4;i>=1;i--) {
output_down();
cprintf("  %1.4f %1.4f %1.4f
%1.4f",T[i][1],T[i][2],T[i][3],T[i][4]);
}
output_down();
cprintf("TRANSFORMATION-MATRIX:");
}
```

```
/* zvesout.h */

vert_edge_out(long int **VV,long int VV_num,long int
VV_count,long int **EE,long int EE_num,long int EE_count,int
**EG,long int **VE,long int VE_num)
{
long int x,y,z;
long int where3;

fseek(zvertice,0,SEEK_END);
where3=ftell(zvertice);
for (x=1;x<VV_num;x++) {
for (y=1;y<=16;y++) fprintf(zvertice,"
",10);
}
fseek(zvertice,where3,SEEK_SET);
for (x=1;x<VV_num;x++) {
fprintf(zvertice,"%c%ld(%ld %ld
%ld):",10,VV_count+x,VV[x][1],VV[x][2],VV[x][3]);
where3+=400;
fseek(zvertice,where3,SEEK_SET);
}
for (x=1;x<VE_num;x++) {
fseek(zvertice,400*VE[x][1]+20,SEEK_SET);
for (y=2;y<VE[x][0];y++) {
fprintf(zvertice,"%c%ld(%d %d
%d)",10,VE[x][y],EG[VE[x][y]-EE_count][1],EG[VE[x][y]-EE_count][2
],EG[VE[x][y]-EE_count][3]);
fprintf(zvertice,":%ld(%ld %ld
%ld)",VE[x][y+1],EE[VE[x][y]-EE_count][3]+EG[VE[x][y]-EE_count][1
],EE[VE[x][y]-EE_count][4]+EG[VE[x][y]-EE_count][2],EE[VE[x][y]-E
E_count][5]+EG[VE[x][y]-EE_count][3]);
y++;
}
fprintf(zvertice,"%c0",10);
}
fseek(zedge,0,SEEK_END);
where3=ftell(zedge);
for (x=1;x<EE_num;x++) {
for (y=1;y<=10;y++) fprintf(zedge,"
",10);
}
fseek(zedge,where3,SEEK_SET);
for (x=1;x<EE_num;x++) {
fprintf(zedge,"%c%ld(%d %d %d):%ld(%ld %ld %ld),%ld(%ld %ld
%ld):",10,EE_count+x,EG[x][1],EG[x][2],EG[x][3],EE[x][1],EE[x][3]
,EE[x][4],EE[x][5],EE[x][2],EE[x][3]+EG[x][1],EE[x][4]+EG[x][2],E
E[x][5]+EG[x][3]);
where3+=250;
fseek(zedge,where3,SEEK_SET);
}
}
```

```
/* zvoxel.h */

draw_voxel(float T[5][5],long int *l)
{
float sidex[5][6],sidey[5][6],sidez[5][6];
float V[6];
int vx[10],vy[10],vz[10];
int i,j,k,ll;
char n[80];
float Z;

Z=T[4][4];
for (i=1;i<=3;i++) l[i]+=1;
sidex[1][1]=Z*l[1];
sidex[1][2]=Z*l[2];
sidex[1][3]=Z*l[3];
sidex[2][1]=Z*l[1];
sidex[2][2]=Z*l[2];
sidex[2][3]=Z*(l[3]-1);
sidex[3][1]=Z*l[1];
sidex[3][2]=Z*(l[2]-1);
sidex[3][3]=Z*(l[3]-1);
sidex[4][1]=Z*l[1];
sidex[4][2]=Z*(l[2]-1);
sidex[4][3]=Z*l[3];
sidey[1][1]=Z*l[1];
sidey[1][2]=Z*l[2];
sidey[1][3]=Z*l[3];
sidey[2][1]=Z*l[1];
sidey[2][2]=Z*l[2];
sidey[2][3]=Z*(l[3]-1);
sidey[3][1]=Z*(l[1]-1);
sidey[3][2]=Z*l[2];
sidey[3][3]=Z*(l[3]-1);
sidey[4][1]=Z*(l[1]-1);
sidey[4][2]=Z*l[2];
sidey[4][3]=Z*l[3];
sidez[1][1]=Z*l[1];
sidez[1][2]=Z*l[2];
sidez[1][3]=Z*l[3];
sidez[2][1]=Z*l[1];
sidez[2][2]=Z*(l[2]-1);
sidez[2][3]=Z*l[3];
sidez[3][1]=Z*(l[1]-1);
sidez[3][2]=Z*(l[2]-1);
sidez[3][3]=Z*l[3];
sidez[4][1]=Z*(l[1]-1);
sidez[4][2]=Z*l[2];
sidez[4][3]=Z*l[3];
if (T[1][4]<0) {
for (i=1;i<=4;i++) sidex[i][1]=Z*(l[1]-1);
}
k=0;
for (i=1;i<=4;i++) {
```

```
for (j=1;j<=3;j++) V[j]=sidex[i][j];
V[4]=0;
V[5]=0;
graph_V12(V,T);
V[4]=floor(V[4]);
V[5]=floor(V[5]);
gcvt(V[4],80,n);
vx[k]=atoi(n);
k+=1;
gcvt(V[5],80,n);
vx[k]=atoi(n);
k+=1;
}
vx[8]=vx[0];
vx[9]=vx[1];
setfillstyle(SOLID_FILL,RED);
fillpoly(5,vx);
if (T[2][4]<0) {
for (i=1;i<=4;i++) sidey[i][2]=Z*(l[2]-1);
}
k=0;
for (i=1;i<=4;i++) {
for (j=1;j<=3;j++) V[j]=sidey[i][j];
V[4]=0;
V[5]=0;
graph_V12(V,T);
V[4]=floor(V[4]);
V[5]=floor(V[5]);
gcvt(V[4],80,n);
vy[k]=atoi(n);
k+=1;
gcvt(V[5],80,n);
vy[k]=atoi(n);
k+=1;
}
vy[8]=vy[0];
vy[9]=vy[1];
setfillstyle(SOLID_FILL,BLUE);
fillpoly(5,vy);
if (T[3][4]<0) {
for (i=1;i<=4;i++) sidez[i][3]=Z*(l[3]-1);
}
k=0;
for (i=1;i<=4;i++) {
for (j=1;j<=3;j++) V[j]=sidez[i][j];
V[4]=0;
V[5]=0;
graph_V12(V,T);
V[4]=floor(V[4]);
V[5]=floor(V[5]);
gcvt(V[4],80,n);
vz[k]=atoi(n);
k+=1;
gcvt(V[5],80,n);
```

```
vz[k]=atoi(n);
k+=1;
}
vz[8]=vz[0];
vz[9]=vz[1];
setfillstyle(SOLID_FILL,YELLOW);
fillpoly(5,vz);
}
```

```
/* zxapview.h */

FILE *pmodels;
FILE *info;

AP_graph_test(float T[5][5])
{
int list_length;
float Pabc[4];
float N2a;
float N3ab;
float V[6];
int NN1,NN2,NN3;
int VV1,VV2;
float VV11,VV21,VV12,VV22,VV13,VV23,VV14,VV24;
float VV15,VV25,VV16,VV26,VV17,VV27,VV18,VV28;
int g,h,i,j,k,ll,m;
char n[80];
int g_driver,g_mode,g_error;

detectgraph(&g_driver,&g_mode);
if (g_driver<0) {
printf("No graphics driver #%d, mode #%d\n",g_driver,g_mode);
exit(1);
}
initgraph(&g_driver,&g_mode,"");
g_error=graphresult();
if (g_error<0) {
printf("Initgraph error: %s.\n",grapherrormsg(g_error));
exit(1);
}
setbkcolor(BLACK);
setcolor(WHITE);
graph_axis(T);
pmodels=fopen("pmodels.c","r");
rewind(pmodels);
fscanf(pmodels,"%d",&list_length);
if (list_length!=0) {
fseek(pmodels,2,SEEK_CUR);
fscanf(pmodels,"%d %d %d",&NN1,&NN2,&NN3);
fseek(pmodels,2,SEEK_CUR);
m=0;
for (i=1;i<=NN1;i++) {
for (j=1;j<=NN2;j++) {
for (k=1;k<=NN3;k++) {
for (g=1;g<=3;g++) {
fscanf(pmodels,"%f",&Pabc[g]);
fseek(pmodels,1,SEEK_CUR);
}
for (g=1;g<=5;g++) V[g]=0;
V[1]=Pabc[1];
V[2]=Pabc[2];
V[3]=Pabc[3];
graph_V12(V,T);
```

```
V[4]=floor(V[4]);
V[5]=floor(V[5]);
gcvt(V[4],80,n);
VV1=atoi(n);
gcvt(V[5],80,n);
VV2=atoi(n);
putpixel(VV1,VV2,WHITE);
if ((i==1 || i==NN1) && (j==1 || j==NN2) && (k!=1))
lineto(VV1,VV2);
moveto(VV1,VV2);
if (i==1 && j==1 && k==1) {
VV11=VV1;
VV21=VV2;
VV12=VV1;
VV22=VV2;
}
if (i==1 && j==1 && k==NN3) {
VV13=VV1;
VV23=VV2;
VV14=VV1;
VV24=VV2;
}
if (i==1 && j==NN2 && k==1) {
VV15=VV1;
VV25=VV2;
}
if (i==NN1 && j==1 && k==1) {
VV16=VV1;
VV26=VV2;
}
if (i==1 && j==NN2 && k==NN3) {
VV17=VV1;
VV27=VV2;
}
if (i==NN1 && j==1 && k==NN3) {
VV18=VV1;
VV28=VV2;
}
if (i==1 && j!=1 && k==1) {
line(VV1,VV2,VV11,VV21);
VV11=VV1;
VV21=VV2;
}
if (i!=1 && j==1 && k==1) {
line(VV1,VV2,VV12,VV22);
VV12=VV1;
VV22=VV2;
}
if (i==1 && j!=1 && k==NN3) {
line(VV1,VV2,VV13,VV23);
VV13=VV1;
VV23=VV2;
}
if (i!=1 && j==1 && k==NN3) {
```

```
line(VV1,VV2,VV14,VV24);
VV14=VV1;
VV24=VV2;
}
if (i!=1 && j==NN2 && k==1) {
line(VV1,VV2,VV15,VV25);
VV15=VV1;
VV25=VV2;
}
if (i==NN1 && j!=1 && k==1) {
line(VV1,VV2,VV16,VV26);
VV16=VV1;
VV26=VV2;
}
if (i!=1 && j==NN2 && k==NN3) {
line(VV1,VV2,VV17,VV27);
VV17=VV1;
VV27=VV2;
}
if (i==NN1 && j!=1 && k==NN3) {
line(VV1,VV2,VV18,VV28);
VV18=VV1;
VV28=VV2;
}
m+=1;
if (m==2 || k==NN3) {
m=0;
fseek(pmodels,2,SEEK_CUR);
}
}
if (j==NN2) {
fscanf(pmodels,"%d",&NN2);
fseek(pmodels,1,SEEK_CUR);
fscanf(pmodels,"%d",&NN3);
fseek(pmodels,2,SEEK_CUR);
}
else {
fscanf(pmodels,"%d",&NN3);
fseek(pmodels,2,SEEK_CUR);
}
}
}
fclose(pmodels);
getch();
}
closegraph();
}
```

```
/* zxapzvw.h */

FILE *pmodels;
FILE *zmodels;

APZ_graph_test(float T[5][5])
{
int list_length;
float Pabc[4];
float N2a;
float N3ab;
float V[6];
int NN1,NN2,NN3;
int VV1,VV2;
float VV11,VV21,VV12,VV22,VV13,VV23,VV14,VV24;
float VV15,VV25,VV16,VV26,VV17,VV27,VV18,VV28;
int g,h,i,j,k,ll,m;
char n[80];
int g_driver,g_mode,g_error;
int ***ZZ;
long int DDmin[4],DDmax[4],DD[4];
int l[4];
float lx1[5],lx2[5];
float Ax1[5],Ax2[5];
double Z_res;

detectgraph(&g_driver,&g_mode);
if (g_driver<0) {
printf("No graphics driver #%d, mode #%d\n",g_driver,g_mode);
exit(1);
}
initgraph(&g_driver,&g_mode,"");
g_error=graphresult();
if (g_error<0) {
printf("Initgraph error: %s.\n",grapherrormsg(g_error));
exit(1);
}
setbkcolor(BLACK);
setcolor(WHITE);
graph_axis(T);
zmodels=fopen("zmodels.c","r");
rewind(zmodels);
fscanf(zmodels,"%ld %ld %ld ",&DDmin[1],&DDmin[2],&DDmin[3]);
fscanf(zmodels,"%ld %ld %ld %lf",&DD[1],&DD[2],&DD[3],&Z_res);
for (i=1;i<=3;i++) {
DDmax[i]=DDmin[i]+DD[i]-1;
}
ZZ=(int ***) malloc((unsigned) (DD[1])*sizeof(int**));
if (!ZZ) {
perror("allocation failure 1 in ZZ()");
exit(1);
}
ZZ-=1;
for (i=1;i<=DD[1];i++) {
```

```
ZZ[i]=(int **) malloc((unsigned) (DD[2])*sizeof(int*));
if (!ZZ[i]) {
perror("allocation failure 2 in ZZ()");
exit(1);
}
ZZ[i]-=1;
}
for (i=1;i<=DD[1];i++) {
for (j=1;j<=DD[2];j++) {
ZZ[i][j]=(int *) malloc((unsigned) (DD[3])*sizeof(int));
if (!ZZ[i][j]) {
perror("allocation failure 3 in ZZ()");
exit(1);
}
ZZ[i][j]-=1;
}
}
fseek(zmodels,2,SEEK_CUR);
for (i=1;i<=DD[1];i++) {
for (j=1;j<=DD[2];j++) {
for (k=1;k<=DD[3];k++) ZZ[i][j][k]=fgetc(zmodels);
fseek(zmodels,2,SEEK_CUR);
}
fseek(zmodels,2,SEEK_CUR);
}
fclose(zmodels);
T[4][4]=Z_res;
if (T[3][4]<0) ll=5;
else ll=1;
if (T[2][4]<0) ll=ll+2;
if (T[1][4]<0) ll=ll+1;
for (i=1;i<=DD[1];i++) {
for (j=1;j<=DD[2];j++) {
for (k=1;k<=DD[3];k++) {
switch(ll) {
case 1: {
l[1]=DDmin[1]+i-1;
l[2]=DDmin[2]+j-1;
l[3]=DDmin[3]+k-1;
break;
}
case 2: {
l[1]=DDmax[1]-i+1;
l[2]=DDmin[2]+j-1;
l[3]=DDmin[3]+k-1;
break;
}
case 3: {
l[1]=DDmin[1]+i-1;
l[2]=DDmax[2]-j+1;
l[3]=DDmin[3]+k-1;
break;
}
case 4: {
```

```
l[1]=DDmax[1]-i+1;
l[2]=DDmax[2]-j+1;
l[3]=DDmin[3]+k-1;
break;
}
case 5: {
l[1]=DDmin[1]+i-1;
l[2]=DDmin[2]+j-1;
l[3]=DDmax[3]-k+1;
break;
}
case 6: {
l[1]=DDmax[1]-i+1;
l[2]=DDmin[2]+j-1;
l[3]=DDmax[3]-k+1;
break;
}
case 7: {
l[1]=DDmin[1]+i-1;
l[2]=DDmax[2]-j+1;
l[3]=DDmax[3]-k+1;
break;
}
case 8: {
l[1]=DDmax[1]-i+1;
l[2]=DDmax[2]-j+1;
l[3]=DDmax[3]-k+1;
break;
}
}
if (ZZ[l[1]-DDmin[1]+1][l[2]-DDmin[2]+1][l[3]-DDmin[3]+1]!='0')
draw_voxel(T,l);
}
}
}
for (i=DD[1];i>=1;i--) {
for (j=DD[2];j>=1;j--) free((char*) (ZZ[i][j]+1));
}
for (i=DD[1];i>=1;i--) free((char*) (ZZ[i]+1));
free((char*) (ZZ+1));
setcolor(WHITE);
pmodels=fopen("pmodels.c","r");
rewind(pmodels);
fscanf(pmodels,"%d",&list_length);
if (list_length!=0) {
fseek(pmodels,2,SEEK_CUR);
fscanf(pmodels,"%d %d %d",&NN1,&NN2,&NN3);
fseek(pmodels,2,SEEK_CUR);
m=0;
for (i=1;i<=NN1;i++) {
for (j=1;j<=NN2;j++) {
for (k=1;k<=NN3;k++) {
for (g=1;g<=3;g++) {
fscanf(pmodels,"%f",&Pabc[g]);
```

```
fseek(pmodels,1,SEEK_CUR);
}
for (g=1;g<=5;g++) V[g]=0;
V[1]=Pabc[1];
V[2]=Pabc[2];
V[3]=Pabc[3];
graph_V12(V,T);
V[4]=floor(V[4]);
V[5]=floor(V[5]);
gcvt(V[4],80,n);
VV1=atoi(n);
gcvt(V[5],80,n);
VV2=atoi(n);
putpixel(VV1,VV2,RED);
if ((i==1 || i==NN1) && (j==1 || j==NN2) && (k!=1))
lineto(VV1,VV2);
moveto(VV1,VV2);
if (i==1 && j==1 && k==1) {
VV11=VV1;
VV21=VV2;
VV12=VV1;
VV22=VV2;
}
if (i==1 && j==1 && k==NN3) {
VV13=VV1;
VV23=VV2;
VV14=VV1;
VV24=VV2;
}
if (i==1 && j==NN2 && k==1) {
VV15=VV1;
VV25=VV2;
}
if (i==NN1 && j==1 && k==1) {
VV16=VV1;
VV26=VV2;
}
if (i==1 && j==NN2 && k==NN3) {
VV17=VV1;
VV27=VV2;
}
if (i==NN1 && j==1 && k==NN3) {
VV18=VV1;
VV28=VV2;
}
if (i==1 && j!=1 && k==1) {
line(VV1,VV2,VV11,VV21);
VV11=VV1;
VV21=VV2;
}
if (i!=1 && j==1 && k==1) {
line(VV1,VV2,VV12,VV22);
VV12=VV1;
VV22=VV2;
```

```
}
if (i==1 && j!=1 && k==NN3) {
line(VV1,VV2,VV13,VV23);
VV13=VV1;
VV23=VV2;
}
if (i!=1 && j==1 && k==NN3) {
line(VV1,VV2,VV14,VV24);
VV14=VV1;
VV24=VV2;
}
if (i!=1 && j==NN2 && k==1) {
line(VV1,VV2,VV15,VV25);
VV15=VV1;
VV25=VV2;
}
if (i==NN1 && j!=1 && k==1) {
line(VV1,VV2,VV16,VV26);
VV16=VV1;
VV26=VV2;
}
if (i!=1 && j==NN2 && k==NN3) {
line(VV1,VV2,VV17,VV27);
VV17=VV1;
VV27=VV2;
}
if (i==NN1 && j!=1 && k==NN3) {
line(VV1,VV2,VV18,VV28);
VV18=VV1;
VV28=VV2;
}
m+=1;
if (m==2 || k==NN3) {
m=0;
fseek(pmodels,2,SEEK_CUR);
}
}
if (j==NN2) {
fscanf(pmodels,"%d",&NN2);
fseek(pmodels,1,SEEK_CUR);
fscanf(pmodels,"%d",&NN3);
fseek(pmodels,2,SEEK_CUR);
}
else {
fscanf(pmodels,"%d",&NN3);
fseek(pmodels,2,SEEK_CUR);
}
}
}
fclose(pmodels);
getch();
}
closegraph();
}
```

```
/* zxaview.h */

FILE *pmodels;
FILE *info;

A_graph_test(float T[5][5])
{
int list_length;
float Pabc[4];
float N2a;
float N3ab;
float V[6];
int NN1,NN2,NN3;
int VV1,VV2;
float VV11,VV21,VV12,VV22,VV13,VV23,VV14,VV24;
float VV15,VV25,VV16,VV26,VV17,VV27,VV18,VV28;
int g,h,i,j,k,ll,m;
char n[80];
int g_driver,g_mode,g_error;

detectgraph(&g_driver,&g_mode);
if (g_driver<0) {
printf("No graphics driver #%d, mode #%d\n",g_driver,g_mode);
exit(1);
}
initgraph(&g_driver,&g_mode,"");
g_error=graphresult();
if (g_error<0) {
printf("Initgraph error: %s.\n",grapherrormsg(g_error));
exit(1);
}
setbkcolor(BLACK);
setcolor(WHITE);
graph_axis(T);
pmodels=fopen("pmodels.c","r");
rewind(pmodels);
fscanf(pmodels,"%d",&list_length);
if (list_length!=0) {
fseek(pmodels,2,SEEK_CUR);
fscanf(pmodels,"%d %d %d",&NN1,&NN2,&NN3);
fseek(pmodels,2,SEEK_CUR);
m=0;
for (i=1;i<=NN1;i++) {
for (j=1;j<=NN2;j++) {
for (k=1;k<=NN3;k++) {
for (g=1;g<=3;g++) {
fscanf(pmodels,"%f",&Pabc[g]);
fseek(pmodels,1,SEEK_CUR);
}
for (g=1;g<=5;g++) V[g]=0;
V[1]=Pabc[1];
V[2]=Pabc[2];
V[3]=Pabc[3];
graph_V12(V,T);
```

```
V[4]=floor(V[4]);
V[5]=floor(V[5]);
gcvt(V[4],80,n);
VV1=atoi(n);
gcvt(V[5],80,n);
VV2=atoi(n);
if ((i==1 || i==NN1) && (j==1 || j==NN2) && (k!=1))
lineto(VV1,VV2);
moveto(VV1,VV2);
if (i==1 && j==1 && k==1) {
VV11=VV1;
VV21=VV2;
VV12=VV1;
VV22=VV2;
}
if (i==1 && j==1 && k==NN3) {
VV13=VV1;
VV23=VV2;
VV14=VV1;
VV24=VV2;
}
if (i==1 && j==NN2 && k==1) {
VV15=VV1;
VV25=VV2;
}
if (i==NN1 && j==1 && k==1) {
VV16=VV1;
VV26=VV2;
}
if (i==1 && j==NN2 && k==NN3) {
VV17=VV1;
VV27=VV2;
}
if (i==NN1 && j==1 && k==NN3) {
VV18=VV1;
VV28=VV2;
}
if (i==1 && j!=1 && k==1) {
line(VV1,VV2,VV11,VV21);
VV11=VV1;
VV21=VV2;
}
if (i!=1 && j==1 && k==1) {
line(VV1,VV2,VV12,VV22);
VV12=VV1;
VV22=VV2;
}
if (i==1 && j!=1 && k==NN3) {
line(VV1,VV2,VV13,VV23);
VV13=VV1;
VV23=VV2;
}
if (i!=1 && j==1 && k==NN3) {
line(VV1,VV2,VV14,VV24);
```

```
VV14=VV1;
VV24=VV2;
}
if (i!=1 && j==NN2 && k==1) {
line(VV1,VV2,VV15,VV25);
VV15=VV1;
VV25=VV2;
}
if (i==NN1 && j!=1 && k==1) {
line(VV1,VV2,VV16,VV26);
VV16=VV1;
VV26=VV2;
}
if (i!=1 && j==NN2 && k==NN3) {
line(VV1,VV2,VV17,VV27);
VV17=VV1;
VV27=VV2;
}
if (i==NN1 && j!=1 && k==NN3) {
line(VV1,VV2,VV18,VV28);
VV18=VV1;
VV28=VV2;
}
m+=1;
if (m==2 || k==NN3) {
m=0;
fseek(pmodels,2,SEEK_CUR);
}
}
if (j==NN2) {
fscanf(pmodels,"%d",&NN2);
fseek(pmodels,1,SEEK_CUR);
fscanf(pmodels,"%d",&NN3);
fseek(pmodels,2,SEEK_CUR);
}
else {
fscanf(pmodels,"%d",&NN3);
fseek(pmodels,2,SEEK_CUR);
}
}
}
fclose(pmodels);
getch();
}
closegraph();
}
```

```
/* zxpdef.h */

FILE *info;
FILE *pmodels;
FILE *zmodels;

P_define(float *A,float T[5][5],int list_length)
{
float Pa[4],Pab[4],Pabc[4];
float M1,N1,S1;
float M2a,N2a,S2a;
float M3ab,N3ab,S3ab;
float Ma,Mb,Msqr,points=0,total_points;
int NN1,NN2,NN3;
int ***ZZ;
double Pmin[4],Pmax[4];
double Dmin[4],Dmax[4],D[4];
long int DDmin[4],DDmax[4],DD[4];
double E_res,Z_res;
int i,j,k,l,m;
char n[80];

if (list_length!=0) {
info=fopen("info.c","r+");
rewind(info);
fscanf(info,"%lf",&E_res);
fseek(info,52,SEEK_SET);
fscanf(info,"%lf",&Z_res);
fclose(info);
output_down();
cprintf("Point resolution = %lf, Z-resolution =
%lf.",E_res,Z_res);
total_points=ceil((A[1]/E_res)*(A[2]/E_res)*(A[3]/E_res));
output_down();
cprintf("Total points in enclosure (approximate) =
%f",total_points);
M1=A[1];
if (M1>=E_res) N1=floor(A[1]/E_res)+1;
else N1=2;
S1=M1/(N1-1);
gcvt(N1,80,n);
NN1=atoi(n);
output_down();
output_down();
output_down();
output_down();
cprintf("#points=                    0");
gotoxy(2,6);
cprintf("NN1=%d",NN1);
m=0;
pmodels=fopen("pmodels.c","w+");
rewind(pmodels);
fprintf(pmodels,"%d%c%d ",list_length,10,NN1);
for (i=1;i<=NN1;i++) {
```

```
for (j=1;j<=3;j++) Pa[j]=T[j][4]+T[j][1]*(i-1)*S1;
switch (A[4]) {
case 2: {
M2a=A[1];
break;
}
case 3: {
M2a=A[2];
break;
}
case 4:
case 5:
case 6: {
Ma=(i-1)*S1*(i-1)*S1;
if (i!=NN1) M2a=sqrt(M1*M1-Ma);
else M2a=0;
break;
}
}
switch (A[4]) {
case 2:
case 3: {
if (M2a>=E_res) N2a=floor(M2a/E_res)+1;
else N2a=2;
S2a=M2a/(N2a-1);
break;
}
case 4:
case 5:
case 6: {
if (M2a>=E_res) N2a=floor(M2a/E_res)+1;
else N2a=2;
if (i!=NN1) S2a=M2a/(N2a-1);
else {
N2a=1;
S2a=0;
break;
}
}
}
gcvt(N2a,80,n);
NN2=atoi(n);
gotoxy(2,5);
cprintf("NN2=%d",NN2);
fprintf(pmodels,"%d ",NN2);
for (j=1;j<=NN2;j++) {
for (k=1;k<=3;k++) Pab[k]=Pa[k]+T[k][2]*(j-1)*S2a;
switch (A[4]) {
case 2: {
M3ab=A[1];
break;
}
case 3:
case 4: {
```

```
M3ab=A[3];
break;
}
case 5: {
if (i!=NN1 && j!=NN2) {
Ma=(i-1)*S1*(i-1)*S1;
Mb=(j-1)*S2a*(j-1)*S2a;
M3ab=sqrt(M1*M1-Ma-Mb);
}
else M3ab=0;
break;
}
case 6: {
if (i!=NN1 && j!=NN2) {
Ma=(i-1)*S1*(i-1)*S1;
Mb=(j-1)*S2a*(j-1)*S2a;
M3ab=A[3]*(1-sqrt(Ma+Mb)/A[1]);
}
else M3ab=0;
break;
}
}
switch (A[4]) {
case 2:
case 3:
case 4: {
if (M3ab>=E_res) N3ab=floor(M3ab/E_res)+1;
else N3ab=2;
S3ab=M3ab/(N3ab-1);
break;
}
case 5:
case 6: {
if (M3ab>=E_res) N3ab=floor(M3ab/E_res)+1;
else N3ab=2;
if (i!=NN1 && j!=NN2) S3ab=M3ab/(N3ab-1);
else {
N3ab=1;
S3ab=0;
}
break;
}
}
gcvt(N3ab,80,n);
NN3=atoi(n);
gotoxy(2,4);
cprintf("NN3=%d",NN3);
fprintf(pmodels,"%d%c",NN3,10);
for (k=1;k<=NN3;k++) {
points+=1;
for (l=1;l<=3;l++) {
Pabc[l]=Pab[l]+T[l][3]*(k-1)*S3ab;
if (i==1 && j==1 && k==1) {
Pmin[l]=Pabc[l];
```

```
Pmax[1]=Pabc[1];
}
if (Pmin[1]>Pabc[1]) Pmin[1]=Pabc[1];
if (Pmax[1]<Pabc[1]) Pmax[1]=Pabc[1];
fprintf(pmodels,"%f ",Pabc[1]);
m+=1;
if (m==6) {
fprintf(pmodels,"%c",10);
m=0;
}
}
}
m=0;
fprintf(pmodels,"%c",10);
}
gotoxy(30,3);
cprintf("%f",points);
}
output_down();
cprintf("Pabc data stored in file: pmodels.c.");
output_down();
cprintf("(Pabc)min = %lf %lf %lf.",Pmin[1],Pmin[2],Pmin[3]);
output_down();
cprintf("(Pabc)max = %lf %lf %lf.",Pmax[1],Pmax[2],Pmax[3]);
for (i=1;i<=3;i++) {
Dmin[i]=floor(Pmin[i]/Z_res)-1;
Dmax[i]=floor(Pmax[i]/Z_res)+1;
D[i]=Dmax[i]-Dmin[i]+1;
}
for (i=1;i<=3;i++) {
gcvt(Dmin[i],80,n);
DDmin[i]=atol(n);
gcvt(Dmax[i],80,n);
DDmax[i]=atol(n);
DD[i]=DDmax[i]-DDmin[i]+1;
}
output_down();
cprintf("(Z)min = %ld %ld %ld.",DDmin[1],DDmin[2],DDmin[3]);
cprintf("(Z)max = %ld %ld %ld.",DDmax[1],DDmax[2],DDmax[3]);
cprintf("(Z)size = %ld %ld %ld.",DD[1],DD[2],DD[3]);
output_down();
cprintf("Total memory heap = %u.",coreleft());
ZZ=(int ***) malloc((unsigned) DD[1]*sizeof(int**));
if (!ZZ) {
perror("allocation failure 1 in ZZ()");
exit(1);
}
ZZ-=1;
for (i=1;i<=DD[1];i++) {
ZZ[i]=(int **) malloc((unsigned) DD[2]*sizeof(int*));
if (!ZZ[i]) {
perror("allocation failure 2 in ZZ()");
exit(1);
}
```

```
ZZ[i]-=1;
}
for (i=1;i<=DD[1];i++) {
for (j=1;j<=DD[2];j++) {
ZZ[i][j]=(int *) malloc((unsigned) DD[3]*sizeof(int));
if (!ZZ[i][j]) (
perror("allocation failure 3 in ZZ()");
exit(1);
}
ZZ[i][j]-=1;
}
}
output_down();
cprintf("ZZ[%ld][%ld][%ld] allocated.",DD[1],DD[2],DD[3]);
cprintf(" Memory heap left = %u.",coreleft());
for (i=1;i<=DD[1];i++) (
for (j=1;j<=DD[2];j++) (
for (k=1;k<=DD[3];k++) ZZ[i][j][k]='0';
}
)
rewind(pmodels);
fscanf(pmodels,"%d",&list_length);
fseek(pmodels,2,SEEK_CUR);
fscanf(pmodels,"%d %d %d",&NN1,&NN2,&NN3);
fseek(pmodels,2,SEEK_CUR);
m=0;
points=0;
output_down();
cprintf("#points=                    0");
for (i=1;i<=NN1;i++) {
for (j=1;j<=NN2;j++) {
for (k=1;k<=NN3;k++) {
points+=1;
for (l=1;l<=3;l++) (
fscanf(pmodels,"%f",&Pabc[l]);
fseek(pmodels,1,SEEK_CUR);
}
for (l=1;l<=3;l++) {
D[l]=floor(Pabc[l]/Z_res)-Dmin[l]+1;
gcvt(D[l],80,n);
DD[l]=atol(n);
}
ZZ[DD[1]][DD[2]][DD[3]]='1';
m+=1;
if (m==2 || k==NN3) {
m=0;
fseek(pmodels,2,SEEK_CUR);
}
}
if (j==NN2) (
fscanf(pmodels,"%d",&NN2);
fseek(pmodels,1,SEEK_CUR);
fscanf(pmodels,"%d",&NN3);
fseek(pmodels,2,SEEK_CUR);
```

```
}
else {
fscanf(pmodels,"%d",&NN3);
fseek(pmodels,2,SEEK_CUR);
}
}
gotoxy(30,3);
cprintf("%f",points);
}
fclose(pmodels);
for (i=1;i<=3;i++) DD[i]=DDmax[i]-DDmin[i]+1;
zmodels=fopen("zmodels.c","w");
rewind(zmodels);
fprintf(zmodels,"%ld %ld %ld ",DDmin[1],DDmin[2],DDmin[3]);
fprintf(zmodels,"%ld %ld %ld %lf%c",DD[1],DD[2],DD[3],Z_res,10);
for (i=1;i<=DD[1];i++) {
for (j=1;j<=DD[2];j++) {
for (k=1;k<=DD[3];k++) fputc(ZZ[i][j][k],zmodels);
fprintf(zmodels,"%c",10);
}
fprintf(zmodels,"%c",10);
}
fclose(zmodels);
output_down();
cprintf("Z data stored in file: zmodels.c.");
for (i=DD[1];i>=1;i--) {
for (j=DD[2];j>=1;j--) free((char*) (ZZ[i][j]+1));
}
for (i=DD[1];i>=1;i--) free((char*) (ZZ[i]+1));
free((char*) (ZZ+1));
output_down();
cprintf("Memory heap freed (= %u).",coreleft());
}
}
```

```
/* zxpview.h */

FILE *pmodels;
FILE *info;

P_graph_test(float T[5][5])
{
int list_length;
float Pabc[4];
float N2a;
float N3ab;
float V[6];
int NN1,NN2,NN3;
int VV1,VV2;
float VV11,VV21,VV12,VV22,VV13,VV23,VV14,VV24;
float VV15,VV25,VV16,VV26,VV17,VV27,VV18,VV28;
int g,h,i,j,k,ll,m;
char n[80];
int g_driver,g_mode,g_error;

detectgraph(&g_driver,&g_mode);
if (g_driver<0) {
printf("No graphics driver #%d, mode #%d\n",g_driver,g_mode);
exit(1);
}
initgraph(&g_driver,&g_mode,"");
g_error=graphresult();
if (g_error<0) {
printf("Initgraph error: %s.\n",grapherrormsg(g_error));
exit(1);
}
setbkcolor(BLACK);
setcolor(WHITE);
graph_axis(T);
pmodels=fopen("pmodels.c","r");
rewind(pmodels);
fscanf(pmodels,"%d",&list_length);
if (list_length!=0) {
fseek(pmodels,2,SEEK_CUR);
fscanf(pmodels,"%d %d %d",&NN1,&NN2,&NN3);
fseek(pmodels,2,SEEK_CUR);
m=0;
for (i=1;i<=NN1;i++) {
for (j=1;j<=NN2;j++) {
for (k=1;k<=NN3;k++) {
for (g=1;g<=3;g++) {
fscanf(pmodels,"%f",&Pabc[g]);
fseek(pmodels,1,SEEK_CUR);
}
for (g=1;g<=5;g++) V[g]=0;
V[1]=Pabc[1];
V[2]=Pabc[2];
V[3]=Pabc[3];
graph_V12(V,T);
```

```
V[4]=floor(V[4]);
V[5]=floor(V[5]);
gcvt(V[4],80,n);
VV1=atoi(n);
gcvt(V[5],80,n);
VV2=atoi(n);
putpixel(VV1,VV2,WHITE);
moveto(VV1,VV2);
m+=1;
if (m==2 || k==NN3) {
m=0;
fseek(pmodels,2,SEEK_CUR);
}
}
if (j==NN2) {
fscanf(pmodels,"%d",&NN2);
fseek(pmodels,1,SEEK_CUR);
fscanf(pmodels,"%d",&NN3);
fseek(pmodels,2,SEEK_CUR);
}
else {
fscanf(pmodels,"%d",&NN3);
fseek(pmodels,2,SEEK_CUR);
}
}
}
fclose(pmodels);
getch();
}
closegraph();
}
```

```
/* zxvoxel.h */

draw_voxel(float T[5][5],int *l)
{
float sidex[5][6],sidey[5][6],sidez[5][6];
float V[6];
int vx[10],vy[10],vz[10];
int i,j,k,ll;
char n[80];
float Z;

setcolor(BLUE);
Z=T[4][4];
for (i=1;i<=3;i++) l[i]+=1;
sidex[1][1]=Z*l[1];
sidex[1][2]=Z*l[2];
sidex[1][3]=Z*l[3];
sidex[2][1]=Z*l[1];
sidex[2][2]=Z*l[2];
sidex[2][3]=Z*(l[3]-1);
sidex[3][1]=Z*l[1];
sidex[3][2]=Z*(l[2]-1);
sidex[3][3]=Z*(l[3]-1);
sidex[4][1]=Z*l[1];
sidex[4][2]=Z*(l[2]-1);
sidex[4][3]=Z*l[3];
sidey[1][1]=Z*l[1];
sidey[1][2]=Z*l[2];
sidey[1][3]=Z*l[3];
sidey[2][1]=Z*l[1];
sidey[2][2]=Z*l[2];
sidey[2][3]=Z*(l[3]-1);
sidey[3][1]=Z*(l[1]-1);
sidey[3][2]=Z*l[2];
sidey[3][3]=Z*(l[3]-1);
sidey[4][1]=Z*(l[1]-1);
sidey[4][2]=Z*l[2];
sidey[4][3]=Z*l[3];
sidez[1][1]=Z*l[1];
sidez[1][2]=Z*l[2];
sidez[1][3]=Z*l[3];
sidez[2][1]=Z*l[1];
sidez[2][2]=Z*(l[2]-1);
sidez[2][3]=Z*l[3];
sidez[3][1]=Z*(l[1]-1);
sidez[3][2]=Z*(l[2]-1);
sidez[3][3]=Z*l[3];
sidez[4][1]=Z*(l[1]-1);
sidez[4][2]=Z*l[2];
sidez[4][3]=Z*l[3];
if (T[1][4]<0) {
for (i=1;i<=4;i++) sidex[i][1]=Z*(l[1]-1);
}
k=0;
```

```
for (i=1;i<=4;i++) {
for (j=1;j<=3;j++) V[j]=sidex[i][j];
V[4]=0;
V[5]=0;
graph_V12(V,T);
V[4]=floor(V[4]);
V[5]=floor(V[5]);
gcvt(V[4],80,n);
vx[k]=atoi(n);
k+=1;
gcvt(V[5],80,n);
vx[k]=atoi(n);
k+=1;
}
vx[8]=vx[0];
vx[9]=vx[1];
drawpoly(5,vx);
if (T[2][4]<0) {
for (i=1;i<=4;i++) sidey[i][2]=Z*(l[2]-1);
}
k=0;
for (i=1;i<=4;i++) {
for (j=1;j<=3;j++) V[j]=sidey[i][j];
V[4]=0;
V[5]=0;
graph_V12(V,T);
V[4]=floor(V[4]);
V[5]=floor(V[5]);
gcvt(V[4],80,n);
vy[k]=atoi(n);
k+=1;
gcvt(V[5],80,n);
vy[k]=atoi(n);
k+=1;
}
vy[8]=vy[0];
vy[9]=vy[1];
drawpoly(5,vy);
if (T[3][4]<0) {
for (i=1;i<=4;i++) sidez[i][3]=Z*(l[3]-1);
}
k=0;
for (i=1;i<=4;i++) {
for (j=1;j<=3;j++) V[j]=sidez[i][j];
V[4]=0;
V[5]=0;
graph_V12(V,T);
V[4]=floor(V[4]);
V[5]=floor(V[5]);
gcvt(V[4],80,n);
vz[k]=atoi(n);
k+=1;
gcvt(V[5],80,n);
vz[k]=atoi(n);
```

```
k+=1;
}
vz[8]=vz[0];
vz[9]=vz[1];
drawpoly(5,vz);
}
```

```
/* zxzview.h */

FILE *zmodels;

Z_graph_test(float T[5][5])
{
int ***ZZ;
long int DDmin[4],DDmax[4],DD[4];
int h,i,j,k,ll;
long int l[4];
float lx1[5],lx2[5];
float Ax1[5],Ax2[5];
double Z_res;
char n[80];
int g_driver,g_mode,g_error;

detectgraph(&g_driver,&g_mode);
if (g_driver<0) {
printf("No graphics driver #%d, mode #%d\n",g_driver,g_mode);
exit(1);
}
initgraph(&g_driver,&g_mode,"");
g_error=graphresult();
if (g_error<0) {
printf("Initgraph error: %s.\n",grapherrormsg(g_error));
exit(1);
}
setbkcolor(BLACK);
setcolor(WHITE);
zmodels=fopen("zmodels.c","r");
rewind(zmodels);
fscanf(zmodels,"%ld %ld %ld ",&DDmin[1],&DDmin[2],&DDmin[3]);
fscanf(zmodels,"%ld %ld %ld %lf",&DD[1],&DD[2],&DD[3],&Z_res);
for (i=1;i<=3;i++) {
DDmax[i]=DDmin[i]+DD[i]-1;
}
ZZ=(int ***) malloc((unsigned) (DD[1])*sizeof(int**));
if (!ZZ) {
perror("allocation failure 1 in ZZ()");
exit(1);
}
ZZ-=1;
for (i=1;i<=DD[1];i++) {
ZZ[i]=(int **) malloc((unsigned) (DD[2])*sizeof(int*));
if (!ZZ[i]) {
perror("allocation failure 2 in ZZ()");
exit(1);
}
ZZ[i]-=1;
}
for (i=1;i<=DD[1];i++) {
for (j=1;j<=DD[2];j++) {
ZZ[i][j]=(int *) malloc((unsigned) (DD[3])*sizeof(int));
if (!ZZ[i][j]) {
```

```
perror("allocation failure 3 in ZZ()");
exit(1);
}
ZZ[i][j]-=1;
}
}
fseek(zmodels,2,SEEK_CUR);
for (i=1;i<=DD[1];i++) {
for (j=1;j<=DD[2];j++) {
for (k=1;k<=DD[3];k++) ZZ[i][j][k]=fgetc(zmodels);
fseek(zmodels,2,SEEK_CUR);
}
fseek(zmodels,2,SEEK_CUR);
}
fclose(zmodels);
T[4][4]=Z_res;
if (T[3][4]<0) ll=5;
else ll=1;
if (T[2][4]<0) ll=ll+2;
if (T[1][4]<0) ll=ll+1;
for (i=1;i<=DD[1];i++) {
for (j=1;j<=DD[2];j++) {
for (k=1;k<=DD[3];k++) {
switch(ll) {
case 1: {
l[1]=DDmin[1]+i-1;
l[2]=DDmin[2]+j-1;
l[3]=DDmin[3]+k-1;
break;
}
case 2: {
l[1]=DDmax[1]-i+1;
l[2]=DDmin[2]+j-1;
l[3]=DDmin[3]+k-1;
break;
}
case 3: {
l[1]=DDmin[1]+i-1;
l[2]=DDmax[2]-j+1;
l[3]=DDmin[3]+k-1;
break;
}
case 4: {
l[1]=DDmax[1]-i+1;
l[2]=DDmax[2]-j+1;
l[3]=DDmin[3]+k-1;
break;
}
case 5: {
l[1]=DDmin[1]+i-1;
l[2]=DDmin[2]+j-1;
l[3]=DDmax[3]-k+1;
break;
}
```

```
case 6: {
l[1]=DDmax[1]-i+1;
l[2]=DDmin[2]+j-1;
l[3]=DDmax[3]-k+1;
break;
}
case 7: {
l[1]=DDmin[1]+i-1;
l[2]=DDmax[2]-j+1;
l[3]=DDmax[3]-k+1;
break;
}
case 8: {
l[1]=DDmax[1]-i+1;
l[2]=DDmax[2]-j+1;
l[3]=DDmax[3]-k+1;
break;
}
}
if (ZZ[l[1]-DDmin[1]+1][l[2]-DDmin[2]+1][l[3]-DDmin[3]+1]=='1')
draw_voxel(T,l);
}
}
}
for (i=DD[1];i>=1;i--) {
for (j=DD[2];j>=1;j--) free((char*) (ZZ[i][j]+1));
}
for (i=DD[1];i>=1;i--) free((char*) (ZZ[i]+1));
free((char*) (ZZ+1));
getch();
closegraph();
}
```

```
/* zzaxis.h */

draw_axis(float T[5][5],float *Ax1,float *Ax2)
{
int i;
float V[6];
int VV1,VV2,VV3,VV4;
char n[80],*m;

for (i=1;i<=3;i++) V[i]=0;
V[Ax1[4]]=Ax1[Ax1[4]]*T[4][4];
graph_V12(V,T);
gcvt(V[4],80,n);
VV1=atoi(n);
gcvt(V[5],80,n);
VV2=atoi(n);
V[Ax1[4]]=Ax2[Ax1[4]]*T[4][4];
graph_V12(V,T);
gcvt(V[4],80,n);
VV3=atoi(n);
gcvt(V[5],80,n);
VV4=atoi(n);
line(VV1,VV2,VV3,VV4);
if (Ax1[4]==1 && Ax2[1]==6) {
m="X";
outtextxy(VV3,VV4,m);
}
if (Ax1[4]==2 && Ax2[2]==6) {
m="Y";
outtextxy(VV3,VV4,m);
}
if (Ax1[4]==3 && Ax2[3]==6) {
m="Z";
outtextxy(VV3,VV4,m);
}
}
```

```
/* zzzview.h */

FILE *zmodels;

int ****imatrix();

Z_graph_test(float T[5][5])
{
int ****ZZ=0;
long int AA[5],DD[4];
long int DDmin[4],DDmax[4];
long int l[4],s[4];
long int h,i,j,k,ii,jj,kk,ll,iii,jjj,kkk;
long int where,where1;
double Z_res;
char n[80];
int g_driver,g_mode,g_error;

detectgraph(&g_driver,&g_mode);
if (g_driver<0) {
printf("No graphics driver #%d, mode #%d\n",g_driver,g_mode);
exit(1);
}
initgraph(&g_driver,&g_mode,"");
g_error=graphresult();
if (g_error<0) {
printf("Initgraph error: %s.\n",grapherrormsg(g_error));
exit(1);
}
zmodels=fopen("zmodels.c","r");
rewind(zmodels);
fscanf(zmodels,"%ld %ld %ld ",&DDmin[1],&DDmin[2],&DDmin[3]);
fscanf(zmodels,"%ld %ld %ld %lf",&DD[1],&DD[2],&DD[3],&Z_res);
for (i=1;i<=3;i++) DDmax[i]=DDmin[i]+DD[i]-1;
fseek(zmodels,2,SEEK_CUR);
where1=ftell(zmodels);
setbkcolor(BLACK);
setcolor(WHITE);
T[4][4]=Z_res;
if (T[3][4]<0) ll=5;
else ll=1;
if (T[2][4]<0) ll=ll+2;
if (T[1][4]<0) ll=ll+1;
for (i=1;i<=3;i++) AA[i]=1;
AA[4]=1;
ZZ=imatrix(DD,AA);
for (i=2;i<=DD[1]-1;i++) {
for (j=2;j<=DD[2]-1;j++) {
for (k=2;k<=DD[3]-1;k++) {
for (ii=1;ii<=AA[1];ii++) {
iii=i+ii-1;
for (jj=1;jj<=AA[2];jj++) {
jjj=j+jj-1;
for (kk=1;kk<=AA[3];kk++) {
```

```
kkk=k+kk-1;
if (iii>=2 && iii<=DD[1]-1 && jjj>=2 && jjj<=DD[2]-1 && kkk>=2 &&
kkk<=DD[3]-1) {
where=where1+(DD[2]*(DD[3]+2)+2)*(iii-1)+(DD[3]+2)*(jjj-1)+kkk-1;
fseek(zmodels,where,SEEK_SET);
ZZ[1][ii][jj][kk]=fgetc(zmodels);
}
else ZZ[1][ii][jj][kk]='0';
}
}
}
for (ii=1;ii<=AA[1];ii++) {
iii=i+ii-1;
for (jj=1;jj<=AA[2];jj++) {
jjj=j+jj-1;
for (kk=1;kk<=AA[3];kk++) {
kkk=k+kk-1;
if (iii>=2 && iii<=DD[1]-1 && jjj>=2 && jjj<=DD[2]-1 && kkk>=2 &&
kkk<=DD[3]-1) {
switch(ll) {
case 1: {
l[1]=DDmin[1]+iii-1;
l[2]=DDmin[2]+jjj-1;
l[3]=DDmin[3]+kkk-1;
s[1]=ii;
s[2]=jj;
s[3]=kk;
break;
}
case 2: {
l[1]=DDmax[1]-iii+1;
l[2]=DDmin[2]+jjj-1;
l[3]=DDmin[3]+kkk-1;
s[1]=AA[1]-ii+1;
s[2]=jj;
s[3]=kk;
break;
}
case 3: {
l[1]=DDmin[1]+iii-1;
l[2]=DDmax[2]-jjj+1;
l[3]=DDmin[3]+kkk-1;
s[1]=ii;
s[2]=AA[2]-jj+1;
s[3]=kk;
break;
}
case 4: {
l[1]=DDmax[1]-iii+1;
l[2]=DDmax[2]-jjj+1;
l[3]=DDmin[3]+kkk-1;
s[1]=AA[1]-ii+1;
s[2]=AA[2]-jj+1;
s[3]=kkk;
```

```
break;
}
case 5: {
l[1]=DDmin[1]+iii-1;
l[2]=DDmin[2]+jjj-1;
l[3]=DDmax[3]-kkk+1;
s[1]=ii;
s[2]=jj;
s[3]=AA[3]-kk+1;
break;
}
case 6: {
l[1]=DDmax[1]-iii+1;
l[2]=DDmin[2]+jjj-1;
l[3]=DDmax[3]-kkk+1;
s[1]=AA[1]-ii+1;
s[2]=jj;
s[3]=AA[3]-kk+1;
break;
}
case 7: {
l[1]=DDmin[1]+iii-1;
l[2]=DDmax[2]-jjj+1;
l[3]=DDmax[3]-kkk+1;
s[1]=ii;
s[2]=AA[2]-jj+1;
s[3]=AA[3]-kk+1;
break;
}
case 8: {
l[1]=DDmax[1]-iii+1;
l[2]=DDmax[2]-jjj+1;
l[3]=DDmax[3]-kkk+1;
s[1]=AA[1]-ii+1;
s[2]=AA[2]-jj+1;
s[3]=AA[3]-kk+1;
break;
}
}
if (ZZ[1][s[1]][s[2]][s[3]]=='1') draw_voxel(T,1);
}
}
}
}
k+=AA[3]-1;
}
j+=AA[2]-1;
}
i+=AA[1]-1;
}
free_imatrix(ZZ,AA);
fclose(zmodels);
getch();
closegraph();
}
```

8/15/95

What is claimed is:

1. An algorithm for the efficient representation of complex three-dimensional objects, said algorithm aiding in the robotic recognition of objects and comprising the steps of:

a. the generation of superquadric volume primitives;

b. converting said superquadric volume primitives into voxels in a voxel space;

c. combining said voxels at the direction of a user of the algorithm to obtain a volumetric representation of a particular three-dimensional object;

d. discarding all voxels except for the surface voxels included in said volumetric representation of said particular three-dimensional object; and e. automatically generating from the list of said surface voxels a Winged Edge graph structure, said Winged Edge graph structure comprising edges and faces automatically generated by said algorithm from said list of said surface voxels, said Winged Edge graph structure representing said particular three-dimensional object in a computer;

said particular three-dimensional object not being defined by said Winged Edge graph structure until the termination of said algorithm.

2. An algorithm according to claim 1, wherein said generation of said superquadric volume primitives is accomplished by the use of ruled shape functions.

3. An algorithm according to claim 2, wherein said ruled shape functions generate ruled volume functions.

4. An algorithm according to claim 3, wherein said superquadric volume primitives are a subset of said ruled volume functions.

5. An algorithm according to claim 4, wherein said ruled volume functions are generated by at least three of said ruled shape functions, said ruled shape functions being shape functions of two basis quantities, a squareness parameter, and at least one angular parameter.

6. An algorithm according to claim 5, wherein, said squareness parameter is a squareness function of two basis quantities, a rotation parameter, and an angular parameter.

7. An algorithm according to claim 6, wherein said shape functions and said squareness function comprise a superinterpolator function.

8. An algorithm according to claim 6, wherein said shape functions and said squareness function comprise a superelliptic function.

9. An algorithm according to claim 1, wherein said combining of said voxels comprises employing the following operations:

(a) Union;

(b) Intersection;

(c) Complement; and (d) Difference.

10. An algorithm according to claim 1, wherein said discarding of all voxels except for said surface voxels comprises searching for adjacent voids for every voxel in said volumetric representation of a particular three-dimensional object.

11. An algorithm according to claim 1, wherein said automatic generation of a Winged Edge graph structure comprises:

a. searching said voxel space for the first occurrence of a voxel;

b. upon finding said first voxel, initializing said Winged Edge graph structure as a self-loop;

c. for each voxel found after said first voxel, forward searching by Cartesian coordinates normally, diagonally, and at corners for adjacent voxels;

d. creating an edge between said voxel and each of said adjacent voxels;

e. for each of said newly created edges that shares a common voxel with an existing edge, defining the necessary adjacency relationships between said newly created edge and said existing edge; and f. for each of said newly created edges that shares a common voxel with an existing edge and that completes a closed loop of edges, said closed loop of edges establishing a new face, joining said new face to said Winged Edge graph structure.

12. An algorithm according to claim 11, further comprising joining adjacent coplanar faces.

13. An algorithm according to claim 12, further comprising removing the edge common to said adjacent coplanar faces which are joined.

14. An algorithm according to claim 13, further comprising joining edges which are unidirectional, collinear, and share a common voxel.

* * * * *